United States Patent
Roper, Jr. et al.

(10) Patent No.: US 12,333,228 B1
(45) Date of Patent: Jun. 17, 2025

(54) SECURE AND SCALABLE MODEL SPLICING OF DIGITAL ENGINEERING MODELS FOR SOFTWARE-CODE-DEFINED DIGITAL THREADS

(71) Applicant: Istari Digital, Inc., Charleston, SC (US)

(72) Inventors: William Roper, Jr., Charleston, SC (US); Christopher Lee Benson, Arlington, VA (US); Sriram Krishnan, Cambridge, MA (US); Long N. Phan, Winchester, MA (US); Baha aldeen E. A. Abunojaim, Roslindale, MA (US); Omar Valverde, Fairfax, VA (US); Peter Galvin, Watertown, MA (US); Najem Aldeen Abu Rmaileh, Amman (JO); Abdullah M. S. Al-Hatem, Tla' Al Ali (JO)

(73) Assignee: Istari Digital, Inc., Charleston, SC (US)

( * ) Notice: Subject to any disclaimer, the term of this patent is extended or adjusted under 35 U.S.C. 154(b) by 0 days.

(21) Appl. No.: 19/067,972

(22) Filed: Mar. 2, 2025

Related U.S. Application Data

(63) Continuation of application No. PCT/US2024/018278, filed on Mar. 3, 2024, which is
(Continued)

(51) Int. Cl.
*G06F 21/00* (2013.01)
*G06F 8/36* (2018.01)
(Continued)

(52) U.S. Cl.
CPC ............... *G06F 30/27* (2020.01); *G06F 8/36* (2013.01); *G06F 8/71* (2013.01)

(58) Field of Classification Search
CPC ...... H04L 63/0263; H04L 63/20; G06F 21/60; G06F 21/6218
See application file for complete search history.

(56) References Cited

U.S. PATENT DOCUMENTS

| | | | |
|---|---|---|---|
| 10,606,566 B2 * | 3/2020 | Brown | G06F 8/35 |
| 11,687,830 B2 * | 6/2023 | Siracusa | G06F 8/10 |
| | | | 706/12 |

(Continued)

OTHER PUBLICATIONS

International Search Report and Written Opinion of PCT Application No. PCT/US2024/018278, mailed on Jun. 24, 2024.
(Continued)

*Primary Examiner* — Longbit Chai
(74) *Attorney, Agent, or Firm* — American Patent Agency PC; Daniar Hussain; Stephen M. Hou

(57) ABSTRACT

Methods and systems for generating a sharable model splice of a digital engineering (DE) model are provided. The method comprises receiving a DE model file in a native file format; extracting model data; storing the model data in a storage area; generating external, commonly-accessible splice functions that enable external access to digital artifacts derived from the model data; and generating the sharable model splice, which comprises access to a selective portion of the digital artifacts, and access to at least one of the splice functions. The splice functions provide addressable API or SDK endpoints that enable access by third-party applications and users to the digital artifacts without access to an entirety of the DE model file and without requiring direct engagement with a DE tool associated with the DE model type. These endpoints also provide a unified programming interface to sharable model splices generated from DE models.

20 Claims, 37 Drawing Sheets

Related U.S. Application Data a continuation of application No. PCT/US2024/014030, filed on Feb. 1, 2024.

(60) Provisional application No. 63/462,988, filed on Apr. 29, 2023, provisional application No. 63/489,401, filed on Mar. 9, 2023, provisional application No. 63/451,577, filed on Mar. 11, 2023, provisional application No. 63/511,583, filed on Jun. 30, 2023, provisional application No. 63/516,624, filed on Jul. 31, 2023.

(51) Int. Cl.
*G06F 8/71* (2018.01)
*G06F 30/27* (2020.01)

(56) References Cited

U.S. PATENT DOCUMENTS

| | | |
|---|---|---|
| 2021/0086451 A1 | 3/2021 | Carbone et al. |
| 2021/0294577 A1 | 9/2021 | Dunn et al. |
| 2023/0058094 A1* | 2/2023 | Stump ............... G06F 8/34 |

OTHER PUBLICATIONS

International Preliminary Report on Patentability of PCT Application No. PCT/US2024/018278, mail on Feb. 25, 2025.

* cited by examiner

FIG. 24

SECURE AND SCALABLE MODEL SPLICING OF DIGITAL ENGINEERING MODELS FOR SOFTWARE-CODE-DEFINED DIGITAL THREADS

REFERENCE TO RELATED APPLICATIONS

If an Application Data Sheet ("ADS") or PCT Request Form ("Request") has been filed on the filing date of this application, it is incorporated by reference herein. Any applications claimed on the ADS or Request for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

Furthermore, this application is related to the U.S. patent applications listed below, which are incorporated by reference in their entireties herein, as if fully set forth herein:

PCT patent application No. PCT/US24/14030, filed on Feb. 1, 2024, entitled "Artificial Intelligence (AI) Assisted Digital Documentation for Digital Engineering," describes AI-assisted documentation for digital engineering platforms.

U.S. provisional patent application No. 63/442,659, filed on Feb. 1, 2023, entitled "AI-Assisted Digital Documentation for Digital Engineering with Supporting Systems and Methods," describes AI-assistance tools for digital engineering (DE), including modeling and simulation applications, and the certification of digitally engineered products.

U.S. provisional patent application No. 63/451,545, filed on Mar. 10, 2023, entitled "Digital Threads in Digital Engineering Systems, and Supporting AI-Assisted Digital Thread Generation," describes model splicer and digital threading technology.

U.S. provisional patent application No. 63/451,577, filed on Mar. 11, 2023, entitled "Model Splicer and Microservice Architecture for Digital Engineering," describes model splicer technology.

U.S. provisional patent application No. 63/462,988, filed on Apr. 29, 2023, also entitled "Model Splicer and Microservice Architecture for Digital Engineering," describes model splicer technology.

U.S. provisional patent application No. 63/511,583, filed on Jun. 30, 2023, entitled "AI-Assisted Model Splicer Generation for Digital Engineering," describes model splicer technology with AI-assistance.

U.S. provisional patent application No. 63/516,624, filed on Jul. 31, 2023, entitled "Document and Model Splicing for Digital Engineering," describes document splicer technology.

U.S. provisional patent application No. 63/520,643, filed on Aug. 20, 2023, entitled "Artificial Intelligence (AI)-Assisted Automation of Testing in a Software Environment," describes software testing with AI-assistance.

U.S. provisional patent application No. 63/590,420, filed on Oct. 14, 2023, entitled "Commenting and Collaboration Capability within Digital Engineering Platform," describes collaborative capabilities.

U.S. provisional patent application No. 63/586,384, filed on Sep. 28, 2023, entitled "Artificial Intelligence (AI)-Assisted Streamlined Model Splice Generation, Unit Testing, and Documentation," describes streamlined model splicing, testing and documentation with AI-assistance.

U.S. provisional patent application No. 63/470,870, filed on Jun. 3, 2023, entitled "Digital Twin and Physical Twin Management with Integrated External Feedback within a Digital Engineering Platform," describes digital and physical twin management and the integration of external feedback within a DE platform.

U.S. provisional patent application No. 63/515,071, filed on Jul. 21, 2023, entitled "Generative Artificial Intelligence (AI) for Digital Engineering," describes an AI-enabled digital engineering task fulfillment process within a DE software platform.

U.S. provisional patent application No. 63/517,136, filed on Aug. 2, 2023, entitled "Machine Learning Engine for Workflow Enhancement in Digital Engineering," describes a machine learning engine for model splicing and DE script generation.

U.S. provisional patent application No. 63/516,891, filed on Aug. 1, 2023, entitled "Multimodal User Interfaces for Digital Engineering," describes multimodal user interfaces for DE systems.

U.S. provisional patent application No. 63/580,384, filed on Sep. 3, 2023, entitled "Multimodal Digital Engineering Document Interfaces for Certification and Security Reviews," describes multimodal user interfaces for certification and security reviews.

U.S. provisional patent application No. 63/613,556, filed on Dec. 21, 2023, entitled "Alternative Tool Selection and Optimization in an Integrated Digital Engineering Platform," describes tool selection and optimization.

U.S. provisional patent application No. 63/584,165, filed on Sep. 20, 2023, entitled "Methods and Systems for Improving Workflows in Digital Engineering," describes workflow optimization in a DE platform.

U.S. provisional patent application No. 63/590,456, filed on Oct. 15, 2023, entitled "Data Sovereignty Assurance for Artificial Intelligence (AI) Models," relates to data sovereignty assurance during AI model training and evaluation.

U.S. provisional patent application No. 63/606,030, filed on Dec. 4, 2023, also entitled "Data Sovereignty Assurance for Artificial Intelligence (AI) Models," further details data sovereignty assurances during AI model training and evaluation.

U.S. provisional patent application No. 63/419,051, filed on Oct. 25, 2022, entitled "Interconnected Digital Engineering and Certification Ecosystem."

U.S. non-provisional patent application Ser. No. 17/973, 142 filed on Oct. 25, 2022, entitled "Interconnected Digital Engineering and Certification Ecosystem."

U.S. non-provisional patent application Ser. No. 18/383, 635, filed on Oct. 25, 2023, entitled "Interconnected Digital Engineering and Certification Ecosystem."

U.S. provisional patent application No. 63/489,401, filed on Mar. 9, 2023, entitled "Security Architecture for Interconnected Digital Engineering and Certification Ecosystem."

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

ISTARI DIGITAL is a trademark name carrying embodiments of the present invention, and hence, the aforementioned trademark name may be interchangeably used in the specification and drawings to refer to the products/process offered by embodiments of the present invention. The terms ISTARI and ISTARI DIGITAL may be used in this specification to describe the present invention, as well as the company providing said invention.

FIELD OF THE INVENTION

The invention relates to tools for digital engineering, including modeling, simulation, validation, verification, and certification of digitally engineered products. Specifically, the invention relates to robust and efficient communication, integration and collaboration among multidisciplinary digital engineering models at large scale.

BACKGROUND OF THE INVENTION

The statements in the background of the invention are provided to assist with understanding the invention and its applications and uses, and may not constitute prior art.

Digital engineering tools, including modeling and simulation tools that accurately represent or virtualize physical systems or processes for real-world decisions, enable iterative and effective development of components and/or systems. Disparate engineering tools from multiple disciplines are necessary to enable digital engineering, from design to validation, verification, and certification of complex systems, yet these digital engineering tools and the models they generate are siloed in different engineering software tools. Robust and efficient integration of data and models from the siloed tools is one of the largest expenses in digital engineering and requires massive teams of highly specialized engineers and software developers, while cross-platform collaboration is often impeded by the mismatch of software skill sets among highly expensive subject matter experts, given the sheer number of different digital engineering model types in use today. Furthermore, large-scale multidisciplinary integration into digital threads and digital twins for system-level assessment is far from maturing to efficiently model intricate interactions in large complex systems.

Moreover, certification of these components and/or systems is complex and requires integration between data from engineering models designed using disparate tools, together with human-readable documentation throughout the certification process. Certification requires information and tests that largely occur in the physical world using physical manifestations of digitally engineered components and/or systems (sometimes referred to herein as "products"), yet physical tests completed for one effort or by a third-party stakeholder (e.g., supplier of a component) often need to be repeated because of intellectual property or data ownership concerns. This results in redundant physical tests that add costs and delays to development and certification efforts. Data integrity, security, auditability, traceability, and accountability are all crucial in the management of digital models and digital data.

Therefore, in view of the aforementioned difficulties, there is an unsolved need to provide an engineering collaboration system and platform that enables streamlined design, validation, verification, and certification of complex systems. Accordingly, it would be an advancement in the state of the art to enable the integration of multidisciplinary engineering models from disparate, disconnected tools, together with human-readable documentation, in a unified, scalable, and collaborative digital engineering platform.

It is against this background that various embodiments of the present invention were developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

According to a first aspect of the present invention, in one embodiment, a non-transitory physical storage medium storing program code is provided. The program code is executable by a hardware processor. The hardware processor when executing the program code causes the hardware processor to execute a computer-implemented process for generating a sharable model splice of a digital engineering (DE) model. The program code may comprise code to receive a DE model file of the DE model having a DE model type, wherein the DE model file is in a native file format. The program code may comprise code to extract model data from the DE model file in the native file format. The program code may comprise code to store the model data in a model data storage area. The program code may comprise code to generate one or more external, commonly-accessible splice functions that enable external access to one or more digital artifacts derived from the model data stored in the model data storage area, wherein the one or more external, commonly-accessible splice functions may provide addressable Application Programming Interface (API) or Software Development Kit (SDK) endpoints that are accessible by third-party applications and users, and wherein the API or SDK endpoints may enable access to the digital artifacts without access to an entirety of the DE model file and without requiring direct engagement by the third-party applications and users with a DE tool associated with the DE model type. Furthermore, the program code may comprise code to generate the sharable model splice of the DE model, wherein the sharable model splice may comprise access to a selective portion of the one or more digital artifacts, wherein the sharable model splice may comprise access to at least one of the one or more external, commonly-accessible splice functions, wherein the sharable model splice may be accessible via the API or SDK endpoints by the third-party applications and users, and wherein the API or SDK endpoints may provide a unified programming interface to sharable model splices generated from DE models having the DE model type.

In some embodiments, the access to the selective portion of the one or more digital artifacts may be provided through one of an address, a pointer, a link, an uniform resource locator (URL), and a copy of the one or more digital artifacts. In some embodiments, the access to the at least one of the one or more external, commonly-accessible splice functions may be provided through one of an address, a pointer, a link, an uniform resource locator (URL), and a copy of the at least one of the one or more external, commonly-accessible splice functions.

In some embodiments, the non-transitory physical storage medium may further comprise program code to execute at least one of the one or more external, commonly-accessible splice functions to access and perform at least one action or computation on the selective portion of the one or more digital artifacts from the sharable model splice of the DE model.

In some embodiments, the sharable model splice may comprise metadata associated with the one or more digital artifacts, wherein the metadata may indicate a given version of the DE model file and a timestamp when the one or more digital artifact is derived from the DE model file having the given version.

In some embodiments, at least one of the one or more digital artifacts may be one of the model data stored in the model data storage area, and at least one of the one or more external, commonly-accessible splice functions may be a read-type function.

In some embodiments, the one or more external, commonly-accessible splice functions may be written in a scripting language.

In some embodiments, the program code to extract the model data from the DE model file may comprise a model crawling script that may engage the DE tool associated with the DE model type via native tool API or SDK interfaces.

In some embodiments, the sharable model splice may comprise at least one of a first information security tag that indicates a level of the access to the selective portion of the one or more digital artifacts and a second information security tag that indicates a level of the access to the at least one of the one or more external, commonly-accessible splice functions.

In some embodiments, the non-transitory physical storage medium may further comprise program code to generate an update to the DE model file, using the one or more external, common-accessible splice functions.

In some embodiments, the DE tool may be a first DE tool, and the unified programming interface may be configured to interface with the first DE tool and a second DE tool that is not directly interoperable with the first DE tool, to enable interoperable use of multiple DE tools in parallel.

In some embodiments, the sharable model splice may be a first sharable model splice and the DE model file may be a first DE model file, and the selective portion of the one or more digital artifacts may be ingested by a second sharable model splice generated from a second DE model file.

In some embodiments, the program code to generate the one or more external, commonly-accessible splice functions may further comprises code to receive a user input, and retrieve the access to the at least one of the external, commonly-accessible splice functions from a splice function datastore, based on the user input.

In some embodiments, the program code to generate the one or more external, commonly-accessible splice functions may further comprises code to transmit, from a customer environment, a request to an API gateway service cell provided by an DE platform, wherein the customer environment is not managed by the DE platform, and wherein the request from the customer environment is unable to change production software associated with the DE platform, and receive, at the customer environment, access to the one or more external, commonly-accessible splice functions from the API gateway service cell.

In some embodiments, the access the at least one of the one or more external commonly-accessible splice functions may be representational state transfer (REST) enabled.

In some embodiments, the program code to generate the one or more external, commonly-accessible splice functions may comprise code to execute an AI algorithm trained on existing external, commonly-accessible splice functions associated with existing model splices for same DE model types and/or analogous DE models.

In some embodiments, the program code to extract model data from the DE model file may comprise code to receive a microservice request for model splicing, construct file information of the DE model file based on the DE model type, send the DE model file and the file information to a native API server for the DE tool associated with the DE model type, and receive a plurality of model data files from the native API server, generated from a data extraction or model crawling process on the DE model file, performed on the native API server.

In some embodiments, the DE tool associated with the DE model type may be selected from the group consisting of model-based systems engineering (MBSE) tools, augmented reality (AR) tools, computer aided design (CAD) tools, data analytics tools, modeling and simulation (M&S) tools, product lifecycle management (PLM) tools, multi-attribute tradespace tools, simulation engines, requirements model tools, electronics model tools, test-plan model tools, cost-model tools, schedule model tools, supply-chain model tools, manufacturing model tools, cyber security model tools, and mission effects model tools.

According to a second aspect of the present invention, in one embodiment, a computer-implemented method for generating a sharable model splice of a DE model is provided. The computer-implemented method may comprise receiving a DE model file of the DE model having a DE model type, wherein the DE model file is in a native file format. The computer-implemented method may comprise extracting model data from the DE model file in the native file format. The computer-implemented method may comprise storing the model data in a model data storage area. The computer-implemented method may comprise generating one or more external, commonly-accessible splice functions that enable external access to one or more digital artifacts derived from the model data stored in the model data storage area, wherein the one or more external, commonly-accessible splice functions may provide addressable Application Programming Interface (API) or Software Development Kit (SDK) endpoints that are accessible by third-party applications and users, and wherein the API or SDK endpoints may enable access to the digital artifacts without access to an entirety of the DE model file and without requiring direct engagement by the third-party applications and users with a DE tool associated with the DE model type. Furthermore, the computer-implemented method may comprise generating the sharable model splice of the DE model, wherein the sharable model splice may comprise access to a selective portion of the one or more digital artifacts, wherein the sharable model splice may comprise access to at least one of the one or more external, commonly-accessible splice functions, wherein the sharable model splice may be accessible via the API or SDK endpoints by the third-party applications and users, and wherein the API or SDK endpoints may provide a unified programming interface to sharable model splices generated from DE models having the DE model type.

Embodiments as set out for the first aspect apply equally to the third aspect.

In addition, in some embodiments, the generating the one or more external, commonly-accessible splice functions and the generating the sharable model splice of the DE model may be performed by a digital agent located within a secure customer environment.

According to a third aspect of the present invention, in one embodiment, a model splicing system for generating a sharable model splice of a DE model is provided. The model splicing system comprises at least one hardware processor, and at least one non-transitory physical storage medium storing program code. The program code is executable by the at least one hardware processor. The at least one hardware processor when executing the program code may cause the at least one hardware processor to execute a computer-implemented process for generating a sharable model splice of a DE model. The program code may comprise code to receive a DE model file of the DE model having a DE model type, wherein the DE model file is in a native file format. The program code may comprise code to extract model data from the DE model file in the native file format. The program code may comprise code to store the model data in a model data storage area. The program code may comprise code to generate one or more external, commonly-accessible splice functions that enable external access to one or more digital artifacts derived from the model data stored in the model data storage area, wherein the one or more external, commonly-accessible splice functions may provide addressable Application Programming Interface (API) or Software Development Kit (SDK) endpoints that are accessible by third-party applications and users, and wherein the API or SDK endpoints may enable access to the digital artifacts without access to an entirety of the DE model file and without requiring direct engagement by the third-party applications and users with a DE tool associated with the DE model type. Furthermore, the program code may comprise code to generate the sharable model splice of the DE model, wherein the sharable model splice may comprise access to a selective portion of the one or more digital artifacts, wherein the sharable model splice may comprise access to at least one of the one or more external, commonly-accessible splice functions, wherein the sharable model splice may be accessible via the API or SDK endpoints by the third-party applications and users, and wherein the API or SDK endpoints may provide a unified programming interface to sharable model splices generated from DE models having the DE model type.

Embodiments as set out for the first aspect apply equally to the second aspect.

In yet another aspect or embodiment of the present invention, a computerized server is provided, comprising at least one processor, memory, and a plurality of computer codes embodied on said memory, said plurality of computer codes which when executed causes said processor to execute a process comprising the steps described herein. Other aspects and embodiments of the present invention include the methods, processes, and algorithms comprising the steps described herein, and also include the processes and modes of operation of the systems and servers described herein.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with the non-transitory physical storage medium may have corresponding features definable and/or combinable with respect to a digital documentation system and/or method and/or system, or vice versa, and these embodiments are specifically envisaged.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which:

FIG. 24 shows a graphical user interface for viewing a model splice of a mathematical function script and for modeling splicing an input function related to a left wing of an airplane under design respectively, in accordance with some embodiments of the present invention.

DETAILED DESCRIPTION OF THE INVENTION

Figure 1:
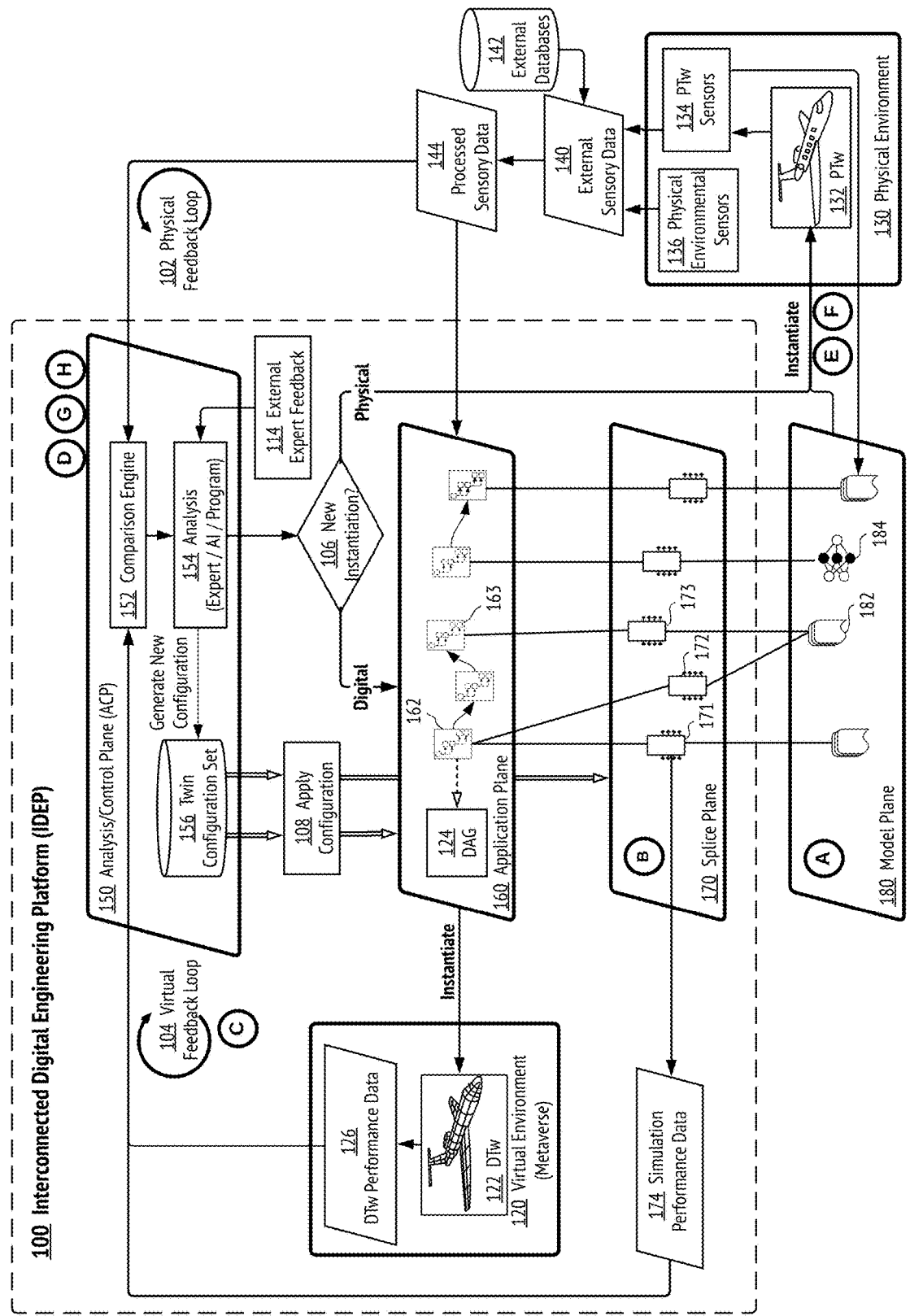
FIG. 1 shows an exemplary interconnected digital engineering (IDEP) platform architecture, in accordance with some embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, the present invention relates to methods and systems for enabling integration, collaboration, and communication among multidisciplinary digital engineering (DE) models from disparate, disconnected DE tools, together with human-readable documentation, in a unified, scalable, secure, generalized, and interconnected digital engineering platform (IDEP). More specifically, methods and systems for DE model splicing are disclosed. Model splicing encapsulates and compartmentalizes DE model data and model data manipulation and access functionalities. Model splices thus generated may be shared, executed, revised, or further spliced independently of the native DE tools and development platforms used to generate the input DE models. User-directed and/or autonomous linking among model splices creates software-defined digital threads, and the extensibility of model splicing over many different types of DE models enables the scaling and generalization of digital threads to represent each and every stage of the DE life cycle. Furthermore, embodiments of the present invention provide a secure and zero-trust solution to DE data sharing, revision, and review, with stringent auditability, traceability, and stakeholder accountability to comply with industry standards and government regulations throughout the entire DE product lifecycle.

With reference to the figures, embodiments of the present invention are now described in detail. First, general DE system and model splicing-specific terminologies are introduced. Next, the IDEP is explained in detail. Finally, the model splicing system, which may be considered a subsystem of the IDEP, is described in detail.

Terminology

Some illustrative terminologies used with the IDEP are provided below to assist in understanding the present invention, but these are not to be read as restricting the scope of the present invention. The terms may be used in the form of nouns, verbs, or adjectives, within the scope of the definition.

Digital engineering (DE): According to the Defense Acquisition University (DAU) and the Department of Defense (DOD) Digital Engineering Strategy published in 2018, digital engineering is "an integrated digital approach to systems engineering, using authoritative sources of systems' data and models as a continuum across disciplines to support lifecycle activities from concept through disposal." Digital engineering incorporates digital technological innovations into an integrated, model-based approach that empowers a paradigm shift from the traditional design-build-test methodology of systems engineering to a new model-analyze-build methodology, thus enabling systems design, prototyping, and testing all in a virtual environment.

DE data: Digital engineering (DE) data comprises project management, program management, product management, design review, and/or engineering data.

DE data field: A data field for DE data, for example, in a DE document template.

Phases: The stages within a DE product lifecycle, including but not limited to, stakeholder analysis, concept studies, requirements definition, preliminary design and technology review, system modeling, final design, implementation, system assembly and integration, prototyping, verification and validation on system, subsystem, and component levels, and operations and maintenance.

DE model, also referred to as a "digital model": A computer-generated model that represents characteristics or behaviors of a complex product or system. A DE model can be created or modified using a DE tool, and a DE model may be represented by one or more DE model files. A DE model file is the computer model file created or modified using the DE tool. In the present disclosure, the terms "digital model", "DE model" and "DE model file" may be used interchangeably, as the context requires. A DE model within the IDEP as disclosed herein refers to any digital file uploaded onto the platform, including documents that are appropriately interpreted, as defined below. For example, a computer-aided design (CAD) file, a Systems Modeling Language (SysML) file, a Systems Requirements Document (SDR) text file, and a Neural Network Model JSON file may each be considered a DE model, in various embodiments of the present invention. A DE model may be machine-readable only, may be human-readable as well but written in programming codes, or may be human-readable and written in natural language-based texts. For example, a word-processing document comprising a technical specification of a product, or a spreadsheet file comprising technical data about a product, may also be considered a DE model.

Interconnected Digital Engineering Platform (IDEP), also referred to as a "Digital Engineering and Certification Ecosystem": According to the DAU, a "DE ecosystem" is the "interconnected infrastructure, environment, and methodology (process, methods, and tools) used to store, access, analyze, and visualize evolving systems' data and models to address the needs of the stakeholders." Embodiments of the IDEP as disclosed herein comprise software platforms running on hardware to realize the aforementioned capabilities under zero-trust principles. A DE and certification ecosystem performs verification and validation tasks, defined next.

Verification: According to the DAU, verification "confirms that a system element meets design-to or build-to specifications. Through the system's life cycle, design solutions at all levels of the physical architecture are verified through a cost-effective combination of analysis, examination, demonstration, and testing." Verification refers to evaluating whether a product, service, or system meets specified requirements and is fit for its intended purpose, checking externally against customer or stakeholder needs. For example, in the aerospace industry, a verification process may include testing an aircraft component to ensure it can withstand the forces and conditions it will encounter during flight.

Validation: According to the DAU, validation is "1) the review and approval of capability requirement documents by a designated validation authority. 2) The process by which the contractor (or as otherwise directed by the DoD component procuring activity) tests a publication/technical manual for technical accuracy and adequacy. 3) The process of evaluating a system or software component during, or at the end of, the development process to determine whether it satisfies specified requirements." Thus, validation refers to evaluating whether the overall performance of a product, service, or system is suitable for its intended use, including its compliance with regulatory requirements, and its ability to meet the needs of its intended users, checking internally against specifications and regulations. For example, for an industrial product manufacturing, a validation process may include consumer surveys that inform product design, modeling and simulations for validating the design, prototype testing for failure limits and feedback surveys from buyers.

Common Verification & Validation (V&V) products: Regulatory and certification standards, compliances, calculations, and tests (e.g., for the development, testing, and certification of products and/or solutions) are referred to herein as "common V&V products."

DE tool: A tool or DE tool is a DE application software (e.g., a CAD software), computer program, and/or script that creates or manipulates a DE model during at least one stage or phase of a product lifecycle. A DE tool may comprise multiple functions or methods.

Application Programming Interface (API): A software interface that provides programmatic access to services by a software program, thus allowing application software to exchange data and communicate with each other using standardized requests and responses. It allows different programs to work together without revealing the internal details of how each works. A DE tool is typically provided with an API library for code-interface access.

Script: A sequence of instructions that is interpreted and run within or carried out by another program, without compilation into a binary file to be run by itself through a computer processor without the support of other programs.

API scripts: Scripts that implement particular functions available via the IDEP as disclosed herein. An API script may be an API function script encapsulated in a model splice, or an "orchestration script" or "platform script" that orchestrates a workflow through a digital thread built upon interconnected model splices.

Platform API or ISTARI API: A library of API scripts available on the IDEP as disclosed herein.

API function scripts, "splice functions," "splice methods," "ISTARI functions," or "function nodes": A type of API scripts. When executed, an API function script inputs into or outputs from a DE model or DE model splice. An "input" function, input method, or "input node" allows updates or modifications to an input DE model. An "output" function, output method, or "output node" allows data extraction or derivation from an input DE model via its model splice. An API function script may invoke native API function calls of native DE tools, where the terms "native" and "primal" may refer to existing DE model files, functions, and API libraries associated with specific third-party DE tools, including both proprietary and open-source ones.

Endpoints: an endpoint in the context of software and networking is a specific digital location or destination where different software systems communicate with each other. It enables external systems to access the features or data of an application, operating system, or other services. An API endpoint is the point of interaction where APIs receive requests and return data in response. A software development kit (SDK) endpoint or SDK-defined endpoint similarly provides a service handle for use with an SDK. References to API endpoints in the present disclosure are equally applicable to SDK endpoints.

Artifact: According to the DAU, a digital artifact is "an artifact produced within, or generated from, a DE ecosystem" to "provide data for alternative views to visualize, communicate, and deliver data, information, and knowledge to stakeholders." In the present disclosure, a "digital artifact" or "artifact" is an execution result from an output API function script within a model splice. Multiple artifacts may be generated from a single DE model or DE model splice.

Model splice: Within the present disclosure, a "model splice", "model wrapper", or "model graft" of a given DE model file comprises locators to or copies of (1) DE model data or digital artifacts extracted or derived from the DE model file, including model metadata, and (2) splice functions (e.g., API function scripts) that can be applied to the DE model data. The splice functions provide unified and standardized input and output API endpoints for accessing and manipulating the DE model data. The DE model data are model-type-specific, and a model splice is associated with model-type-specific input and output schemas. One or more different model splices may be generated from the same input DE model file(s), based on the particular user application under consideration, and depending on data access restrictions. In some contexts, the shorter terms "splice", "wrapper", and/or "graft" are used to refer to spliced, wrapped, and/or grafted DE models.

Model splicing or DE model splicing: A process for generating a model splice from a DE model file. DE model splicing encompasses human-readable document model splicing, where the DE model being spliced is a human-readable text-based document.

Model splicer: Program code or script (uncompiled) that performs model splicing of DE models. A DE model splicer for a given DE model type, when applied to a specific DE model file of the DE model type, retrieves, extracts, or derives DE model data associated with the DE model file, generates and/or encapsulates splice functions and instantiates API endpoints according to input/output schemas.

Model splice linking: Generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first and a second splice (e.g., input splice functions from both model splices are called upon). In the present disclosure, "model linking" and "model splice linking" may be used interchangeably, as linked model splices map to correspondingly linked DE models.

Digital thread, Software-defined digital thread, Software-code-defined digital thread, or Software digital thread: According to the DAU, a digital thread is "an extensive, configurable and component enterprise-level analytical framework that seamlessly expedites the controlled interplay of authoritative technical data, software, information, and knowledge in the enterprise data-information-knowledge systems, based on the digital system model template, to inform decision makers throughout a system's lifecycle by providing the capability to access, integrate, and transform disparate data into actionable information." Within the IDEP as disclosed herein, a digital thread is a platform script that calls upon the platform API to facilitate, manage, or orchestrate a workflow through linked model splices to provide the aforementioned capabilities. That is, a digital thread within the IDEP is a script that connects data from one or more DE models, data sources, or physical artifacts to accomplish a specific mission or business objective, and may be termed a "software-defined digital thread" or "software digital thread" that implements a communication framework or data-driven architecture that connects traditionally siloed DE models to enable seamless information flow among the DE models via model splices.

Tool linking: Similar to model splice linking, tool linking generally refers to jointly accessing two or more DE tools via model splices, where model splice functions that encapsulate disparate DE tool functions are called upon jointly to perform a DE task.

Zero-trust security: An information security principle based on the assumption of no implicit trust between any elements, agents, or users. Zero trust may be carried out by implementing systematic mutual authentication and least privileged access, typically through strict access control, algorithmic impartiality, and data isolation. Within the IDEP as disclosed herein, least privileged access through strict access control and data isolation may be implemented via model splicing and the IDEP system architecture.

Hyperscale capabilities: The ability of a system architecture to scale adequately when faced with massive demand.

IDEP enclave or DE platform enclave: A central command hub responsible for the management and functioning of DE platform operations. An enclave is an independent set of cloud resources that are partitioned to be accessed by a single customer (i.e., single-tenant) or market (i.e., multi-tenant) that does not take dependencies on resources in other enclaves.

IDEP exclave or DE platform exclave: A secondary hub situated within a customer environment to assist with customer DE tasks and operations. An exclave is a set of cloud resources outside enclaves managed by the IDEP, to perform work for individual customers. Examples of exclaves include virtual machines (VMs) and/or servers that the IDEP maintains to run DE tools for customers who may need such services.

Digital twin: According to the DAU, a digital twin is "a virtual replica of a physical entity that is synchronized across time. Digital twins exist to replicate configuration, performance, or history of a system. Two primary sub-categories of digital twin are digital instance and digital prototype." A digital instance is "a virtual replica of the physical configuration of an existing entity; a digital instance typically exists to replicate each individual configuration of a product as-built or as-maintained." A digital prototype is "an integrated multi-physical, multiscale, probabilistic model of a system design; a digital prototype may use sensor information and input data to simulate the performance of its corresponding physical twin; a digital prototype may exist prior to realization of its physical counterpart." Thus, a digital twin is a real-time virtual replica of a physical object or system, with bi-directional information flow between the virtual and physical domains.

Authoritative twin: A reference design configuration at a given stage of a product life cycle. At the design stage, an authoritative twin is the twin configuration that represents the best design target. At the operational stage, an authoritative twin is the twin configuration that best responds to the actual conditions on the ground or "ground-truths".

Admins or Administrators: Project managers or other authorized users. Admins may create templates in the documentation system and have high-level permissions to manage settings in the IDEP.

Requesters: Users who use the platform for the implementation of the modeling and simulations towards certification and other purposes, and who may generate documentation in the digital documentation system, but do not have admin privileges to alter the required templates, document formats, or other system settings.

Reviewers/Approvers: Users who review and/or approve templates, documents, or other system data.

Contributors: Users who provide comments or otherwise contribute to the IDEP.

Document: An electronic file that provides information as an official record. Document examples (i.e., documents with one or more previously completed data fields) may play a similar role to templates in the methods and systems described below, as their data fields can be replaced. Documents include human-readable files that can be read without specialized software, as well as machine-readable documents that can be read with the help of software, such as MICROSOFT WORD (DOCX, DOC), ADOBE (PDF), etc.

DE document: A document with digital engineering (DE) data, for example, project management, program management, design review, and/or engineering data.

Digital documentation: The creation of documents in digital manner in a computer-based system. Based on designated inputs, digital documents are created.

An Interconnected Digital Engineering Platform (IDEP) Architecture

FIG. 1 shows an exemplary interconnected digital engineering platform (IDEP) architecture, in accordance with some embodiments of the present invention. IDEP 100 streamlines the process of product development from conception to production, by using a virtual representation or digital twin (DTw) 122 of the product to optimize and refine features before building a physical prototype or physical twin (PTw) 132, and to iteratively update DTw 122 until DTw 122 and PTw 132 are in sync to meet the product's desired performance goals.

Specifically, a product (e.g., airplane, spacecraft, exploration rover, missile system, automobile, rail system, marine vehicle, remotely operated underwater vehicle, robot, drone, medical device, biomedical device, pharmaceutical compound, drug, power generation system, smart grid metering and management system, microprocessor, integrated circuit, building, bridge, tunnel, chemical plants, oil and gas pipeline, refinery, etc.) manufacturer may use IDEP platform 100 to develop a new product. The engineering team from the manufacturer may create or instantiate digital twin (DTw) 122 of the product in a virtual environment 120, encompassing detailed computer-aided design (CAD) models and finite element analysis (FEA) or computational fluid dynamics (CFD) simulations of component systems such as fuselage, wings, engines, propellers, tail assembly, and aerodynamics. DTw 122 represents the product's design and performance characteristics virtually, allowing the team to optimize and refine features before building a physical prototype 132 in a physical environment 130. In some embodiments, PTw 132 may be an existing entity, while DTw 122 is a digital instance that replicates individual configurations of PTw 132, as-built or as-maintained. In the present disclosure, for illustrative purposes only, DTw 122 and PTw 132 are discussed in the context of building a new product, but it would be understood by persons of ordinary skill in the art that the instantiation of DTw 122 and PTw 132 may take place in any order, based on the particular use case under consideration.

Digital models (e.g., CAD models, FEA models, CFD models) used for creating DTw 122 are shown within a model plane 180 in FIG. 1. Also shown in model plane 180 is a neural network (NN) model 184, which may provide machine-learning based predictive modeling and simulation for a DE process. A DE model such as 182 may be spliced into one or more model splices, such as 172 and 173 within a splice plane 170. Individual DTws such as 122 are instantiated from splice plane 170 via an application plane 160. A model splice such as 172 may be linked to another model splice such as 171 by a platform script or application 162 on application plane 160 into a digital thread. Multiple digital threads such as 162 and 163 may be further linked across different stages or phases of a product life cycle, from concept, design, testing, to production. Digital threads further enable seamless data exchange and collaboration between departments and stakeholders, ensuring optimized and validated designs.

As model splicing provides input and output splice functions that can access and modify DE model data, design updates and DE tasks associated with the digital threads may be represented by scripted, interconnected, and pipelined tasks arranged in Directed Acyclic Graphs (DAGs) such as 124. A DE task DAG example is discussed in further detail with reference to FIG. 10.

To enhance the design, external sensory data 140 may be collected, processed, and integrated into application plane 160. This process involves linking data from different sources, such as physical sensors 134 on prototype 132, physical environmental sensors 136, and other external data streams such as simulation data from model plane 180. API endpoints provide access to digital artifacts from various environments (e.g., physical twin (PTw) sensor 134 data) and integrate them into the spliced plane 170 for the DTw 122. Model splices on the splice plane 170 enable autonomous data linkages and digital thread generation, ensuring DTw 122 accurately represents the product's real-world performance and characteristics.

To validate DTw 122's accuracy, the engineering team may build or instantiate PTw 132 based on the same twin configuration (i.e., digital design). Physical prototype 132 may be equipped with numerous sensors 134, such as accelerometers and temperature sensors, to gather real-time performance data. This data may be compared with the DTw's simulations to confirm the product's performance and verify its design.

Processed sensory data 144 may be used to estimate parameters difficult to measure directly, such as aerodynamic forces or tire contact patch forces. Such processed sensory data provide additional data for DTw 122, further refining its accuracy and reliability. Processed sensory data 144 may be generated from physical environment sensors 136 with physical environment 130, and may be retrieved from other external databases 142, as discussed below.

During development, feedback from customers and market research may be collected to identify potential improvements or adjustments to the product's design. At an analysis & control plane (ACP) 150, subject matter experts (SMEs) may analyze processed sensory data 144 and external expert feedback 114, to make informed decisions on necessary design changes. Such an analysis 154 may be enhanced or entirely enabled by algorithms (i.e., static program code) or artificial intelligence (AI) modules. Linking of digital threads such as 162, physical sensors 134 and 136, processed sensory data 144, and expert feedback data 114 occurs at ACP 150, where sensor and performance data is compared, analyzed, leading to modifications of the underlying model files through digital threads.

In particular, sensory data 144 from physical environment 130 and performance data 126 from virtual environment 120 may be fed into a comparison engine 152. Comparison engine 152 may comprise tools that enable platform users to compare various design iterations with each other and with design requirements, identify performance lapses and trends, and run verification and validation (V&V) tools.

Model splicing is discussed in further detail with reference to FIGS. 7 to 9, and 11 to 33. Model splicing enables the scripting of any DE operation involving DE model files in model plane 180, where each DE model is associated with disparate and siloed DE tools. Codification of DE models and DE operations with a unified corpus of scripts enable IDEP 100 to become an aggregator where a large space of DE activities associated with a given product (e.g., airplane, spacecraft, exploration rover, missile system, automobile, rail system, marine vehicle, remotely operated underwater vehicle, robot, drone, medical device, biomedical device, pharmaceutical compound, drug, power generation system, smart grid metering and management system, microprocessor, integrated circuit, building, bridge, tunnel, chemical plants, oil and gas pipeline, refinery, etc.) may be threaded through program code. Thus, model splicing enables the linking and manipulation of all model files (e.g., 182, 184) associated with a given product within the same interconnected DE platform or DE ecosystem 100. As a consequence, the generation and training of AI modules for the purpose of manipulating DE models (e.g., 182), digital threads (e.g., 162), and digital twins (e.g., 122) become possible over the programmable and unified IDEP 100.

Virtual and Physical Feedback Loops

FIG. 1 uses letter labels "A" to "H" to denote different stages of a product's lifecycle. At each stage, IDEP 100 enables feedback loops whereby data emanating from a PTw or a DTw is analyzed at ACP 150, leading to the generation of a new twin configuration based on design modifications. The new twin configuration may be stored in a twin configuration set and applied through the application and splice planes, yielding modified model files that are registered on the digital thread.

A virtual feedback loop 104 starts with a decision 106 to instantiate new DTw 122. A DAG of hierarchical tasks 124 allows the automated instantiation of DTw 122 within virtual environment 120, based on a twin configuration applied at a process step 108 from a twin configuration set 156. DTw 122 and/or components thereof are then tested in virtual environment 120, leading to the generation of DTw performance data 126. Concurrently, DTw 122 and/or components thereof may be tested and simulated in model plane 180 using DE software tools, giving rise to test and simulation performance data 174. Performance data 126 and 174 may be combined, compared via engine 152, and analyzed at ACP 150, potentially leading to the generation and storage of a new twin configuration. The eventual decision to instantiate a DTw from the new twin configuration completes virtual feedback loop 104.

A physical feedback loop 102 starts with a decision 106 to instantiate a new PTw 132. PTw 132 may be instantiated in a physical environment 130 from the model files of model plane 180 that are associated with an applied twin configuration from the twin configuration set 156. PTw 132 and/or components thereof are then tested in physical environment 132, leading to the generation of sensory data from PTw sensors 134 and environmental sensors 136 located in physical environment 130. This sensory data may be combined with data from external databases to yield processed sensory data 144.

Data from PTw sensors 134 may be directly added to the model files in model plane 180 by the DE software tools used in the design process of PTw 132. Alternatively, PTw sensor data may be added to digital thread 162 associated with PTw 132 directly via application plane 160. In addition, processed sensory data 144 may be integrated into IDEP 100 directly via application plane 160. For example, processed sensory data 144 may be sent to ACP 150 for analysis, potentially leading to the generation and storage of a new twin configuration. The eventual decision to instantiate a PTw from the new twin configuration completes physical feedback loop 102.

At each stage A to H of the product life cycle, the system may label one twin configuration as a current design reference, herein described as an "authoritative twin" or "authoritative reference". The authoritative twin represents the design configuration that best responds to actual conditions (i.e., the ground truth). U.S. provisional patent application No. 63/470,870 provides a more complete description of authoritative twins and their determination, and is incorporated by reference in its entirety herein.

With faster feedback loops from sensor data and expert recommendations, the system updates DTw 122 to reflect latest design changes. This update process may involve engineering teams analyzing feedback 154 and executing the changes through IDEP 100, or automated changes enabled by IDEP 100 where updates to DTw 122 are generated through programmed algorithms or AI modules. This iterative updating process continues until DTw 122 and PTw 132 are in sync and the product's performance meets desired goals. While IDEP 100 may not itself designate the authoritative reference between a DTw or a PTw, the platform provides configurable mechanisms such as policies, algorithms, voting schema, and statistical support, whereby agents may designate a new DTw as the authoritative DTw, or equivalently in what instances the PTw is the authoritative source of truth.

When significant design improvements are made, a new PTw prototype may be built based on the updated DTw. This new prototype undergoes further testing and validation, ensuring the product's performance and design align with project objectives.

Once DTw 122 and PTw 132 have been validated and optimized, the product is ready for production. A digital thread connecting all stages of development can be queried via splice plane 170 to generate documentation as needed to meet validation and verification requirements. The use of model splicing, along with the feedback architecture shown in FIG. 1, improves the efficiency of the overall product innovation process.

Interconnected DE Platform and Product Lifecycle

In FIG. 1, letter labels "A" to "H" indicate the following major steps of a product lifecycle, according to some embodiments of the current invention:

A. Digital models reside within customer environments: a product may be originally represented by model files that are accessible via software tools located within customer environments. Model plane 180 encompasses all model files (e.g., 182) associated with the product.

B. Preparatory steps for design in the digital realm: splice plane 170 encompasses model splices (e.g., 172) generated from DE model file through model splicing. Model splicing enables the integration and sharing of DE model files within a single platform, as described in detail with reference to FIGS. 7 to 9, and 11 to 33

C. Link threads as needed among model splices: to implement a product, model splices are linked through scripts within application plane 160. A digital twin (DTw) 122 englobing as-designed product features may be generated from application plane 160 for running in virtual environment 120. The complete twin configuration of a generated DTw is saved in twin configuration set 156 located at the analysis & control plane (ACP) 150. Features or parts of DTw 122 may be simulated in model plane 180, with performance data 174 accessed through splice plane 170. In one embodiment, features or parts of PTw 132 or DTw 122 configuration may be simulated outside the platform, where performance data is received by the ACP 150 for processing, in a similar way as performance data 126 received from DTw 122.

D. Finalize "As-designed": performance data 126 from DTw 122 or simulation performance data 174 attained through model plane 180 and accessed through model splicing may be collected and sent to ACP 150 for analysis. Performance data from different iterations of DTw 122 may be compared via engine 152 to design requirements. Analysis of the differences may lead to the generation of new twin configurations that are stored at twin configuration set 156. Each twin configuration in twin configuration set 156 may be applied at application plane 160 and splice plane 170 via process step 108 to instantiate a corresponding DTw. Multiple DTws may be generated and tested, consecutively or simultaneously, against the design requirements, through comparison engine 152 and analysis module 154. Verification and validation tools may be run on the various DTw iterations.

E. Finalize "As-manufactured": once a DTw 122 satisfies the design requirements, a corresponding PTw 132 prototype may be instantiated from the spliced model files (e.g., 172). Sensor data originating from the PTw 134 or from within the physical environment 136 may be collected, combined with other external data 142 (e.g., sensor data from other physical environments). The resulting processed sensory data 144 may be sent to the analysis & control plane 150 to be compared with performance data 126 from DTws and simulations (e.g., 174), leading to further DTw 122 and PTw 132 iterations populating the twin configuration set 156. Processed sensory data 144 may also be mapped to the digital threads (e.g., 164) and model splices (e.g., 172) governing the tested PTw 132 through the application plane 160.

F. Finalize "As-assembled": once the manufacturing process is completed for the various parts, as a DTw and as a PTw, the next step is to finalize the assembled configuration. This involves creating a digital representation of the assembly to ensure it meets the specified requirements. The digital assembly takes into account the dimensions and tolerances of the "as-manufactured" parts. To verify the feasibility of the digital assembly, tests are conducted using the measured data obtained from the physical assembly and its individual components. Measurement data from the physical component parts may serve as the authoritative reference for the digital assembly, ensuring alignment with the real-world configuration. The digital assembly is compared with the actual physical assembly requirements for validation of the assembled configuration. Subsequently, the digital assembly tests and configurations serve as an authoritative reference for instructions to guide the physical assembly process and ensure accurate replication. IDEP 100 components described above may be used in the assembly process. In its authoritative iteration, DTw 122 ultimately captures the precise details of the physical assembly, enabling comprehensive analysis and control in subsequent stages of the process.

G. Finalize "As-operated": to assess the performance of the physical assembly or its individual component parts, multiple digital twins 122 may be generated as needed. These digital twins are created based on specific performance metrics and serve as virtual replicas of the physical system. Digital twins 122 are continuously updated and refined in real-time using the operational data (e.g., 144) collected from monitoring the performance of the physical assembly or its components. This data may include, but are not limited to, processed sensory data, performance indicators, and other relevant information. By incorporating this real-time operational data, digital twins 122 stay synchronized with the actual system and provide an accurate representation of its operational performance. Any changes or improvements observed via sensory data 144 during the real-world operation of the assembly are reflected in DE models within the digital twins and recorded in the twin configuration set 156. This ensures that the digital twins remain up-to-date and aligned with the current state of the physical system.

H. Predictive analytics/Future performance: The design process may continue iteratively in virtual environment 120 through new DTw 122 configurations as the product is operated. Multiple digital twins may be created to evaluate the future performance of the physical assembly or its component parts based on specific performance metrics. Simulations are conducted with various control policies to assess the impact on performance objectives and costs. The outcome of these simulations helps in deciding which specific control policies should be implemented (e.g., tail volume coefficients and sideslip angle for an airplane product). The digital twin DE models (e.g., 182) are continuously updated and refined using the latest sensor data, control policies, and performance metrics to enhance their predictive accuracy. This iterative process ensures that the digital twins (e.g., 122, 156) provide reliable predictions of future performance and assist in making informed decisions.

Figure 3:
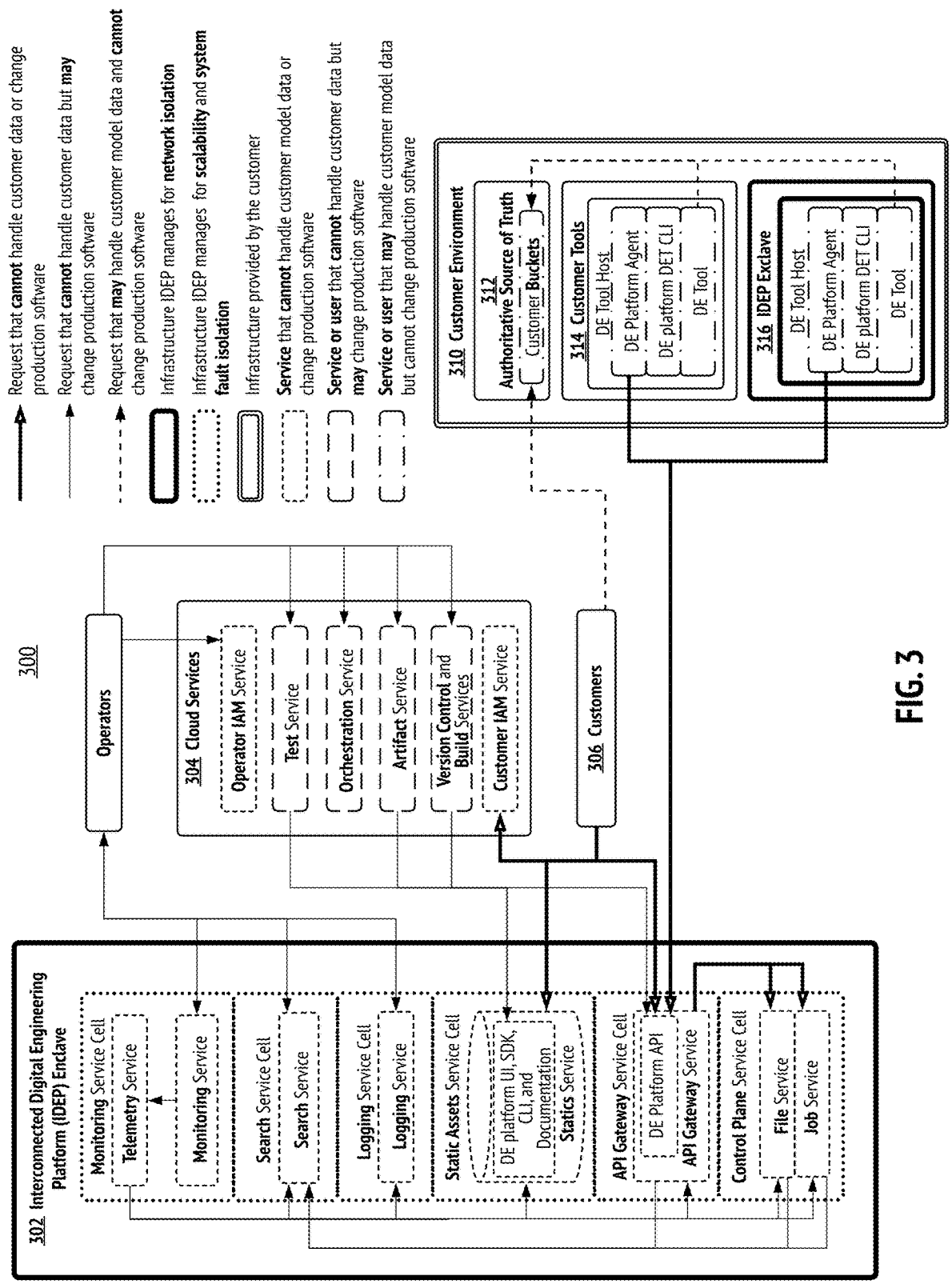
FIG. 3 shows another exemplary implementation of the IDEP illustrating its offered services and features, in accordance with some embodiments of the present invention.
Figure 4:
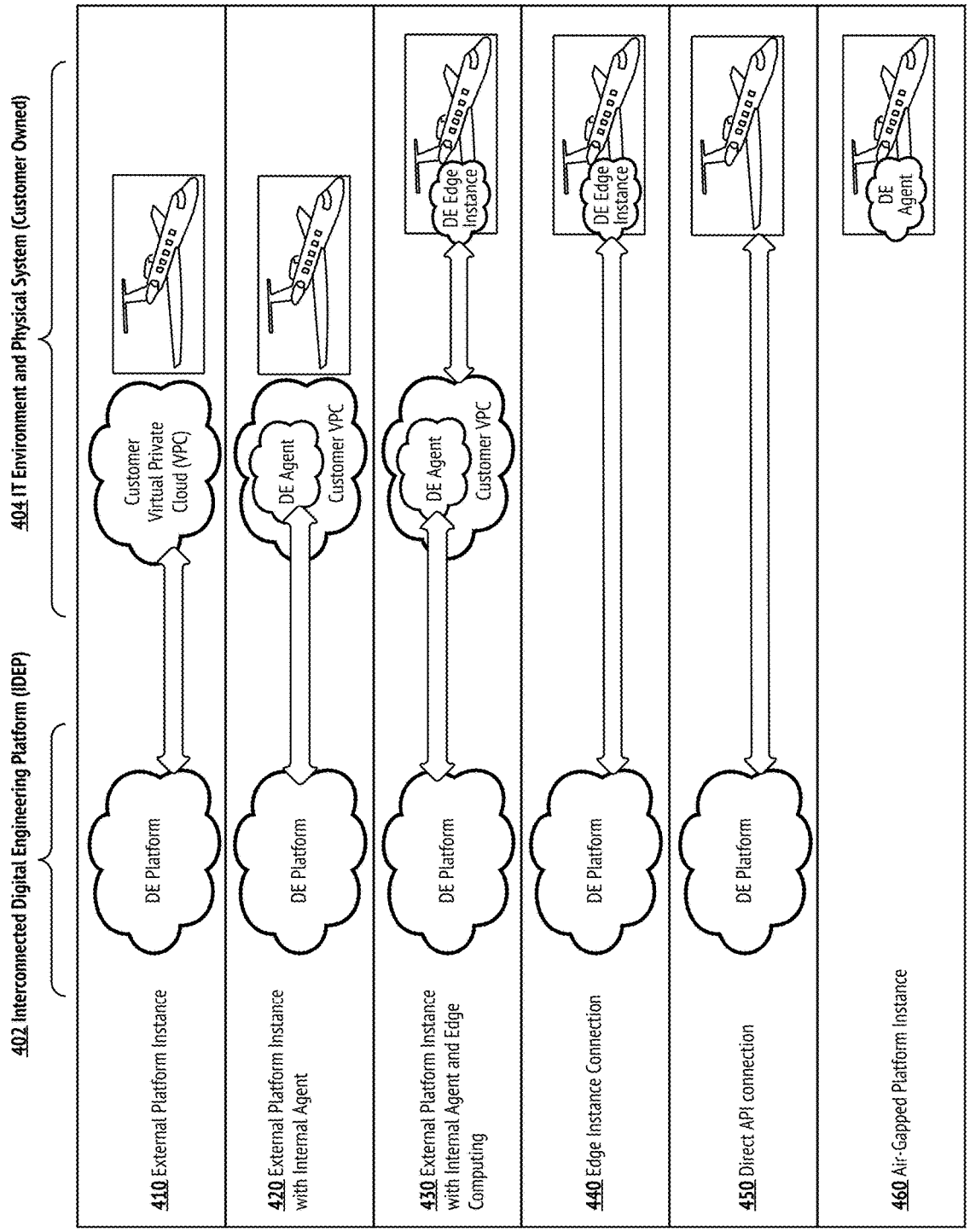
FIG. 4 shows potential scenarios for instantiating an IDEP in connection to a customer's physical system and IT environment, in accordance with some embodiments of the present invention.

The hardware components making up IDEP 100 (e.g., servers, computing devices, storage devices, network links) may be centralized or distributed among various entities, including one or more DE service providers and DE clients, as further discussed in the context of FIGS. 3 and 4. FIG. 4 shows an illustration of various potential configurations for instancing a DE platform within a customer's physical system and information technology (IT) environment, usually a virtual private cloud (VPC) protected by a firewall.

DE Documentation with Live or Magic Documents

The methods and systems described herein enable the updating and generation of DE documents using the full functionality of the IDEP shown in FIG. 1. In FIG. 1, the IDEP virtual feedback loop 104 allows the scripting of program code within a digital thread 162 for the generation, storing, and updating of digital twins 122 and twin configurations 156. Similarly, the IDEP virtual feedback loop 104 also allows the scripting of program code within a digital thread 162 for the generation, storing, and updating of DE documents. This enables the creation and maintenance of so-called live digital engineering documents.

Live DE documents are more akin to a DTw than a conventional static document in that they are configured, through a digital thread, to be continuously updated to reflect the most current changes within a particular twin configuration. In particular, an authoritative live DE document is configured to reflect the latest authoritative twin configuration. The "printing" of a live DE document corresponds to the generation of a frozen (i.e., static) time-stamped version of a live DE document. Therefore, "printing"—for a live DE document—is equivalent to "instantiation" for a DTw.

Live DE documents may also be known as magic documents as changes implemented within a twin configuration (e.g., through a modification of a model file) may appear instantaneously within the relevant data fields and sections of the live DE document. Similarly, authoritative live DE documents may also be known as authoritative magic documents as they continuously reflect data from the authoritative twin, thus always representing the authoritative source of truth.

Given the massive quantities of data and potential modifications that are carried out during a product's lifecycle, the scripts implementing live DE documentation may be configured to allow for a predefined maximum delay between the modification of a model file and the execution of the corresponding changes within a live DE document. Moreover, for similar reasons, the scripts implementing live DE documentation may be restricted to operate over a specified subset of model files within a DTw, thus reflecting changes only to key parameters and configurations of the DTw.

In one embodiment of the present invention, an IDEP script (e.g., an IDEP application) having access to model data via one or more model splices and DE document templates to create and/or update a live DE document may dynamically update the live DE document using software-defined digital threads over an IDEP platform. In such an embodiment, the IDEP script may receive user interactions dynamically. In response to the user updating data for a model and/or a specific parameter setting, the IDEP script may dynamically propagate the user's updates into the DE document through a corresponding digital thread.

In another embodiment of the present invention, the IDEP script may instantiate a DE document with sufficient specification to generate a physical twin (PTw). In such an embodiment, the IDEP script may receive a digital twin configuration of a physical twin, generate a live DE document associated with the digital twin configuration, receive a predetermined timestamp, and generate a printed DE document (i.e., a static, time-stamped version of the live DE document at the predetermined timestamp). Such an operation may be referred to as the "printing of a digital twin".

In yet another embodiment of the present invention, an IDEP script may instantiate (i.e., "print") a DE document specifying an updated digital twin upon detecting the update. In such an embodiment, the IDEP script may detect a modification of a DE model or an associated digital thread. In response to detecting the modification, the IDEP script may update relevant data fields and sections of the live DE document based on the detected modification, and generate an updated printed DE document with the updated relevant data fields and sections based on the always-updated live DE document.

In some embodiments, receiving user interactions with a DE model, modifications to a DE model, or modifications to an associated digital thread, may be carried out through a push configuration, where a model splicer or a script of the digital thread sends any occurring relevant updates to the IDEP script immediately or within a specified maximum time delay. In other embodiments, receiving user interactions with a DE model, modifications of a DE model, or modifications of an associated digital thread, may be carried out through a pull configuration, where a model splicer or a script of the digital thread flag recent modifications until the IDEP script queries relevant DE models (via their model splices) or associated digital threads, for flagged modification. In these embodiments, the IDEP script may extract the modified information from the modified DE models (via their model splices) or the modified digital threads, in order to update a live DE document. In yet other embodiments, receiving user interactions with a DE model, modifications of a DE model, or modifications of an associated digital thread, may be carried out through a pull configuration, where the IDEP script regularly checks relevant DE models (via their model splices) or associated digital threads, for modified data fields, by comparing the data found in the live DE document with regularly extracted model and digital thread data. In these embodiments, the IDEP script may use the modified data to update the live DE document.

Dynamic Document Updates

Some embodiments described herein center around documentation, or document preparation and update and on document management (e.g., for reviews). As discussed, some embodiments of the system allow for dynamic updates to documents, which pertain to software-defined digital threads in the IDEP platform and the accompanying documentation.

Use of an ML engine with the model data and templates to create and/or update documents almost instantaneously as a one-time action have been presented. Furthermore, the digital engineering platform interacts dynamically with the user. As the user interacts with the system and updates data for a model or a specific parameter setting, these changes may be propagated through the corresponding digital threads and to the associated documentation. The AI architectures involved include locally-instanced large language model (LLMs, for data security reasons) as well as non-LLM approaches (e.g., NLP-based), in order to create, update, or predict documentation in the form of sentences, paragraphs, and whole documents. At the same time, trying to update the entire system of digital threads for every update may be prohibitively slow and may present security risks to the system. Generating live DE documents that are updated based on a subset of a system's DE models and within a maximum time delay may therefore be more efficient.

Interconnected Digital Engineering and Certification Ecosystem

Figure 2:
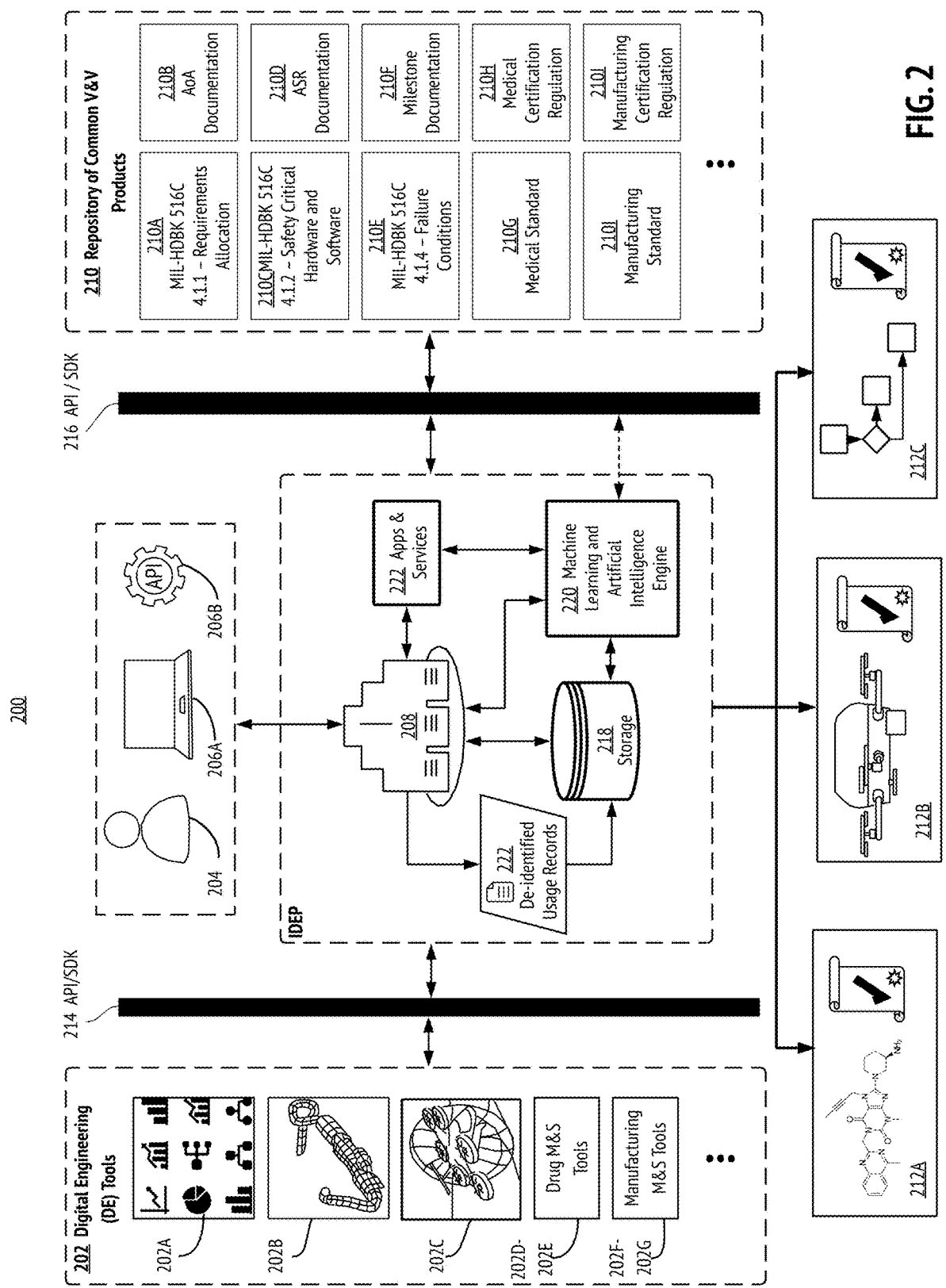
FIG. 2 shows an exemplary implementation of the IDEP as an interconnected digital engineering (DE) and certification ecosystem, and exemplary digitally certified products, in accordance with some embodiments of the present invention.

FIG. 2 shows an exemplary implementation of the IDEP as an interconnected digital engineering (DE) and certification ecosystem 200, and exemplary digitally certified products, in accordance with some embodiments of the present invention. Interconnected DE and certification ecosystem 200 may be viewed as a particular instantiation or implementation of IDEP 100 shown in FIG. 1. The IDEP may also be referred to as a "DE Metaverse."

Interconnected DE and certification ecosystem 200 is a computer-based system that links models and simulation tools with their relevant requirements in order to meet verification, validation, and certification purposes. Verification refers to methods of evaluating whether a product, service, or system meets specified requirements and is fit for its intended purpose. For example, in the aerospace industry, a verification process may include testing an aircraft component to ensure it can withstand the forces and conditions it will encounter during flight. Verification also includes checking externally against customer or stakeholder needs. Validation refers to methods of evaluating whether the overall performance of a product, service, or system is suitable for its intended use, including its compliance with regulatory requirements and its ability to meet the needs of its intended users. Validation also includes checking internally against specifications and regulations. Interconnected DE and certification ecosystem 200 as disclosed herein is designed to connect and bridge large numbers of disparate DE tools and models from multitudes of engineering domains and fields, or from separate organizations who may want to share models with each other but have no interactions otherwise. In various embodiments, the system implements a robust, scalable, and efficient DE model collaboration platform, with extensible model splices having data structures and accompanying functions for widely distributed DE model types and DE tools, an application layer that links or connects DE models via APIs, digital threads that connect live engineering model files for collaboration and sharing, digital documentation management to assist with the preparation of engineering and certification documents appropriate for verification and validation (V&V) purposes, and AI-assistance with the functionalities of the aforementioned system components.

More specifically, FIG. 2 shows an example of an interconnected DE and certification ecosystem and examples of digitally certified products 212A, 212B, and 212C (collectively referred to as digitally certified products 212). For example, in some implementations, digitally certified product 212A may be an unmanned aerial vehicle (UAV) or other aircraft, digitally certified product 212B may be a drug or other chemical or biologic compound, and the digitally certified product 212C may be a process such as a manufacturing process. In general, the digitally certified products 212 can include any product, process, or solution that can be developed, tested, or certified (partially or entirely) using DE tools such as 202. In some implementations, digitally certified products 212 may not be limited to physical products, but can include non-physical products such as methodologies, processes and software, etc. While physical and physically-interacting systems often require multiple DE tools to assess for compliance with common V&V products simply by virtue of the need for modeling and simulation (M&S), many complex non-physical systems may also require multiple DE tools for product development, testing, and/or certification. With this in mind, various other possibilities for digitally certified products will be recognized by one of ordinary skills in the art. The inclusion of regulatory and certification standards, compliances, calculations, and tests (e.g., for the development, testing, and certification of products and/or solutions) enables users to incorporate relevant regulatory and certification standards, compliances, calculations, and test data directly into their DE workflow. Regulatory and certification standards, compliances, calculations, and tests are sometimes referred to herein as "common validation and verification (V&V) products."

Digitally certified products 212 in FIG. 2 may be designed and/or certified using interconnected DE and certification ecosystem 200. Interconnected DE and certification ecosystem 200 may include a user device 206A, API 206B, or other similar human-to-machine, or machine-to-machine communication interfaces operated by a user. A user may be a human 204 of various skill levels, or artificial users such as algorithms, artificial intelligence, or other software that interface with ecosystem 200 through API 206B. Ecosystem 200 may further comprise a computing and control system 208 ("computing system 208" hereinafter) connected to and/or including a data storage unit 218, an artificial intelligence (AI) engine 220, and an application and service layer 222. In some embodiments, the artificial intelligence (AI) engine 220 is a machine learning (ML) engine. References to "machine learning engine 220" or "ML engine 220" may be extended to artificial intelligence (AI) engines 220 more generally. For the purposes of clarity, any user selected from various potential human or artificial users are referred to herein simply as the user 204. In some implementations, computing system 208 may be a centralized computing system; in some implementations, computing system 208 may be a distributed computing system. In some cases, user 204 may be considered part of ecosystem 200, while in other implementations, user 204 may be considered separately from ecosystem 200. Ecosystem 200 may include one or more DE tools 202, such as data analysis tool 202A, computer-aided design (CAD) and finite element analysis (FEA) tool 202B, simulation tool 202C, drug modeling and simulation (M&S) tools 202D-202E, manufacturing M&S tools 202F-202G, etc. Ecosystem 200 may also include a repository of common V&V products 210, such as regulatory standards 210A-210F related to the development and certification of a UAV, medical standard 210G (e.g., CE marking (Europe), FCC Declaration of Conformity (USA), IECEE CB Scheme (Europe, North America, parts of Asia & Australia), CDSCO (India), FDA (USA), etc.), medical certification regulation 210H (e.g., ISO 13485, ISO 14971, ISO 9001, ISO 62304, ISO 10993, ISO 15223, ISO 11135, ISO 11137, ISO 11607, IEC 60601, etc.), manufacturing standard 210I (e.g., ISO 9001, ISO 9013, ISO 10204, EN 1090, ISO 14004, etc.), and manufacturing certification regulation 210J (e.g., General Certification of Conformity (GCC), etc.), etc.

In FIG. 2, computing system 208 is centrally disposed within the architecture and is configured to communicate with (e.g., receive data from and transmit data to) user device 206A or API 206B such as an API associated with an artificial user, DE tools 202 via an API or software development kit (SDK) 214, and repository of common V&V products 210 via an API/SDK interface 216. For example, computing system 208 may be configured to communicate with user device 206A and/or API 206B to send or receive data corresponding to a prototype of a design, information about a user (e.g., user credentials), engineering-related inputs/outputs associated with DE tools 202, digitized common V&V products, an evaluation of a product design, user instructions (e.g., search requests, data processing instructions, etc.), and more. Computing system 208 may also be configured to communicate with one or more DE tools 202 to send engineering-related inputs for executing analyses, models, simulations, tests, etc. and to receive engineering-related outputs associated with the results. Computing system 208 may also be configured to communicate with repository of common V&V products 210 to retrieve data corresponding to one or more digitized common V&V products 210 and/or upload new common V&V products, such as those received from user 204, to repository of common V&V products 210. All communications may be transmitted and corroborated securely, for example, using methods relying on zero-trust security. In some implementations, the computing system of the ecosystem may interface with regulatory and/or certification authorities (e.g., via websites operated by the authorities) to retrieve digitized common V&V products published by the regulatory authorities that may be relevant for a product that a user is designing. In some implementations, the user may upload digitized common V&V products to the ecosystem themselves.

Computing and control system 208 may process and/or store the data that it receives to perform analysis and control functionalities, and in some implementations, may access machine learning engine 220 and/or application and service layer 222, to identify useful insights based on the data, as further described herein. The central disposition of computing system 208 within the architecture of the ecosystem has many advantages including reducing the technical complexity of integrating the various DE tools; improving the product development experience of user 204; intelligently connecting common V&V products such as standards 210A-210F to DE tools 202 most useful for satisfying requirements associated with the common V&V products; and enabling the monitoring, storing, and analysis of the various data that flows between the elements of the ecosystem throughout the product development process. In some implementations, the data flowing through and potentially stored by the computing system 208 can also be auditable to prevent a security breach, to perform data quality control, etc. Similarly, any analysis and control functions performed via computing system 208 may be tracked for auditability and traceability considerations.

Referring to one particular example shown in FIG. 2, user 204 may use the DE and certification ecosystem to produce a digitally certified UAV 212B. For example, user 204 may be primarily concerned with certifying the UAV as satisfying the requirements of a particular regulatory standard 210E relating to failure conditions of the UAV (e.g., "MIL-HDBK 516C 4.1.4—Failure Conditions"). In this usage scenario, user 204 may develop a digital prototype of the UAV on user device 206A or using API 206B and may transmit prototype data (e.g., as at least one of a CAD file, a MBSE file, etc.) to computing system 208. Along with the prototype data, user 204 can transmit, via user device 206A, additional data including an indication of the common V&V product that user 204 is interested in certifying the product for (e.g., regulatory standard 210E), user credential information for accessing one or more capabilities of computing system 208, and/or instructions for running one or more digital models, tests, and/or simulations using a subset of DE tools 202.

Referring to another example shown in FIG. 2, user 204 can use the DE and certification ecosystem to produce a digitally certified drug, chemical compound, or biologic 212A. For example, user 204 may be primarily concerned with certifying drug, chemical compound, or biologic 212A as satisfying the requirements of a particular medical standard 210G and medical certification regulation 210H. In this usage scenario, user 204 can develop a digital prototype of the drug, chemical compound, or biologic on user device 206A or using API 206B and can transmit the prototype data (e.g., as a molecular modeling file) to computing system 208. Along with the prototype data, user 204 can transmit, via user device 206A, additional data including an indication of the common V&V products that user 204 is interested in certifying the product for (e.g., medical standard 210G and medical certification regulation 210H), user credential information for accessing one or more capabilities of computing system 208, and/or instructions for running one or more digital models, tests, and/or simulations using a subset of DE tools 202 (e.g., drug M&S tools 202D-202E).

Referring to yet another example shown in FIG. 2, user 204 can use the digital engineering and certification ecosystem to produce a digitally certified manufacturing process 212C. For example, user 204 may be primarily concerned with certifying manufacturing process 212C as satisfying the requirements of a particular manufacturing standard 210I and manufacturing certification regulation 210J. In this usage scenario, user 204 can develop a digital prototype of the manufacturing process on user device 206A or using API 206B and can transmit the prototype data to computing system 208. Along with the prototype data, user 204 can transmit, via the user device 206A, additional data including an indication of the common V&V products that user 204 is interested in certifying the process for (e.g., manufacturing standard 210I and manufacturing certification regulation 210J), user credential information for accessing one or more capabilities of computing system 208, and/or instructions for running one or more digital models, tests, and/or simulations using a subset of DE tools 202 (e.g., manufacturing M&S tools 202F-202G).

In any of the aforementioned examples, computing system 208 can receive the data transmitted from user device 206A and/or API 206B and can process the data to evaluate whether the common V&V product of interest (e.g., regulatory standard 210E, medical standard 210G, medical certification regulation 210H, manufacturing standard 210I, manufacturing certification regulation 210J, etc.) is satisfied by the user's digital prototype, in the context of analysis and control plane 150 shown in FIG. 1. For example, this can involve communicating with the repository of common V&V products 210 via the API/SDK 216 to retrieve the relevant common V&V product of interest and processing the regulatory and/or certification data associated with the common V&V product to identify one or more requirements for the UAV prototype; the drug, chemical compound, or biologic prototype; the manufacturing process prototype; etc. In some implementations, repository of common V&V products 210 can be hosted by a regulatory and/or certification authority (or another third party), and retrieving the regulatory and/or certification data can involve using API/SDK 216 to interface with one or more data resources maintained by the regulatory and/or certification authority (or the another third party). In some implementations, the regulatory and/or certification data can be provided directly by user 204 via user device 206A and/or API 206B (e.g., along with the prototype data).

Evaluating whether the common V&V product of interest is satisfied by the user's digital prototype can also involve processing the prototype data received from user device 206A or API 206B to determine if the one or more identified requirements are actually satisfied. In some implementations, computing system 208 can include one or more plugins, local applications, etc. to process the prototype data directly at the computing system 208. For example, model splicing and digital threading applications are discussed in detail later with reference to FIG. 6 to 9. In some implementations, the computing system can simply pre-process the received prototype data (e.g., to derive inputs for DE tools 202) and can then transmit instructions and/or input data to a subset of DE tools 202 via API/SDK 214 for further processing.

Not all DE tools 202 are necessarily required for the satisfaction of particular regulatory and/or certification standards. Therefore, in the UAV example provided in FIG. 2, computing system 208 may determine that only a data analysis tool 202A and a finite element analysis tool 202B are required to satisfy regulatory standard 210E for failure conditions. In the drug, chemical compound, or biologic example provided in FIG. 2, computing system 208 may determine that only drug M&S tools 202D-202E are required to satisfy medical standard 210G and medical certification regulation 210H. In the manufacturing process example provided in FIG. 2, computing system 208 may determine that only manufacturing M&S tools 202F-202G are required to satisfy manufacturing standard 210I and manufacturing certification regulation 210J. In other implementations, user 204 may themselves identify the particular subset of DE tools 202 that should be used to satisfy the common V&V product of interest, provided that user 204 is a qualified subject matter expert (SME). In other implementations, user 204 may input to computing system 208 some suggested DE tools 202 to satisfy a common V&V product of interest, and computing system 208 can recommend to user 204 a modified subset of DE tools 202 for final approval by user 204, provided that user 204 is a qualified SME. After a subset of DE tools 202 has been identified, computing system 208 can then transmit instructions and/or input data to the identified subset of DE tools 202 to run one or more models, tests, and/or simulations. The results (or "engineering-related data outputs" or "digital artifacts") of these models, tests, and/or simulations can be transmitted back and received at computing system 208.

In still other implementations, user 204 may input a required DE tool such as 202F for meeting a common V&V product 210I, and the computing system 208 can determine that another DE tool such as 102G is also required to satisfy common V&V product 210I. The computing system can then transmit instructions and/or input data to both DE tools (e.g., 202F and 202G), and the outputs of these DE tools can be transmitted and received at computing system 208. In some cases, the input data submitted to one of the DE tools (e.g., 202G) can be derived (e.g., by computing system 208) from the output of another of the DE tools (e.g., 202F).

After receiving engineering-related data outputs or digital artifacts from DE tools 202, computing system 208 can then process the received engineering-related data outputs to evaluate whether or not the requirements identified in the common V&V product of interest (e.g., regulatory standard 210E, medical standard 2110G, medical certification regulation 210H, manufacturing standard 210I, manufacturing certification regulation 210J, etc.) are satisfied. For example, applications and services 222 may provide instructions for orchestrating validation or verification activities. In some implementations, computing system 208 can generate a report summarizing the results of the evaluation and can transmit the report to device 206A or API 206B for review by user 204. If all of the requirements are satisfied, then the prototype can be certified, resulting in digitally certified product 212 (e.g., digitally certified drug, chemical compound, or biologic 212A; digitally certified UAV 212B; digitally certified manufacturing process 212C, etc.). However, if some of the regulatory requirements are not satisfied, then additional steps may need to be taken by user 204 to certify the prototype of the product. In some implementations, the report that is transmitted to the user can include recommendations for these additional steps (e.g., suggesting one or more design changes, suggesting the replacement of one or more components with a previously designed solution, suggesting one or more adjustments to the inputs of the models, tests, and/or simulations, etc.). If the requirements of a common V&V product are partially met, or are beyond the collective capabilities of distributed engineering tools 202, computing systems 208 may provide user 204 with a report recommending partial certification, compliance, or fulfillment of a subset of the common V&V products (e.g., digital certification of a subsystem or a sub-process of the prototype). The process of generating recommendations for user 204 is described in further detail below.

In response to reviewing the report, user 204 can make design changes to the digital prototype locally and/or can send one or more instructions to computing system 208 via user device 206A or API 206B. These instructions can include, for example, instructions for computing system 208 to re-evaluate an updated prototype design, use one or more different DE tools 202 for the evaluation process, and/or modify the inputs to DE tools 202. Computing system 208 can, in turn, receive the user instructions, perform one or more additional data manipulations in accordance with these instructions, and provide user 204 with an updated report. Through this iterative process, user 204 can utilize the interconnected digital engineering and certification ecosystem to design and ultimately certify (e.g., by providing certification compliance information) the prototype (e.g., the UAV prototype, drug prototype, manufacturing process prototype, etc.) with respect to the common V&V product of interest. Importantly, since all of these steps occur in the digital world (e.g., with digital prototypes, digital models/ tests/simulations, and digital certification), significant amount of time, cost, and materials can be saved in comparison to a process that would involve the physical prototyping, evaluation and/or certification of a similar UAV, drug, manufacturing process, etc. If the requirements associated with a common V&V product are partially met, or are beyond the collective capabilities of DE tools 202, computing system 208 may provide user 204 with a report recommending partial certification, compliance or fulfillment of a subset of the common V&V products (e.g., digital certification of a subsystem or a sub-process of the prototype).

While the examples described above focus on the use of the interconnected digital engineering and certification ecosystem by a single user, additional advantages of the ecosystem can be realized through the repeated use of the ecosystem by multiple users. As mentioned above, the central positioning of computing system 208 within the architecture of the ecosystem enables computing system 208 to monitor and store the various data flows through the ecosystem. Thus, as an increasing number of users utilize the ecosystem for digital product development, data associated with each use of the ecosystem can be stored (e.g., in storage 218), traced (e.g., with metadata), and analyzed to yield various insights, which can be used to further automate the digital product development process and to make the digital product development process easier to navigate for non-subject matter experts.

Indeed, in some implementations, user credentials for user 204 can be indicative of the skill level of user 204, and can control the amount of automated assistance the user is provided. For example, non-subject matter experts may only be allowed to utilize the ecosystem to browse pre-made designs and/or solutions, to use DE tools 202 with certain default parameters, and/or to follow a predetermined workflow with automated assistance directing user 204 through the product development process. Meanwhile, more skilled users may still be provided with automated assistance, but may be provided with more opportunities to override default or suggested workflows and settings.

In some implementations, computing system 208 can host applications and services 222 that automate or partially automate components of common V&V products; expected or common data transmissions, including components of data transmissions, from user 204; expected or common interfaces and/or data exchanges, including components of interfaces, between various DE tools 202; expected or common interfaces and/or data exchanges, including components of interfaces, with machine learning (ML) models implemented on computing system 208 (e.g., models trained and/or implemented by the ML engine 220); and expected or common interfaces and/or data exchanges between the applications and services themselves (e.g., within applications and services layer 222).

In some implementations, the data from multiple uses of the ecosystem (or a portion of said data) can be aggregated to develop a training dataset. For example, usage records 222 collected via computing system 208 may be de-identified or anonymized, before being added to the training set. Such usage records may comprise model parameters and metadata, tool configurations, common V&V product matching to specific models or tools, user interactions with the system including inputs and actions, and other user-defined or system-defined configurations or decisions in using the ecosystem for digital engineering and certification. For instance, an exemplary de-identified usage record may comprise the combination of a specific DE tool, a specific target metric, a specific quantity deviation, and a corresponding specific user update to a DE model under this configuration. Another exemplary de-identified usage record may comprise a user-identified subset of DE tools 202 that should be used to satisfy a common V&V product of interest.

This training dataset can then be used to train ML models (e.g., using ML engine 220) to learn the steps and actions for certification processes and to perform a variety of tasks including the identification of which of DE tools 202 to use to satisfy a particular common V&V product; the identification of specific models, tests, and/or simulations (including inputs to them) that should be performed using DE tools 202; the identification of the common V&V products that need to be considered for a product of a particular type; the identification of one or more recommended actions for user 204 to take in response to a failed regulatory requirement; the estimation of model/test/simulation sensitivity to particular inputs; etc. The outputs of the trained ML models can be used to implement various features of the interconnected digital engineering and certification ecosystem including automatically suggesting inputs (e.g., inputs to DE tools 202) based on previously entered inputs, forecasting time and cost requirements for developing a product, predictively estimating the results of sensitivity analyses, and even suggesting design changes, original designs or design alternatives (e.g. via assistive or generative AI) to a user's prototype to overcome one or more requirements (e.g., regulatory and/or certification requirements) associated with a common V&V product. In some implementations, with enough training data, ML engine 220 may generate new designs, models, simulations, tests, common V&V products and/or digital threads on its own based on data collected from multiple uses of the ecosystem. Furthermore, such new designs, models, simulations, tests, common V&V products and digital threads generated by ML engine 220, once approved and adjusted by a user, may be added to the training set for further fine-tuning of ML algorithms in a reinforcement learning setup.

As shall be discussed in the context of FIGS. 7 to 9 and 11 to 33, the aforementioned collection of training datasets and the training of ML and AI modules including ML engine 220 may be enabled by model splicing technologies. Model splicing, as described herein, allows the scripting of DE model operations encompassing disparate DE tools into a corpus of normative program code, and facilitates the code-defined digital threading of a large space of DE activities involving DE models across different disciplines. ML and AI techniques may be used to create scripts to carry out almost any DE task and to execute any digital thread, allowing for programmable, machine-learnable, and dynamic changes to DE model files, digital threads, and ultimately to digital or physical twins, throughout the product life cycle.

For example, in the embodiment shown in FIG. 2, ML engine 220 may manage or orchestrate the interactions between spliced DE models, DE tools, and common V&V products (e.g., DE requirements), based on digital thread options specific to user's intent and input. Sample DE tasks that may be carried out by ML engine 220 include, but are not limited to, (1) aligning models/analysis to certification lifecycle requirement steps, (2) optimizing compute by determining the appropriate fidelity of each model, (3) optimizing compute resources for specific tools/models, or (4) optimizing compute resources across multiple models. ML-enabled executions of DE tasks are not limited to certification or resource optimization, but encompass the whole DE space of operations. Rather, ML engine 220 may act as an AI multiplexer for the DE platform.

In addition to storing usage data to enable the development of ML models, previous prototype designs and/or solutions (e.g., previously designed components, systems, models, simulations and/or other engineering representations thereof) can be stored within the ecosystem (e.g., in storage 218) to enable users to search for and build upon the work of others. For example, previously designed components, systems, models, simulations and/or other engineering representations thereof can be searched for by user 204 and/or suggested to user 204 by computing system 208 in order to satisfy one or more requirements associated with a common V&V product. The previously designed components, systems, models, simulations and/or other engineering representations thereof can be utilized by user 204 as is, or can be utilized as a starting point for additional modifications. This store, or repository, of previously designed components, systems, models, simulations and/or other engineering representations thereof (whether or not they were ultimately certified) can be monetized to create a marketplace of digital products, which can be utilized to save time during the digital product development process, inspire users with alternative design ideas, avoid duplicative efforts, and more. In some implementations, data corresponding to previous designs and/or solutions may only be stored if the user who developed the design and/or solution opts to share the data. In some implementations, the repository of previous designs and/or solutions can be containerized for private usage within a single company, team, organizational entity, or technical field for private usage (e.g., to avoid the unwanted disclosure of confidential information). In some implementations, user credentials associated with user 204 can be checked by computing system 208 to determine which designs and/or solutions stored in the repository can be accessed by user 204. In some implementations, usage of the previously designed components, systems, models, simulations and/or other engineering representations thereof may be available only to other users who pay a fee for a usage.

Exemplary IDEP Implementation Architecture with Services and Features

FIG. 3 shows another exemplary implementation of the IDEP illustrating its offered services and features, in accordance with some embodiments of the present invention. Specifically, an exemplary implementation architecture diagram 300 is shown in FIG. 3 to include multiple illustrative components: an IDEP enclave 302, cloud services 304, and a customer environment 310 which optionally includes an IDEP exclave 316. This exemplary architecture 300 for the IDEP is designed in accordance with zero-trust security principles and is further designed to support scalability as well as robust and resilient operations. IDEP enclave 302 and IDEP exclave 316 together instantiate IDEP 100 shown in FIG. 1, with IDEP exclave 316 implementing model splicing and splice plane 170 in some embodiments of the present invention. An enclave is an independent set of cloud resources that are partitioned to be accessed by a single customer (i.e., single-tenant) or market (i.e., multi-tenant) that does not take dependencies on resources in other enclaves. An exclave is a set of cloud resources outside enclaves managed by the IDEP, to perform work for individual customers. Examples of exclaves include virtual machines (VMs) and/or servers that the IDEP maintains to run DE tools for customers who need such services.

In particular, IDEP enclave or DE platform enclave 302 may serve as a starting point for services rendered by the IDEP, and may be visualized as a central command and control hub responsible for the management and orchestration of all platform operations. For example, enclave 302 may be implemented using computer system 208 of the interconnected DE and certification ecosystem shown in FIG. 2. DE platform enclave 302 is designed to integrate both zero-trust security models and hyperscale capabilities, resulting in a secure and scalable processing environment tailored to individual customer needs. Zero-trust security features include, but are not limited to, strict access control, algorithmic impartiality, and data isolation. Enclave 302 also supports an ML engine such as 220 for real-time analytics, auto-scaling features for workload adaptability, and API-based interoperability with third-party services. Security and resource optimization are enhanced through multi-tenancy support, role-based access control, and data encryption both at rest and in transit. DE platform enclave 302 may also include one or more of the features described below.

First, IDEP enclave 302 may be designed in accordance with zero-trust security principles. In particular, DE platform enclave 302 may employ zero-trust principles to ensure that no implicit trust is assumed between any elements, such as digital models, platform agents or individual users (e.g., users 204) or their actions, within the system. That is, no agent may be inherently trusted and the system may always authenticate or authorize for specific jobs. The model is further strengthened through strict access control mechanisms, limiting even the administrative team (e.g., a team of individuals associated with the platform provider) to predetermined, restricted access to enclave resources. To augment this robust security stance, data encryption is applied both at rest and in transit, effectively mitigating risks of unauthorized access and data breaches.

IDEP enclave 302 can also be designed to maintain isolation and independence. A key aspect of the enclave's architecture is its focus on impartiality and isolation. DE enclave 302 disallows cryptographic dependencies from external enclaves and enforces strong isolation policies. The enclave's design also allows for both single-tenant and multi-tenant configurations, further strengthening data and process isolation between customers 306 (e.g., users 204). Additionally, DE enclave 302 is designed with decoupled resource sets, minimizing interdependencies and thereby promoting system efficiency and autonomy.

IDEP enclave 302 can further be designed for scalability and adaptability, aligning well with varying operational requirements. For example, the enclave 302 can incorporate hyperscale-like properties in conjunction with zero-trust principles to enable scalable growth and to handle high-performance workloads effectively.

IDEP enclave 302 can further be designed for workflow adaptability, accommodating varying customer workflows and DE models through strict access control mechanisms. This configurability allows for a modular approach to integrate different functionalities ranging from data ingestion to algorithm execution, without compromising on the zero-trust security posture. Platform 300's adaptability makes it highly versatile for a multitude of use-cases, while ensuring consistent performance and robust security.

IDEP enclave 302 can further be designed to enable analytics for robust platform operations. At the core of the enclave's operational efficiency is a machine learning engine (e.g., machine learning engine 220) capable of performing real-time analytics. This enhances decision-making and operational efficiency across platform 300. Auto-scaling mechanisms can also be included to enable dynamic resource allocation based on workload demand, further adding to the platform's responsiveness and efficiency.

In the exemplary embodiment shown in FIG. 3, IDEP enclave 302 includes several components as described in further detail herein.

A "Monitoring Service Cell. may provide "Monitoring Service" and "Telemetry Service." A cell may refer to a set of microservices, for example, a set of microservices executing within a kubernetes pod. These components focus on maintaining, tracking and analyzing the performance of platform 300 to ensure good service delivery, including advanced machine learning capabilities for real-time analytics. A "Search Service Cell" provides "Search Service" to aid in the efficient retrieval of information from DE platform 300, adding to its overall functionality. A "Logging Service Cell" and a "Control Plane Service Cell" provides "Logging Service," "File Service", and "Job Service" to record and manage operational events and information flow within platform 300, and instrumental in the functioning of platform 300. A "Static Assets Service Cell," provides "Statics Service", and may house user interface, SDKs, command line interface (CLI), and documentation for platform 300. An "API Gateway Service Cell" provides "API Gateway Service," and may provide DE platform API(s) (e.g., APIs 214, 216) and act as a mediator for requests between the client applications (e.g., DE tools 202, the repository of common V&V products 210, etc.) and the platform services. In some embodiments, the API gateway service cell may receive and respond to requests from agents such as DE platform exclave 316 to provide splice functions for model splicing purposes.

As shown in FIG. 3, the architecture of DE platform 300 may also include a cloud services 304 that provide services which cannot interact with customer data but can modify the software for the orchestration of DE platform operations. In example implementations, several cloud resources provide support and foundational services to the platform. For example, in the embodiment of the DE platform 300 shown in FIG. 3, cloud services 304 includes a "Customer Identity and Access Management (IAM) Service" that ensures secure and controlled access to platform 300. Cloud services 304 also includes a "Test Service" that tests tools to validate platform operations. Cloud services 304 may also include an "Orchestration Service" that controls and manages the lifecycle of containers on the platform 300. Cloud services 304 may also include an "Artifact Service" and "Version Control and Build Services," which may be used to maintain the evolution of projects, codes, and instances in the system, while also managing artifacts produced during the product development process.

As shown in FIG. 3, the architecture of DE platform 300 may also include a customer environment 310 with an "Authoritative Source of Truth" 312, customer tools 314, and an optional DE platform exclave 316. Customer environment 310 is where customer data resides and is processed in a zero-trust manner by DE platform 300. As described previously, DE platform enclave 302, by focusing on both zero-trust principles and hyperscale-like properties, provides a robust and scalable environment for the secure processing of significant workloads, according to the customer's unique needs. In some examples, DE platform exclave 316 may be situated within customer environment 310 in order to assist the customer(s) 306 with their DE tasks and operations, including model splicing and digital threading.

When a customer 306 (e.g., user 204) intends to perform a DE task using DE platform 300 (e.g., IDEP 100), typical operations may include secure data ingestion and controlled data retrieval. Derivative data generated through the DE operations, such as updated digital model files or revisions to digital model parameters, may be stored only within customer environment 310, and DE platform 300 may provide tools to access the metadata of the derivative data. Here metadata refers to data that can be viewed without opening the original data, and may comprise versioning information, time stamps, access control properties, and the like. Example implementations may include secure data ingestion, which utilizes zero-trust principles to ensure customer data is securely uploaded to customer environment 310 through a pre-validated secure tunnel, such as Secure Socket Layer (SSL) tunnel. This can enable direct and secure file transfer to a designated cloud storage, such as a simple storage service (S3) bucket, within customer environment 310. Example implementations may also include controlled data retrieval, in which temporary, pre-authenticated URLs generated via secure token-based mechanisms are used for controlled data access, thereby minimizing the risk of unauthorized interactions. Example implementations may also include immutable derivative data, with transformed data generated through operations like data extraction being securely stored within customer environment 310 while adhering to zero-trust security protocols. Example implementations may also include tokenization utility, in which a specialized DE platform tool referred to as a "tokenizer" is deployed within customer environment 310 for secure management of derivative metadata, conforming to zero-trust guidelines.

Customer environment 310 may interact with other elements of secure DE platform 300 and includes multiple features that handle data storage and secure interactions with platform 300. For example, one element of the customer environment 310 is "Authoritative Source of Truth" 312, which is a principal repository for customer data, ensuring data integrity and accuracy. Nested within this are "Customer Buckets" where data is securely stored with strict access controls, limiting data access to authorized users or processes through pre-authenticated URL links. This setup ensures uncompromising data security within customer environment 310 while providing smooth interactions with other elements of DE platform 300.

Customer environment 310 may also include additional software tools such as customer tools 314 that can be utilized based on specific customer requirements. For example, a "DE Tool Host" component may handle necessary DE applications for working with customer data. It may include a DE Tools Command-Line Interface (DET CLI), enabling user-friendly command-line operation of DE tools (e.g., DE tools 102). A "DE platform Agent" ensures smooth communication and management between customer environment 310 and elements of DE platform 300. Furthermore, there can be another set of optional DE tools designed to assist customer-specific DE workflows. Native DE tools are typically access-restricted by proprietary licenses and end-user license agreements paid for by the customer. IDEP platform functions call upon native DE tools that are executed within customer environment 310, therefore closely adhering to the zero-trust principle of the system design. Exemplary DE tools include, but are not limited to, proprietary and open-source versions of model-based systems engineering (MBSE) tools, augmented reality (AR) tools, computer aided design (CAD) tools, data analytics tools, modeling and simulation (M&S) tools, product lifecycle management (PLM) tools, multi-attribute trade-space tools, simulation engines, requirements model tools, electronics model tools, test-plan model tools, cost-model tools, schedule model tools, supply-chain model tools, manufacturing model tools, cyber security model tools, or mission effects model tools.

In some cases, an optional "IDEP Exclave" 316 may be employed within customer environment 310 to assist with customer DE tasks and operations, supervise data processing, and rigorously adhering to zero-trust principles while delivering hyperscale-like platform performance. IDEP exclave 316 is maintained by the IDEP to run DE tools for customers who need such services. IDEP exclave 316 may contain a "DE Tool Host" that runs DE tools and a "DE Platform Agent" necessary for the operation. Again, native DE tools are typically access-restricted by proprietary licenses and end-user license agreements paid for by the customer. IDEP exclave 316 utilities and manages proprietary DE tools hosted with customer environment 310, for example, to implement model splicing and digital threading functionalities.

IDEP Deployment Scenarios

FIG. 4 shows potential scenarios for instantiating an IDEP in connection to a customer's physical system and IT environment, in accordance with some embodiments of the present invention. Specifically, FIG. 4 illustrates various potential configurations for instancing or instantiating an IDEP ("DE platform) 402 in connection to a customer's IT environment and physical system 404. The IT environment may be located on a virtual private cloud (VPC) protected by a firewall. The physical system may refer to a physical twin as discussed with reference to FIG. 1. In some embodiments, IDEP 402 may be instanced as an enclave such as 302 shown in FIG. 3. For example, IDEP 402 may be instanced on the cloud, possibly in a software-as-a-service (SaaS) configuration. The platform instances in these embodiments include software and algorithms, and may be described as follows:

1. External Platform Instance 410: This option showcases the IDEP as a separate platform instance. The platform interacts with the physical system through the customer's virtual environment, or a Customer Virtual Private Cloud ("Customer VPC"), which is connected to the physical system.
2. External Platform Instance 420 with Internal Agent: The IDEP is instantiated as a separate platform, connected to an internal agent ("DE Agent") wholly instanced within the Customer VPC. For example, the IDEP may be instantiated as enclave 302, and the DE agent may be instantiated as exclave 316 within the Customer VPC linked to the physical system.
3. External Platform Instance with Internal Agent and Edge Computing 430: This scenario displays the IDEP as a separate instantiation, connected to an internal DE Agent wholly instanced within the Customer VPC, which is further linked to an edge instance ("DE Edge Instance") on the physical system. The DE agent is nested within the customer environment, with a smaller edge computing instance attached to the physical system.
4. Edge Instance Connection 440: This option shows the DE platform linked directly to an DE edge instance on the physical system. The DE platform and the physical system are depicted separately, connected by an edge computing instance in the middle, indicating the flow of data.
5. Direct API Connection 450: This deployment scenario shows the DE platform connecting directly to the physical system via API calls. In this depiction, an arrow extends directly from the platform sphere to the physical system sphere, signifying a direct interaction through API.
6. Air-Gapped Platform Instance 460: This scenario illustrates the IDEP being completely instanced on an air-gapped, or isolated, physical system as a DE agent. The platform operates independently from any networks or Internet connections, providing an additional layer of security by eliminating external access points and potential threats. Interaction with the platform in this context would occur directly on the physical system, with any data exchange outside the physical system being controlled following strict security protocols to maintain the air-gapped environment.

Across these deployment scenarios, the IDEP plays an important role in bridging the gap between a digital twin (DTw) established through the IDEP and its physical counterpart. Regardless of how the IDEP is instantiated, it interacts with the physical system, directly or through the customer's virtual environment. The use of edge computing instances in some scenarios demonstrates the need for localized data processing and the trade-offs between real-time analytics and more precise insights in digital-physical system management. Furthermore, the ability of the platform to connect directly to the physical system through API calls underscores the importance of interoperability in facilitating efficient data exchange between the digital and physical worlds. In all cases, the DE platform operates with robust security measures.

In some embodiments, the IDEP deployment for the same physical system can comprise a combination of the deployment scenarios described above. For example, for the same customer, some physical systems may have direct API connections to the DE platform (scenario 5), while other physical systems may have an edge instance connection (scenario 4).

Multimodal User Interfaces

Figure 5:
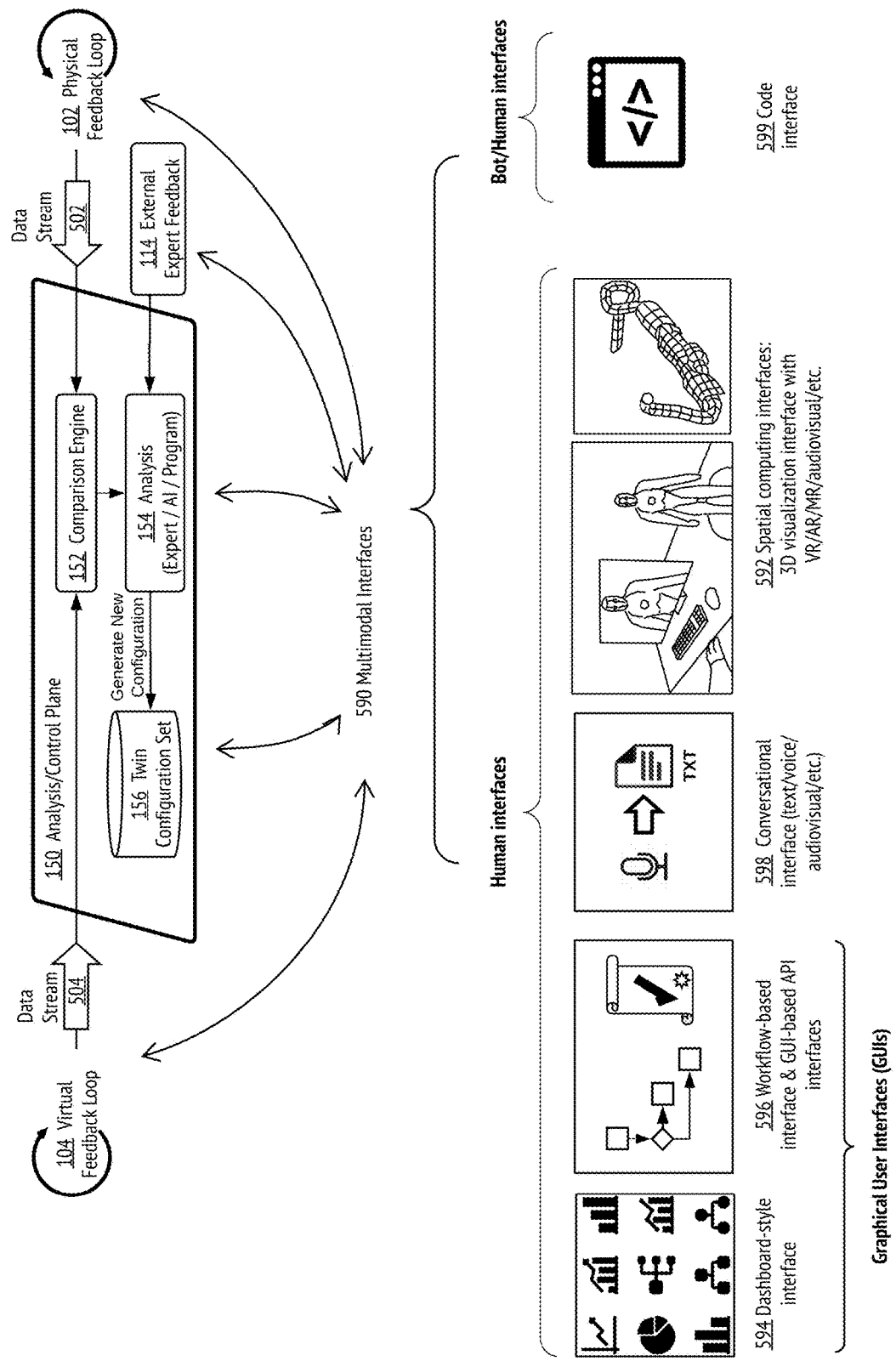
FIG. 5 shows exemplary multimodal interface designs for integration of feedback in am IDEP, in accordance with some embodiments of the present invention.

FIG. 5 illustrates the use of multimodal user interfaces 590 for the interconnected DE platform, which can handle various input and output modalities such as Virtual Reality (VR), Mixed Reality (MR), auditory, text, and code. These interfaces are designed to manage the complexity of data streams and decision-making processes, and provide decision support including option visualization, impact prediction, and specific decision invocation. Specifically, data streams 502 and 504 are processed in the Analysis & Control Plane (ACP) 150 of FIG. 1. The user interface may receive data streams from physical and virtual feedback loops 102 and 104, as well as external expert feedback 114, analysis module 154, and twin configuration set 156 of ACP 150.

The multimodal interfaces illustrated in FIG. 5 are configured to carry out all the DE tasks and actions described in the context of FIG. 1, by catering to both humans and bots/algorithms, handling the intricacies of data stream frequency and complexity, decision-making time scales, and latency impacts. In the case of human decision makers, the user interface may need to manage inputs and outputs while for algorithmic decision making, the user interface may need to present rationale and decision analysis to human users. Some examples of human interfaces include a dashboard-style interface 594, a workflow-based interface 596, conversational interfaces 598, spatial computer interfaces 592, and code interfaces 599.

Dashboard-style interface 594 offers a customizable overview of data visualizations, performance metrics, and system status indicators. It enables monitoring of relevant information, sectional review of documents, and decision-making based on dynamic data updates and external feedback. Such an interface may be accessible via web browsers and standalone applications on various devices.

Workflow-based interface 596 guides users through the decision-making process, presenting relevant data, options, and contextual information at each stage. It integrates external feedback and is designed as a progressive web app or a mobile app. In the context of alternative tool selection, workflow-based interface 596 may provide options on individual tools at each stage, or provide combinations of tool selections through various stages to achieve better accuracy or efficiency for the overall workflow.

Conversational interfaces 598 are based on the conversion of various input formats such as text, prompt, voice, audio-visual, etc. into input text, then integrating the resulting input text within the DE platform workflow. Outputs from the DE platform may undergo the reverse process. This enables interoperability with the DE platform, and specifically the manipulation of model splices. In the broad context of audio-visual inputs, the conversational interfaces may comprise data sonification, which involves using sound to represent data, information, or events, and using auditory cues or patterns to communicate important information to users, operators, or reviewers. Sonified alerts (e.g., alerts sent via sound, e.g., via a speaker) are especially useful when individuals need to process information quickly without having to visually focus on a screen. For example, sonified alerts can be used to notify security analysts of potential threats or breaches.

FIG. 5 also illustrates the use of spatial computing interfaces 592 and code interfaces 599 in the management of DTws and PTws. Spatial computing interfaces allow for more immersive and intuitive user experiences, and enable real-time synchronization between DTws and PTws. Code interfaces allow bots and digital engineers to interact with the DE platform through scripting and code. It also allows the collection of user preference, task history, and tool usage patterns for alternative tool selection purposes.

Digital Threads and Autonomous Data Linkages

As discussed previously, a "digital thread" is intended to connect two or more digital engineering (DE) models for traceability across the systems engineering lifecycle, and collaboration and sharing among individuals performing DE tasks. In a digital thread, appropriate outputs from a preceding digital model may be provided as the inputs to a subsequent digital model, allowing for information and process flow. That is, a digital thread may be viewed as a communication framework or data-driven architecture that connects traditionally siloed elements to enable the flow of information and actions between digital models.

Figure 6:
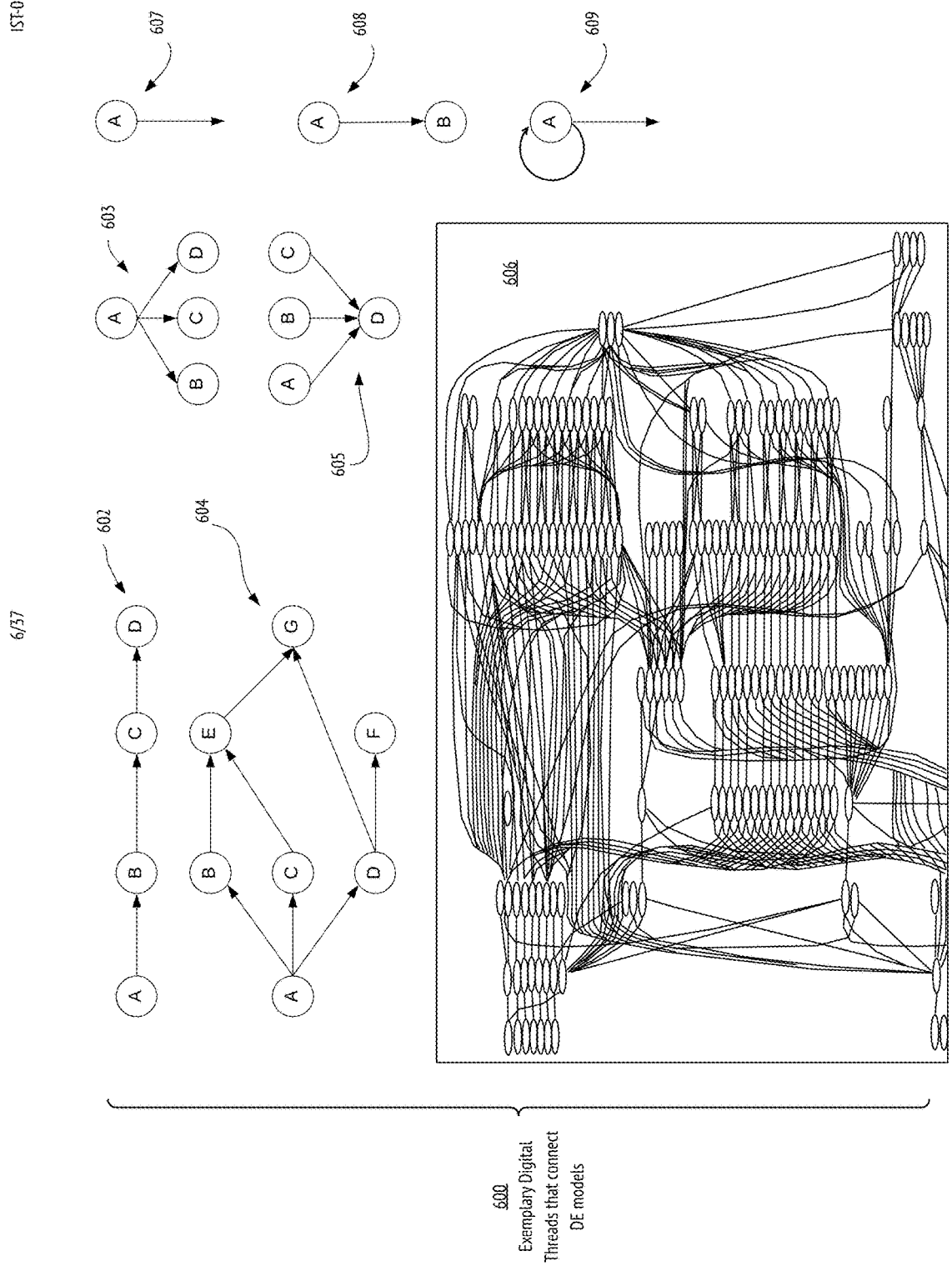
FIG. 6 is a schematic diagram comparing exemplary digital threads that connect DE models, in accordance with some embodiments of the present invention.

FIG. 6 describes the architecture and inherent complexity of digital threads, in accordance with the examples disclosed herein. Specifically, FIG. 6 is a schematic diagram comparing exemplary digital threads 600 of various complexities that manipulate and/or connect DE models, in accordance with some embodiments of the present invention. In the most basic sense, a digital thread may "thread" together DE models into a simple daisy-chain architecture 602 where modifications in any upstream DE model will affect all DE models downstream from the modified DE model. For example, a modification of any parameter or process of a DE model B will cause changes in DE model C, which in turn will cause changes in DE model D. Cause-and-effect changes will therefore cascade downstream. As another example, diagram 604 represents a more complex digital thread where a change in one DE model may affect more than one downstream model. In both 602 and 604, digital threads are represented by a directed acyclic graph (DAG).

DAGs are frequently used in many kinds of data processing and structuring tasks, such as scheduling tasks, data compression algorithms, and more. In the context of service platforms and network complexities, a DAG might be used to represent the relationships between different components or services within the platform. In digital thread 604, different models may depend on each other in different ways. Model A may affect models B, C, and D, with models B and C affecting model E, and models D and E affecting model G. Such dependencies are denoted as a DAG, where each node is associated with a component (e.g., a model), and each directed edge represents a dependency.

A major issue with dealing with interdependent DE models is that graph consistencies can be polynomial, and potentially exponential, in complexity. Hence, if a node fails (e.g., a model is unreliable), this can have a cascading effect on the rest of the digital thread, disrupting the entire design. Furthermore, adding nodes or dependencies to the graph does not yield a linear increase in complexity because of the interdependencies between models. If a new model is added that affects or depends on several existing models, the resulting increase in graph complexity is multiplicative in nature, hence potentially exponential. The multiplicative nature of digital thread consistencies is compounded by the sheer number of interconnected models, which may number in the hundreds or thousands. Diagram 606 is a partial representation of a real-world digital thread, illustrating the complexity of digital threads and its multiplicative growth.

FIG. 6 further shows special cases 603, 605, 607, 608, and 609 of exemplary simple digital threads. Diagram 607 represents a degenerate digital thread where data is shared from a single DE model. Diagram 608 represents a model-to-document digital thread where data (e.g., system attributes, performance attributes) extracted from a single DE model may be used to generate or update a text-based document (e.g., a Capability Development Document (CDD)). Diagrams 603 and 605 are generalized from 608 to represent cases where data extracted from a single model may be used to update multiple models, or vice versa. Specifically, diagram 605 may represent the dynamic updates of live or magic documents discussed in the context of FIG. 1. Here the logic to connect the DE models shown are very simple: data are extracted from multiple DE models A, B, and C to update a document model D. There are no interactions between the extracted data. Furthermore, diagram 609 shows a special case of a digital thread where data is loaded to and extracted from only a single model A. For example, as discussed in the context of FIG. 7 next, input splice functions of the model A shown in 609 may be executed to update the model, and output splice functions of model A shown in 609 may be executed to produce digital artifacts for sharing. For these special simple threads, the IDEP may provide a GUI-based interface to the user to connect the models and execute the digital threads. For complex threads such as 606, a code-based interface may be necessary.

Model Splicing for Digital Threading and Digital Twin Generation

As disclosed herein, model splicing encapsulates and compartmentalizes digital engineering (DE) model data and model data manipulation and access functionalities. As such, model splices provide access to selective model data within a DE model file without exposing the entire DE model file, with access control to the encapsulated model data based on user access permissions. Model splicing also provides the DE model with a common, externally-accessible Application Programming Interface (API) for the programmatic execution of DE models. Model splices thus generated may be shared, executed, revised, or further spliced independently of the native DE tool and development platform used to generate the input digital model. The standardization of DE model data and the generalization of API interfaces and functions allow the access of DE model type files outside of their native software environments, and enable the linking of different DE model type files that may not previously be interoperable. Model splicing further enables the scripting and codification of DE operations encompassing disparate DE tools into a corpus of normative program code, facilitating the generation and training of artificial intelligence (AI) and machine learning (ML) models for the purpose of manipulating DE models through various DE tools across different stages of a DE process, DE workflow, or a DE life cycle.

Digital threads are created through user-directed and/or autonomous linking of model splices. A digital thread is intended to connect two or more DE models for traceability across the systems engineering life cycle, and collaboration and sharing among individuals performing DE tasks. In a digital thread, appropriate outputs from a preceding digital model are provided as inputs to a subsequent digital model, allowing for information flow. That is, a digital thread may be viewed as a communication framework or data-driven architecture that connects traditionally siloed elements to enable the flow of information between digital models. The extensibility of model splicing over many different types of DE models and DE tools enables the scaling and generalization of digital threads to represent each and every stage of the DE life cycle.

A digital twin (DTw) is a real-time virtual replica of a physical object or system, with bi-directional information flow between the virtual and physical domains, allowing for monitoring, analysis, and optimization. Model splicing allows for making individual DE model files into executable splices that can be autonomously and securely linked, thus enabling the management of a large number of DE models as a unified digital thread. Such a capability extends to link previously non-interoperable DE models to create digital threads, receive external performance and sensor data streams (e.g., data that is aggregated from DE models or linked from physical sensor data), calibrate digital twins with data streams from physical sensors outside of native DTw environments, and receive expert feedback that provides opportunity to refine simulations and model parameters.

Unlike a DTw, a virtual replica, or simulation, is a mathematical model that imitates real-world behavior to predict outcomes and test strategies. Digital twins use real-time data and have bidirectional communication, while simulations focus on analyzing scenarios and predicting results. In other words, a DTw reflects the state of a physical system in time and space. A simulation is a set of operations done on digital models that reflects the potential future states or outcomes that the digital models can progress to in the future. A simulation model is a DE model within the context of the IDEP as disclosed herein.

When testing different designs, such as variations in wing length or chord dimensions, multiple DTws (sometimes numbering in 100s to 1,000s) may be created, as a bridge between design specifications and real-world implementations of a system, allowing for seamless updates and tracking of variations through vast numbers of variables, as detailed in the context of FIG. 1. As an example, if three variations of a system are made, each one would have its own DTw with specific measurements. These DTws may be accessed and updated via API function scripts, which allow for easy input of new measurements from the physical parts during the manufacturing process. By autonomous linking with appropriate data, a DTw may be updated to reflect the actual measurements of the parts, maintaining traceability and ensuring accurate data representation through hundreds or thousands of models.

Exemplary Model Splicing Setup

Figure 7:
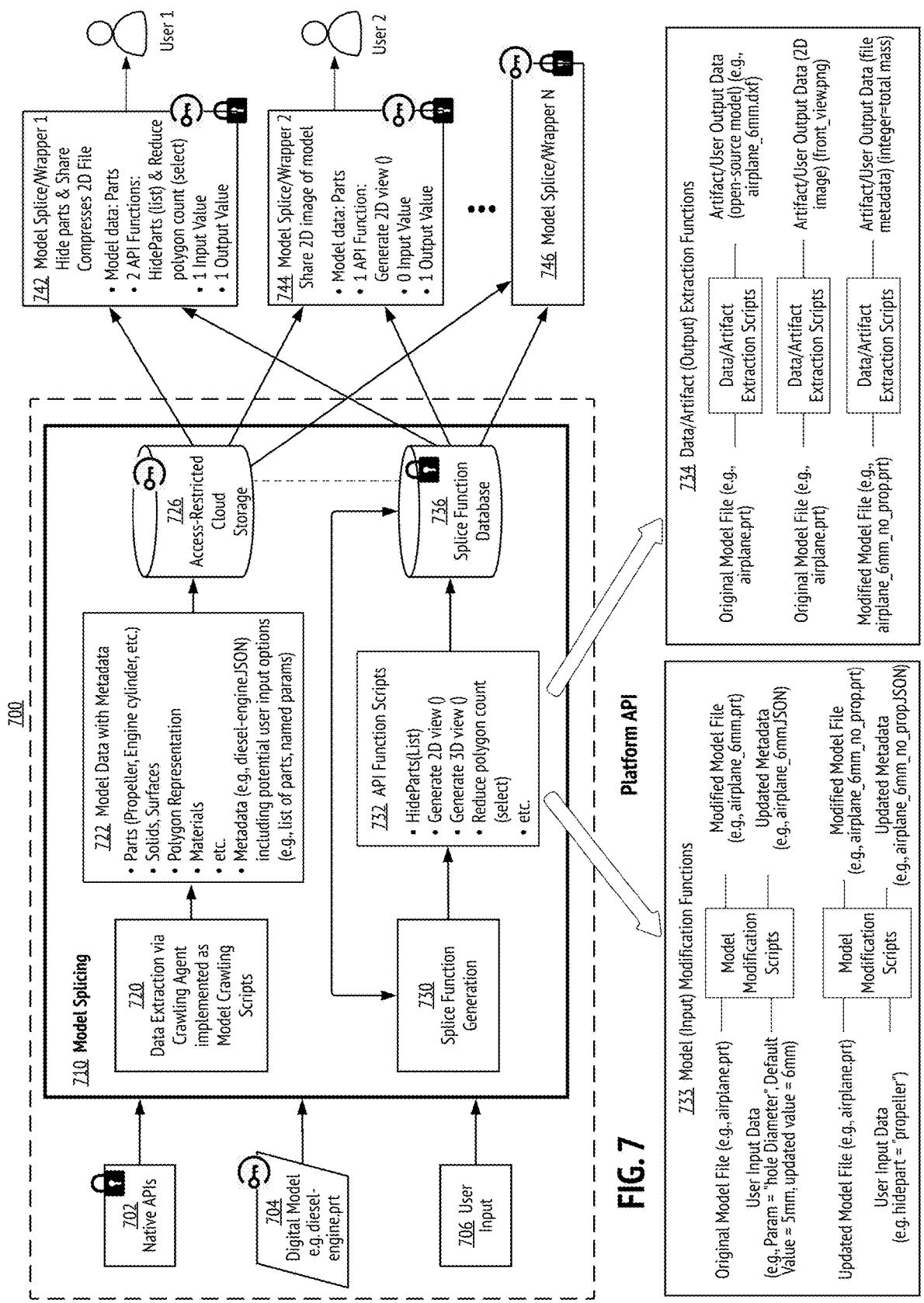
FIG. 7 is a schematic showing an exemplary DE model splicing setup, in accordance with some embodiments of the present invention.

FIG. 7 is a schematic showing an exemplary model splicing setup, according to some embodiments of the present invention. Specifically, FIG. 7 is a schematic showing an embedded CAD model splicing example.

In the present disclosure, a "model splice", "model wrapper", or "model graft" of a given DE model file comprises locators to or copies of (1) DE model data or digital artifacts extracted or derived from the DE model file, including model metadata, and (2) splice functions (e.g., API function scripts) that can be applied to the DE model data. A model splice may take on the form of a digital file or a group of digital files. A locator refers to links, addresses, pointers, indexes, access keys, Uniform Resource Locators (URL) or similar references to the aforementioned DE digital artifacts and splice functions, which themselves may be stored in access-controlled databases, cloud-based storage buckets, or other types of secure storage environments. The splice functions provide unified and standardized input and output API or SDK endpoints for accessing and manipulating the DE model data. The DE model data are model-type-specific, and a model splice is associated with model-type-specific input and output schemas. One or more different model splices may be generated from the same input DE model file, based on the particular user application under consideration, and depending on data access restrictions. In some contexts, the shorter terms "splice", "wrapper", and/or "graft" are used to refer to spliced, wrapped, and/or grafted models.

Model splicing is the process of generating a model splice from a DE model file. Correspondingly, model splicers are program codes or uncompiled scripts that perform model splicing of DE models. A DE model splicer for a given DE model type, when applied to a specific DE model file of the DE model type, retrieves, extracts, and/or derives DE model data associated with the DE model file, generates and/or encapsulates splice functions, and instantiates API or SDK endpoints to the DE model according to input/output schemas. In some embodiments, a model splicer comprises a collection of API function scripts that can be used as templates to generate DE model splices. "Model splicer generation" refers to the process of setting up a model splicer, including establishing an all-encompassing framework or template, from which individual model splices may be deduced.

Thus, a DE model type-specific model splicer extracts or derives model data from a DE model file and/or stores such model data in a model type-specific data structure. A DE model splicer further generates or enumerates splice functions that may call upon native DE tools and API functions for application on DE model data. A DE model splice for a given user application contains or wraps DE model data and splice functions that are specific to the user application, allowing only access to and enabling modifications of limited portions of the original DE model file for collaboration and sharing with stakeholders of the given user application.

Additionally, a document splicer is a particular type of DE model splicer, specific to document models. A "document" is an electronic file that provides information as an official record. Documents include human-readable files that can be read without specialized software, as well as machine-readable documents that can be viewed and manipulated by a human with the help of specialized software such as word processor and/or web services. Thus, a document may contain natural language-based text and/or graphics that are directly readable by a human without the need of additional machine compilation, rendering, visualization, or interpretation. A "document splice", "document model splice" or "document wrapper" for a given user application can be generated by wrapping document data and splice functions (e.g., API function scripts) that are specific to the user application, thus revealing text at the component or part (e.g., title, table of contents, chapter, section, paragraph) level via API or SDK endpoints, and allowing access to and enabling modifications of portions of an original document or document template for collaboration and sharing with stakeholders of the given user application, while minimizing manual referencing and human errors.

In the CAD model splicing example shown in FIG. 7, a CAD model file diesel-engine.prt 704 proceeds through a model splicing process 710 that comprises a data extraction step 720 and a splice function generation step 730. This input DE model 704 is in a file format.prt native to certain DE tools. Data extraction may be performed via a DE model crawling agent implemented as model crawling scripts within a model splicer to crawl through the input DE model file and to distill model data with metadata 722. Metadata are data that can be viewed without opening the entire input DE model file, and may include entries such as file name, file size, file version, last modified date and time, and potential user input options as identified from a user input 706. Model data are extracted and/or derived from the input DE model, and may include but are not limited to, parts (e.g., propeller, engine cylinder, engine cap, engine radiator, etc.), solids, surfaces, polygon representation, and materials, etc. When a model splicer crawls through the model file, it determines how model data may be organized and accessed, as fundamentally defined by a DE tool 702 that is being used in splicing the DE model, and establishes a model data schema. This data schema describes the structure and format of the model data, some of which are translated into, or used to create input/output API endpoints with corresponding input/output schemas. In some embodiments, model data with metadata 722 may be stored in an access-restricted storage 726, such as the "customer buckets" 312 within customer environment 310 in FIG. 3, so that model splices such as 742, 744, and 746 may be generated on-demand once an input DE model 704 has been crawled through.

The model splicer further generates splice functions (e.g., API function scripts) 732 from native APIs 702 associated with the input CAD model. In the present disclosure, "native" and "primal" refer to existing DE model files, functions, and API libraries associated with specific third-party DE tools, including both proprietary and open-source ones. Native API 702 may be provided by a proprietary or open-source DE tool. For example, the model splicer may generate API function scripts that call upon native APIs of native DE tools to perform functions such as: HideParts (parts_list), Generate2DViewo, etc. These model-type-specific splice functions may be stored in a splice function database 736, again for on-demand generation of individual model splices. A catalog or specification of splice functions provided by different model splices supported by the IDEP, and orchestration scripts that link multiple model splices, constitutes a Platform API. This platform API is a common, universal, and externally-accessible platform interface that masks native API 702 of any native DE tool integrated into the IDEP, thus enabling engineers from different disciplines to interact with unfamiliar DE tools, and previously non-interoperable DE tools to interoperate freely.

Next, based on user input or desired user application 706, one or more model splices or wrappers 742, 744, and 746 may be generated, wrapping a subset or all of the model data needed for the user application with splice functions or API function scripts that can be applied to the original input model and/or wrapped model data to perform desired operations and complete user-requested tasks. In various embodiments, a model splice may take on the form of a digital file or a group of digital files, and a model splice may comprise locators to or copies of the aforementioned DE digital artifacts and splice functions, in any combination or permutation. Any number of model splices/wrappers may be generated by combining a selective portion of the model data such as 722 and the API function scripts such as 732. As the API function scripts provide unified and standardized input and output API endpoints for accessing and manipulating the DE model and DE model data, such API handles or endpoints may be used to execute the model splice and establish links with other model splices without directly calling upon native APIs. Such API endpoints may be formatted according to an input/output scheme tailored to the DE model file and/or DE tool being used, and may be accessed by orchestration scripts or platform applications that act on multiple DE models.

In some embodiments, when executed, an API function script inputs into or outputs from a DE model or DE model splice. "Input" splice functions or "input nodes" such as 733 are model modification scripts that allow updates or modifications to an input DE model. For example, a model update may comprise changes made via an input splice function to model parameters or configurations. "Output" splice functions or "output nodes" 734 are data/artifact extraction scripts that allow data extraction or derivation from a DE model via its model splice. An API function script may invoke native API function calls of native DE tools. An artifact is an execution result from an output API function script within a model splice. Multiple artifacts may be generated from a single DE model or DE model splice. Artifacts may be stored in access-restricted cloud storage 726, or other similar access-restricted customer buckets.

One advantage of model splicing is its inherent minimal privileged access control capabilities for zero-trust implementations of the IDEP as disclosed herein. In various deployment scenarios discussed with reference to FIG. 4, and within the context of IDEP implementation architecture discussed with reference to FIG. 3, original DE input model 704 and model data storage 726 may be located within customer buckets 312 in customer environment 310 of FIG. 3. Splice functions 732 stored in database 736 call upon native APIs 702. The execution or invocation of splice functions 732 may rely on job-specific authentication or authorization via proprietary licenses of DE tools (e.g., residing within customer environment 310 of FIG. 3) and/or information security clearance levels of the requesting user. Thus, model splicing unbundles monolithic access to digital model-type files as whole files and instead provides specific access to a subset of functions that allow limited, purposeful, and auditable interactions with subsets of the model-type files built from component parts or atomic units that assemble to parts.

Digital Threading of DE Models Via Model Splicing

Figure 8:
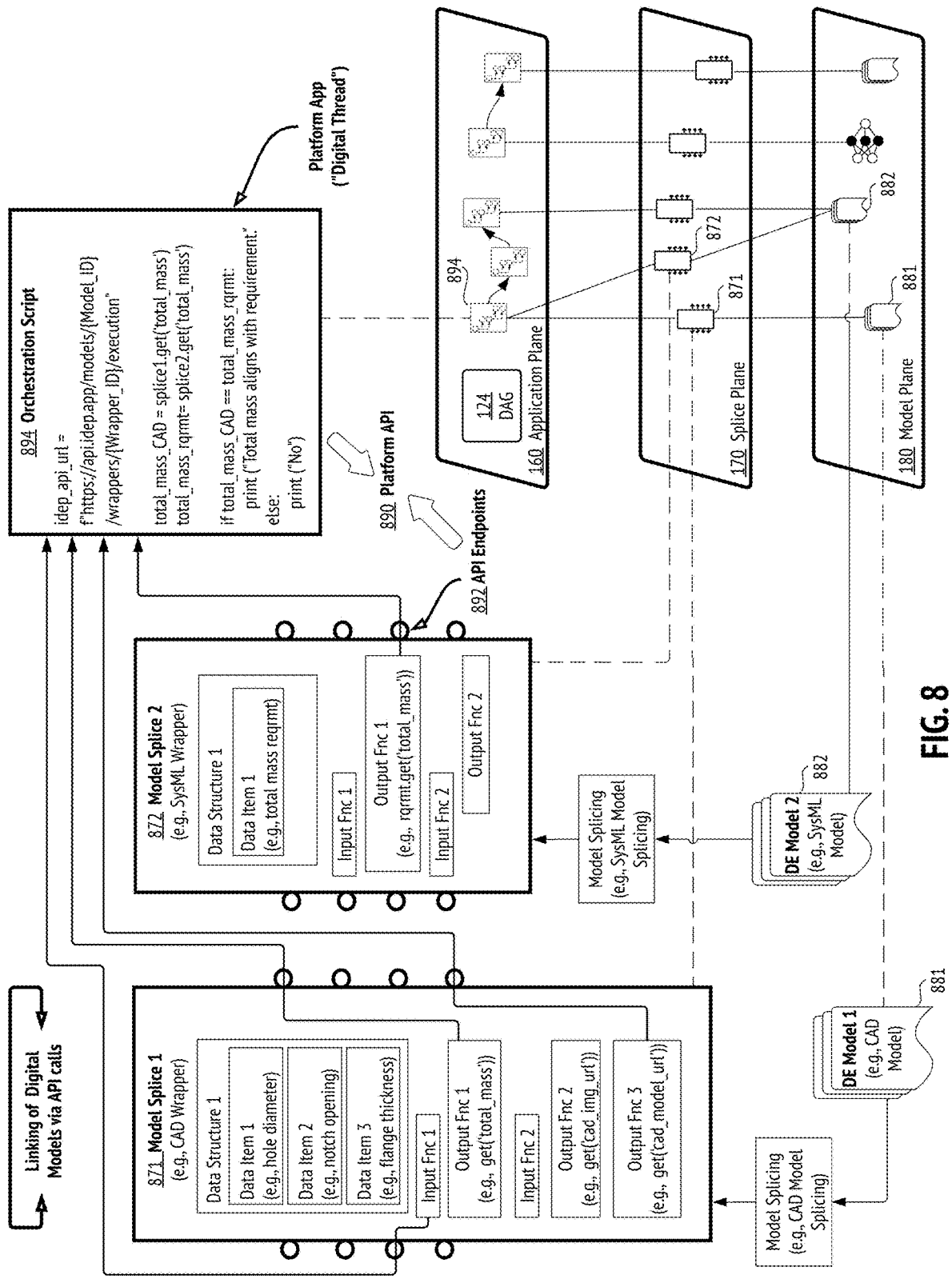
FIG. 8 is a schematic showing digital threading of DE models via model splicing, in accordance with some embodiments of the present invention.

FIG. 8 is a schematic showing digital threading of DE models via model splicing, according to some embodiments of the present invention. A digital thread is intended to connect two or more DE models for traceability across the systems engineering lifecycle, and collaboration and sharing among individuals performing DE tasks.

Linking of model splices generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first splice and a second splice (e.g., input splice functions from both model splices are called upon). In the present disclosure, "model linking" and "model splice linking" may be used interchangeably, as linked model splices map to correspondingly linked DE models. Similarly, linking of DE tools generally refers to jointly accessing two or more DE tools via model splices, where model splice functions that encapsulate disparate DE tool functions may interoperate and call each other, or be called upon jointly by an orchestration script to perform a DE task.

Thus, model splicing allows for making individual digital model files into model splices that can be autonomously and securely linked, enabling the management of a large number of digital models as a unified digital thread written in scripts. Within the IDEP as disclosed herein, a digital thread is a platform script that calls upon the platform API to facilitate, manage, or orchestrate a workflow through linked model splices. Model splice linking provides a communication framework or data-driven architecture that connects traditionally siloed elements to enable the flow of information between digital models via corresponding model splices. The extensibility of model splicing over many different types of digital models enables the scaling and generalization of digital threads to represent each and every stage of the DE lifecycle and to instantiate and update DTws as needed.

In the particular example shown in FIG. 8, an orchestration script 894 is written in Python code and designed to interact via API endpoints such as 892 to determine if a CAD model meets a total mass requirement. API endpoint 892 is an output splice function and part of a platform API 890. Platform API 890 comprises not only splice functions but also platform scripts or orchestration scripts such as 894 itself.

Orchestration script 894 is divided into three main steps:
1. Get Data From a CAD Model Splice: A POST request may be sent via the IDEP platform API to execute a computer-aided design (CAD) model splice 871. This model splice provides a uniform interface to modify and retrieve information about a CAD model 881. The parameters for the CAD model, such as hole diameter, notch opening, flange thickness, etc., may be sent in the request and set via an input splice function. The total mass of the CAD model may be derived from model parameters and retrieved via an output splice function. The response from the platform API includes the total mass of CAD model 881, and a Uniform Resource Identifier/Locator (URL) for the CAD model. The response may further comprise a URL for an image of the CAD model.
2. Get Data From a SysML Model Splice: Another POST request may be sent via the IDEP platform API to execute a Systems Modeling Language (SysML) model splice 872. SysML is a general-purpose modeling language used for systems engineering. Output function 892 of model splice 872 retrieves the total mass requirements for the system from a SysML model 882. The response from the platform API includes the total mass requirement for the system.
3. Align the Variables and Check If Requirement Met: The total mass from CAD model 881 is compared with the total mass requirement from SysML model 882. If the two values are equal, a message is printed indicating that the CAD model aligns with the requirement. Otherwise, a message is printed indicating that the CAD model does not align with the requirement.

In short, orchestration script 894, which may be implemented in application plane 160 of IDEP 100 shown in FIG. 1, links digital models 881 and 882 via model splice API calls. Orchestration script 894 is a scripted platform application that modifies a CAD model, retrieves the total mass of the modified CAD model, retrieves the total mass requirement from a SysML model, and compares the two values to check if the CAD model meets the requirement. In some embodiments, a platform application within IDEP 100 utilizes sets of functions to act upon more than one DE model.

Model Splice Plane

Figure 9:
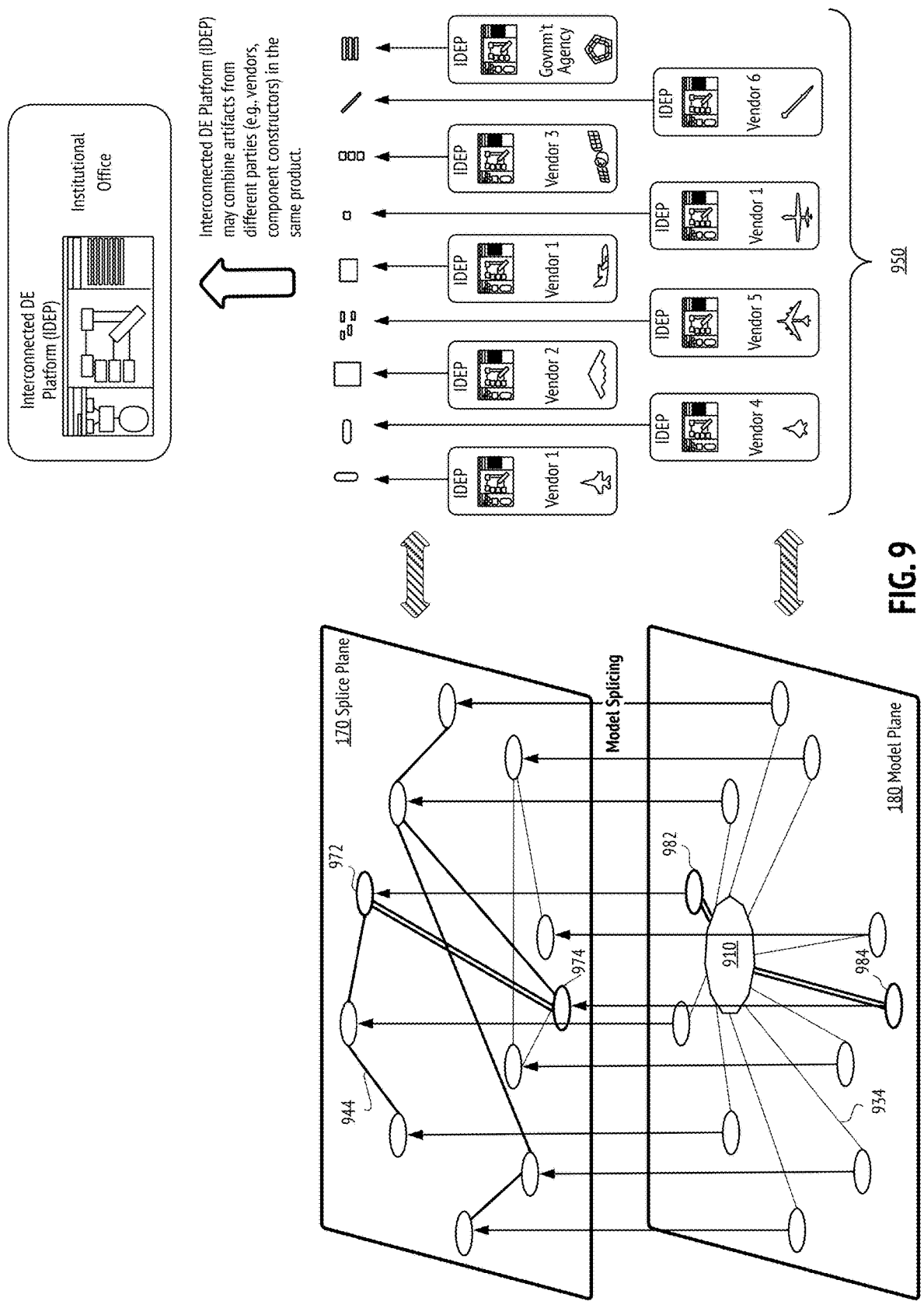
FIG. 9 is a schematic illustrating the linking of DE model splices in a splice plane and comparing digital threading with and without model splicing, in accordance with some embodiments of the present invention.

FIG. 9 is a schematic illustrating the linking of DE model splices in a splice plane and comparing digital threading with and without model splicing, according to some embodiments of the present invention. The bottom model plane 180 demonstrates current digital threading practices, where each small oval represents a DE model, and the linking between any two DE models, such as models 982 and 984, requires respective connections to a central platform 910, and potential additional linkages from every model to every other model. The central platform 910 comprises program code that is able to interpret and manipulate original DE models of distinct model types. For example, platform 910 under the control of a subject matter expert may prepare data from digital model 982 into formats that can be accessed by digital model 984 via digital model 984's native APIs, thus allowing modifications of digital model 982 to be propagated to digital model 984. Any feedback from digital model 984 to digital model 982 would require similar processing via platform 910 so that data from digital model 984 are converted into formats that can be accessed by digital model 982 via digital model 982's native APIs. This hub-and-spoke architecture 934 is not scalable to the sheer number (e.g., hundreds or thousands) of digital models involved within typical large-scale DE projects, as model updates and feedback are only possible through central platform 910.

In contrast, once the DE models are spliced, each original model is represented by a model splice comprising relevant model data, unified and standardized API endpoints for input/output, as shown in the upper splice plane 170. Splices within splice plane 170 may be connected through scripts (e.g., python scripts) that call upon API endpoints or API function scripts and may follow a DAG architecture, as described with reference to FIG. 1 and FIG. 6. Note that in FIG. 1, only the set of generated splices are shown within splice plane 170, while in FIG. 9, scripts that link model splices are also shown for illustrative purposes within the splice plane. Such scripts are referred to as orchestration scripts or platform scripts in this disclosure, as they orchestrate workflow through a digital thread built upon interconnected DE model splices. Further note that while splice plane 170 is shown in FIG. 1 as part of IDEP 100 for illustrative purposes, in some embodiments, splice plane 170 may be implemented behind a customer firewall and be part of an agent of the DE platform, as discussed in various deployment scenarios shown in FIG. 4. That is, individual API function scripts generated via model splicing by a DE platform agent may be tailored to call upon proprietary tools the customer has access to in its private environment. No centralized platform 910 with proprietary access to all native tools associated with all individual digital models shown in FIG. 9 is needed. Instead, orchestration scripts call upon universal API function scripts that may be implemented differently in different customer environments.

Hence, model splicing allows model splices such as model splice 972 from digital model 982 and model splice 974 from digital model 984 to access each other's data purposefully and directly, thus enabling the creation of a model-based "digital mesh" 944 via platform scripts and allowing autonomous linking without input from subject matter experts.

An added advantage of moving from the model plane 180 to the splice plane 170 is that the DE platform enables the creation of multiple splices per native model (e.g., see FIG. 7), each with different subsets of model data and API endpoints tailored to the splice's targeted use. For example, model splices may be used to generate multiple digital twins (DTws) that map a physical product or object design into the virtual space. Two-way data exchanges between a physical object and its digital object twin enable the testing, optimization, verification, and validation of the physical object in the virtual world, by choosing optimal digital model configuration and/or architecture combinations from parallel digital twins built upon model splices, each reacting potentially differently to the same feedback from the physical object.

Supported by model splicing, digital threading, and digital twining capabilities, the IDEP as disclosed herein connects DE models and DE tools to enable simple and secure collaboration on digital engineering data across engineering disciplines, tool vendors, networks, and model sources such as government agencies and institutions, special program offices, contractors, small businesses, Federally Funded Research and Development Centers (FFRDC), University Affiliated Research Centers (UARC), and the like. An application example 950 for the IDEP is shown on the right side of FIG. 9, illustrating how data from many different organizations may be integrated to enable cross-domain collaboration while maintaining data security, traceability, and auditability. Here DE models from multiple vendors or component constructors are spliced or wrapped by IDEP agents, and data artifacts are extracted with data protection. Turning DE models into data artifacts enables cross-domain data transfer and allows for the protection of critical information, so that model owners retain complete control over their DE models using their existing security and IT stack, continue to use DE tools that best fit their purposes, and also preserve the same modeling schema/ontology/profile that best fit their purposes. The IDEP turns DE models into micro-services to provide minimally privileged data bits that traverse to relevant stakeholders without the DE models ever leaving their home servers or being duplicated or surrogate. The IDEP also provides simple data access and digital threading options via secure web applications or secure APIs.

DAG Representation of Threaded Tasks

Figure 10:
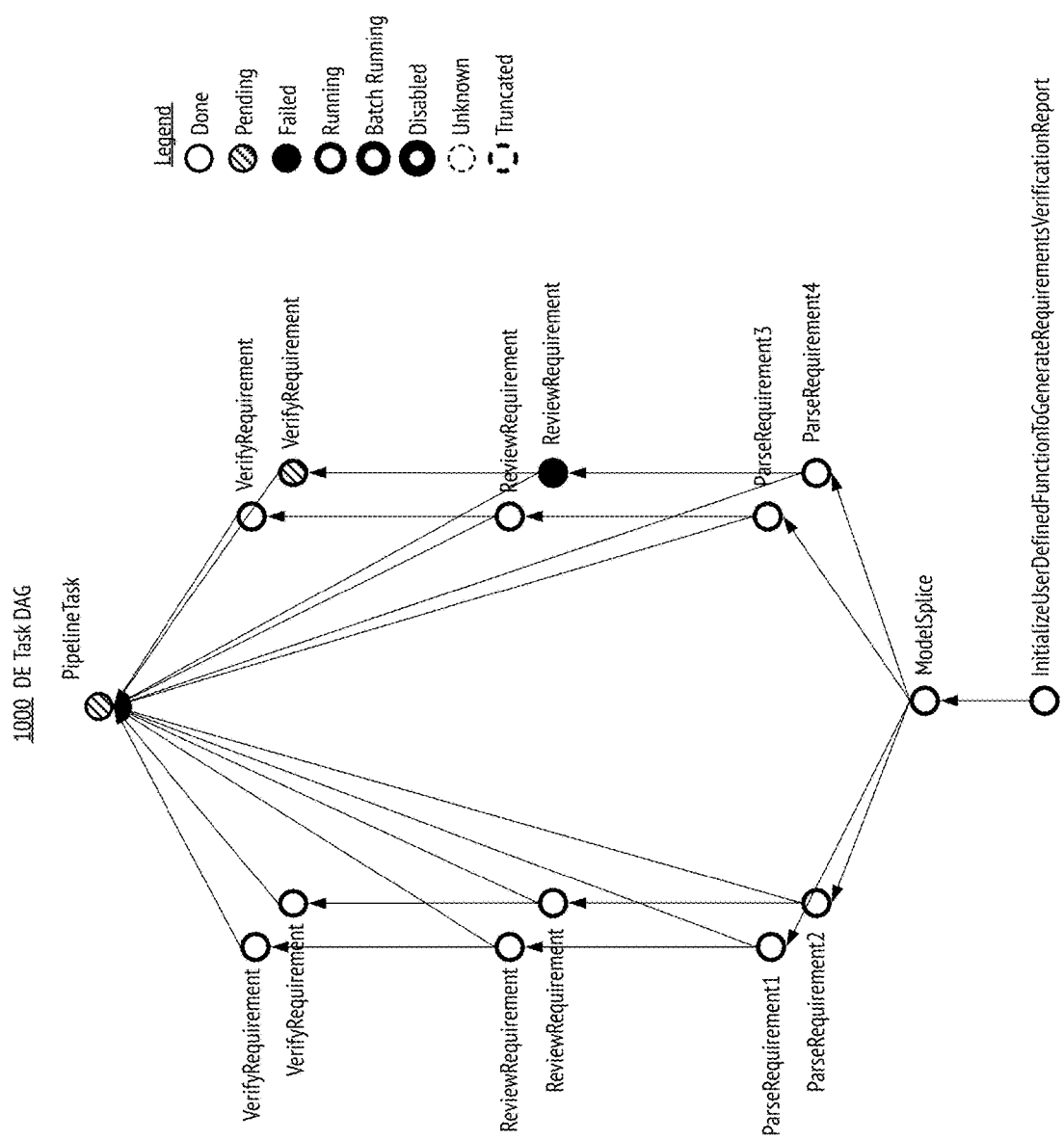
FIG. 10 shows an exemplary directed acyclic graph (DAG) representation of pipelined DE tasks related to digital threads, in accordance with some embodiments of the present invention.

Model splicing provides a unified interface among DE models, allowing model and system updates to be represented by interconnected and pipelined DE tasks. FIG. 10 shows an exemplary directed acyclic graph (DAG) representation 1000 of pipelined DE tasks related to digital threads, in accordance with some embodiments of the present invention. In diagram 1000, tasks performed through a digital thread orchestration script (e.g., 894) are structured as nodes within a DAG. Actions are therefore interconnected and carried out in a pipeline linking the DE model splices with a range of corresponding parameter values. Therefore, a digital thread can be created by establishing, via interpretable DE platform scripts, the right connections between any model splices for their corresponding models at the relevant endpoints.

Referring to FIGS. 1 and 8, DAGs of threaded tasks are built from digital threads and are part of the DE platform's application plane 160. Different DAGs may target different DE actions. For example, in FIG. 1, building or updating a DTw 122 in the virtual environment 120 has its own DAG 124. Model splicing turns DE models into data structures that can be accessed via API, thus enabling the use of software development tools, from simple python scripts to complex DAGs, in order to execute DE actions. A digital thread of model splices eliminates the scalability issue of digital thread management, and speeds up the digital design process, including design updates based on external feedback.

Following the above description of the basic elements and core aspects of the IDEP as disclosed herein, the documentation system that enhances the IDEP's functionality with respect to model splicing is described in detail next.

Challenges in Digital Engineering (DE) Model Sharing, Integration, and Collaboration The design, creation, and operation of large complex systems typically require the use of an extensively large number of DE platforms and model types employed in various interdisciplinary and multidisciplinary engineering fields. Some examples are the plethora of software tools for computer aided design (CAD) and drafting, modeling and simulation (M&S), cost analysis, requirement management, validation and verification (V&V), certification and documentation, engineering product lifecycle management, and various other aspects of systems engineering. Systems engineering is a discipline that aims to coordinate the design and management of parts of a complex engineering system over their life cycles to facilitate their interfaces and oversee their collective behaviors in a way that produces an intended outcome that meets requirements generated based on stakeholder needs. Digital engineering incorporates digital technological innovations into an integrated, digital, model-based approach.

Sharing and integration of DE models for collaboration among different stakeholders such as managers, front-line engineers, suppliers, and vendors present several challenges, including the siloed nature of DE tools, the lack of interoperability and integration between different DE tools, and hesitation from organizations to share DE models due to concerns over intellectual property (IP) protection, data security, auditability, and/or confidentiality. Sharing DE models as printed outputs for review is ineffective, slow, and expensive, while there is a demand for more experts or subject-matter experts (SMEs) who are skilled in using multiple tools to handle digital engineering workflows. In addition, managing version control and access control can be difficult when sharing models or whole files across different teams, suppliers, and partners. The slow and expensive mapping of requirements to digital artifacts, lack of transparency and visibility into the whole digital engineering process, limited accessibility of DE models and engineering data to different stakeholders, including regulators, customers, and investors, due to the lack of standardization and data sharing protocols, and difficulty in scaling and adapting DE processes and tools to changing business requirements and market demands due to the lack of flexibility, modularity, and compatibility across different systems and tools are also major challenges. Furthermore, iterative web-based approaches of sharing data, for example via web servers, on-demand cloud computing and storage services with API handles, and the like, are generally not acceptable for sharing DE models from highly-sensitive industries. For example, aerospace and defense companies maintain some of the nation's most sensitive security-related information, and it would be against both their corporate policies as well as governmental regulations to enable world-wide access to their models and associated data.

Some other specific examples include, but are not limited to, manufacturing companies struggle to manage version control and data integration when they have to share digital models of product requirements, designs and simulations with different teams and suppliers; construction firms face challenges in integrating data from different sources and tools when they have to share digital models of building designs with regulatory bodies and partners; aerospace companies, or their original equipment manufacturer (OEM) partners, face challenges in managing version control and IP protection when they want to collaborate on designs without creating duplicate models; utilities companies that have to manage designs as digital models that require linking with bill of materials and cost projections, and printed design documents for regulatory reviews and approvals; architecture firms that seek to collaborate on building design projects but face challenges in integrating different design tools or software systems, leading to costly errors and delays; research institutions that strive to share complex digital models of scientific data with colleagues and collaborators, but face challenges in data formatting, validation, and visualization; and shipbuilders that face challenges in sharing data and linking to validations easily when they have to share design data and blueprints with regulatory bodies and standards organizations.

As workarounds to the aforementioned challenges, organizations may resort to manual model sharing, such as exporting data from one tool to another, adopting file formats that are supported across a few different tools, or manually creating reports or presentations that summarize the relevant data. For example, teams of expert users may coordinate models in real time in the same physical space, such as the Apollo mission control center. Data and related files may be shared in a common internal development environment or integrated development environment (IDE), which is likely a source of security risks. Data and related files may also be shared through an enterprise service bus (ESBs), which is a pre-cloud architecture and may be useful if the set of DE tools are known and fixed; however, ESBs are not cloud-native, may become single points of failure, and may not be flexible to dynamically changing sets of tools and requirements.

Organizations may also share data through email or other file-sharing services, or manually consolidate data from different tools into a single location. Use of password-protected files, requiring users to sign non-disclosure agreements (NDAs), or limiting access to sensitive data on a need-to-know basis are also used additionally for IP protection and confidentiality. However, these workarounds still provide access to entire digital models or files, which may not be desirable or necessary.

In some cases, companies use secure cloud infrastructure (e.g. GOOGLE cloud bucket or AMAZON Web Services (AWS)) as a starting point, but this alone is not sufficient for DE collaboration. Secure cloud infrastructure access for DE models is in vogue today either through direct access to an IDE or in a pre-cloud architecture through the use of an enterprise service bus to link to models as a whole. Under such setups, it is impossible to target specific digital artifacts and/or slices of data that may be housed within such storage.

Difficulties in managing version control and access control may be addressed through the use of naming conventions, version control software, or assigning roles and permissions to specific users. The ineffectiveness, slowness, and expense of review processes when sharing models as printed outputs may be addressed through online collaboration tools that enable real-time feedback and editing or digital tools that allow for easier and faster review or audits of digital models, but auditability and traceability of the changes, as well as accountability of stakeholders involved in such changes cannot but guaranteed.

In summary, despite measures discussed so far, current workarounds for sharing DE models remain universally limited, slow or time-consuming, inefficient, and they may even be ineffective. These methods often lack robust mechanisms for auditability and traceability, which can lead to the introduction of data inconsistencies and errors not easily tracked or rectified. The absence of a clear audit trail and the inability to trace changes back to their origins hinder stakeholder accountability and data integrity. Furthermore, such mitigation schemes are often deemed unacceptable for industries that handle sensitive information, such as aerospace and defense, where stringent requirements for auditability and traceability are non-negotiable due to their potentially far-reaching impacts on safety and security.

Overview of Digital Engineering (DE) Model Splicing

The interconnected digital engineering platform (IDEP) as discussed within the context of FIG. 1 is a computer-based system that may be used to support a variety of DE product lifecycle activities from concept through disposal in a zero-trust setup. The DE model splicing system and methodology are provided by the IDEP to integrate previously siloed DE tools, DE models, and related digital artifacts from different disciplines into secure, sharable model splices, and software-defined digital threads and digital twins in a zero-trust setup. By enabling the right stakeholders to access the right information from the right source with the right tools at the right time in the right context for the right purpose, DE model splicing facilitates the secure, auditable, traceable, iterative, and effective development and review of components and/or systems, from design to validation, verification, to certification.

As discussed within the context of FIG. 7, a "model splicer" refers to program code or uncompiled scripts that performs model splicing of DE models. A DE model splicer for a given DE model type, when applied to a specific DE model file of the DE model type, retrieves, extracts, or derives DE model data, digital artifacts, and associated metadata, generates and/or encapsulates splice functions (e.g., in the form of API function scripts) that can be applied to the model data or digital artifacts, and instantiates API endpoints according to input/output schemas. A DE model is a computer-generated digital model that represents characteristics or behaviors of a complex product or system, and may be created or modified using a DE tool. A DE model within the IDEP as disclosed herein refers to any digital file uploaded onto the platform, including documents that are appropriately interpreted. A digital artifact is produced within a model splice or generated from spliced model data. In some embodiments, digital artifacts are execution results of particular splice functions. That is, a digital artifact may be retrieved model data, or may be derivative data generated from extracted model data. A "model splice," "wrapper," "graft" of a given DE model file for a given user application may be generated by wrapping such digital artifacts and splice functions that are specific to the user application, allowing only access to and enabling modifications of limited portions of the original DE model file at controlled time instances for collaboration and sharing with stakeholders of the given user application.

More specifically, a model splice of a given DE model file comprises locators to or copies of (1) DE model data or digital artifacts extracted or derived from the DE model file, including model metadata, and (2) splice functions (e.g., API function scripts) that can be applied to the DE model data or digital artifacts. A model splice may take on the form of a digital file or a group of digital files. In some embodiments, a model splice may comprise links to or locators/addresses of (e.g., pointers, indexes, Uniform Resource Locator (URL), etc.) the aforementioned DE digital artifacts and splice functions, which themselves may be stored in access-controlled databases, cloud-based storage buckets, or other types of secure storage environments. The splice functions provide unified, standardized, and addressable Application Programming Interface (API) or Software Development Kit (SDK) endpoints that are externally and commonly-accessible by third-party applications and users via code interfaces or graphical user interface (GUIs). Such API or SDK endpoints enable access to digital artifacts without access to an entirety of the DE model file and without direct engagement by the third-party applications and users with particular DE tools needed to view, process, or modify the DE model file. That is, splice functions mask disparate DE tools requiring subject matter expert (SME) and/or software programming knowledge. One or more different model splices may be generated from the same input DE model file, based on the particular user application under consideration, and depending on data access restrictions. Furthermore, metadata associated with digital artifacts and/or splice function calls ensures the auditability and traceability of any execution of specific functions (e.g., splice functions, DE tool functions, 3rd party API calls) on a specific version of the specific DE model at a specific time.

As disclosed herein, one feature of model splicing is that the system is designed to meet the complex demands of DE model sharing, ensuring secure, zero-trust shareability of model data, while incorporating rigorous auditability and traceability to adhere to industry standards and government regulations. The challenges in DE model sharing, integration, and collaboration, are recognizable. Furthermore, it is clear that enhancing the shareability of DE models and related data sources through Internet technologies could lead to a quantum leap in collaboration capabilities among industrial companies and government agencies. Nonetheless, simplistic approaches of model sharing via conventional methods, such as web servers, on-demand cloud computing and storage services with API handles, email, instant messaging, and government data transfer services all fall short of the stringent security and auditability requirements for high-sensitivity industries such as aerospace and defense. By compartmentalizing and encapsulating model data and splice function while tracking data sources and function executions with metadata, model splicing transcends traditional web-based and API-based approaches to adequately address the core requirements of zero-trust principles, audit trails, and traceability of data access and modifications, thereby ensuring compliance with the strictest of security protocols.

A second feature of model splicing is model data access control, specifically the unbundling of monolithic access to DE models as whole files, and instead providing specific access to subsets of functions that allow limited, purposeful, and auditable interactions with subsets of digital artifacts built from component parts. Again, selective access and modification of certain functions within a larger engineering model allow for secure and collaborative engineering workflows without the need to duplicate models or expose sensitive or confidential technical information. In addition to model sharing, model splicing enables efficient abstraction and redaction of model data and functions without requiring full transparency to the entire model and its sensitive technical details, and potentially without the need for full access to native DE engineering tools and/or software platforms.

A third feature of model splicing is its facilitation of DE tool interoperability. By encapsulating the functions of various native DE tools within model splice functions and providing a standardized, platform-wide API, the complexity for specialized engineers, subject matter experts, and software developers to engage deeply with multiple native DE tools is substantially reduced. Model splicing further enables the linking or joint access of disparate native DE tools that are not directly interoperable, allowing for the seamless invocation of model splice functions that encapsulate distinct DE tool functions to collaboratively execute a DE task.

A fourth feature of digital model splicing is that versatile linking of DE model splices produces software-defined digital threads, for example for testing, certification, or validation purposes. Model splice linking or model linking generally refers to jointly accessing two or more DE model splices via API endpoints or splice functions. Interconnected model splices support the core capabilities and functionalities of the IDEP, and greatly improve the scalability and versatility of DE model usage by lowering the need for expert skills when managing multiple models. Within the IDEP as disclosed herein, a digital thread is a platform script that calls upon the platform API to facilitate, manage, or orchestrate a workflow through linked model splices to provide the capability to access, integrate, and transform disparate data into actionable information. For example, a digital thread may be used to propagate requirements and/or design changes from individual model splices throughout a complex engineering system, enabling seamless and accountable collaboration among individuals performing DE tasks.

Yet another feature of model splicing is its ability to provide core training data for AI-assisted capabilities such as digital threading and autonomous data linkages in DE systems. That is, user actions during model splicing and user input on model splice API endpoints can provide data streams that serve as training data to fine-tune AI algorithms that may assist users in creating digital threads. A model splicer's action dataset may also be used to automate user actions, or feed into machine learning engines that perform predictive analytics on typical user actions, security audits, and the like. The training dataset can also be enhanced using synthetic data generation and can be customized to train enterprise-specific models for customers.

In short, DE model splicing encapsulates, containerizes, and compartmentalizes digital model data and functions to achieve model confidentiality and accessibility, while digital threading among model splices with generalized API interfaces allow scalability and generalizability from disparate models to a cohesive digital continuum throughout the system development life cycle.

The Model Splicing Process

In what follows, embodiments of the model splicing process and exemplary model splicer implementations are discussed in further detail within the context of the IDEP.

Figure 11:
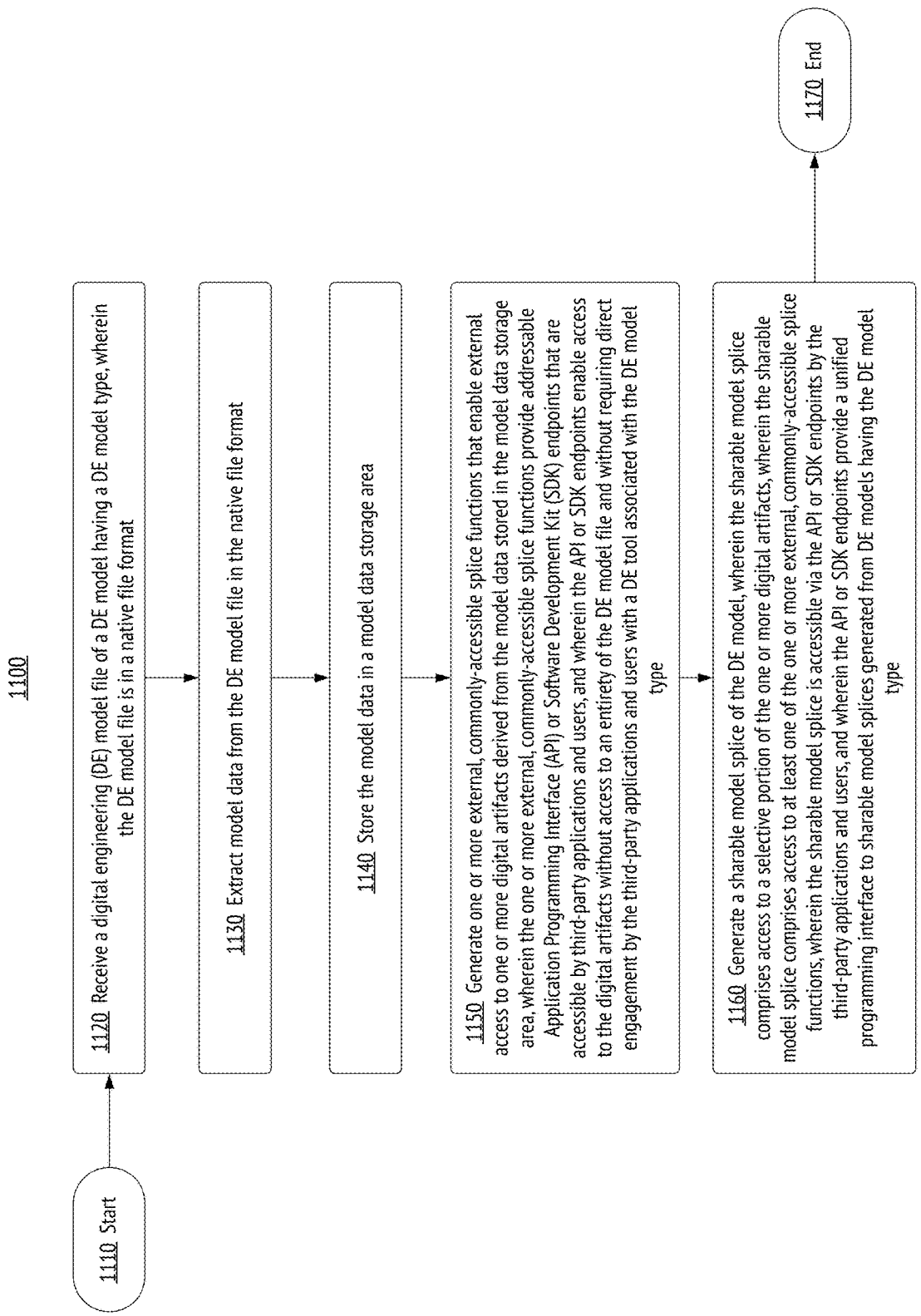
FIG. 11 shows a flowchart for an exemplary process for generating a DE model splice, in accordance with some embodiments of the present invention.

FIG. 11 shows a flowchart for an exemplary process for generating a DE model splice, in accordance with some embodiments of the present invention. In this illustrative example, upon initialization at a step 1110, a DE model file may be received at a step 1120, the DE model file is of a DE model having a DE model type, for example, in a native file format. A native file format for a DE model refers to the file format or file structure that is created, used, and maintained by a specific DE tool or software application that has originated the DE model. This format is designed to store all the information that the DE tool or software application can handle, for example, including geometry, features, metadata, and other design parameters that are specific to the software's capabilities. Each DE tool typically has its own native file format, which is optimized for use within that particular tool and may not be fully compatible with other DE tools without some form of conversion or data exchange process. For example, some proprietary CAD software use ".dwg" as their native file format for 2D and 3D design data; some use ".prt" files for component parts. Native file formats are typically the preferred format for working within the DE tool because they allow users to take full advantage of all the software's features and capabilities. However, for sharing and interoperability purposes, DE models may be exported from proprietary native formats to other open-source and/or neutral file formats that can be opened by a variety of different DE tools, albeit often with certain loss of proprietary data or features that are specific to the native file format. Model splicers implemented according to embodiments of the present invention as disclosed herein are equally applicable to neutral file formats that may facilitate limited interoperability between a selected number of different DE tools for the same DE model type (e.g., different CAD software may be used to open and perform limited edits to a CAD model file). In the present disclosure, a native DE file format and an associated native DE tool may also be interpreted as a neutral DE file format and any associated DE tool that may be used to edit files in this neutral DE file format.

Next, at a step 1130, model data may be extracted from the DE model file. As will be discussed with reference to FIGS. 20, 22, and 26, in various embodiments, model data and model splicers may be model type-specific. A user may select a specific model splicer for splicing the input DE model in its native file format. Alternatively, a model splicer may first identify the native file format of the input DE model, then call upon model crawlers specific to the native file format to extract model data. Different model crawlers may be applied to DE models of different model types, while extracted model data may be put into data structures tailored to the particular decomposition of the input DE model. In some embodiments, as discussed with reference to FIG. 7, such model data may comprise metadata on the DE model. For example, metadata for an input computer-aided design (CAD) model may include a list of parts, named parameters, potential user input options, a version number of the DE model file, a last-modified or last-access timestamp for the model file or individual model data items, and the like.

In an exemplary implementation of a model crawler for crawling through the input DE model using an originating native DE tool or an alternative DE tool associated with the DE model type or the native file format, one or more of the following steps may be performed. First, the input DE model file in its native file format may be opened using the originating DE tool that created it or using the associated, compatible tool or software that can read and interpret the model's data. Second, native functions, methods, or features of the DE tool being used may be called upon to identify and list all the components within the model. This could involve navigating the model's structure, such as the assembly tree or the bill of materials. Third, the DE tool's data extraction features, scripting capabilities, or native API may be used to extract relevant data about each component. This model data may include names, part numbers, descriptions, material specifications, list of variables, parameters, and other attributes. Fourth, the extracted model data may be structured, for example into the JavaScript Object Notation (JSON) format, where an object is created for each component with relevant attributes as name-value pairs. JSON is a data interchange format that stores human-readable plain-text data in key-value or attribute-value pairs and arrays. Fifth, the DE tool's export functions or a custom script may be used to save the structured data, as discussed next.

At a step 1140, the model data may be stored in a model data storage area. For example the DE tool's export functions may be used to save the structured model data (e.g., in a .zip file containing JSON file(s) and part file(s), in a directory containing multiple image files and an .xml file, etc.). If the DE tool does not support direct export into a desired format, a script using the DE tool's API or SDK may be executed. Such a script may be written by a subject matter expert (SME) familiar with the DE tools API or SDK, or may be automated with AI-assistance (e.g., using generative AI algorithms) that studies the DE tool's API library and API specifications. As discussed with reference to FIGS. 3 and 7, such a model data storage area may be access-restricted, may be cloud-based, or may be located in customer buckets within customer environments for a zero-trust implementation. In some embodiments, model data and/or metadata may be put into one or more files, such as a JSON file.

At a step 1150, one or more external, commonly-accessible splice functions may be generated to enable external access to one or more digital artifacts derived from the model data stored in the model data storage area, wherein the one or more external, commonly-accessible splice functions provide addressable Application Programming Interface (API) or Software Development Kit (SDK) endpoints that are accessible by third-party applications and users, and wherein the API or SDK endpoints enable access to the digital artifacts without access to an entirety of the DE model file and without direct engagement by the third-party applications and users with a DE tool associated with the DE model type (e.g., a native DE tool associated with the native DE file format).

In some embodiments, a splice function is defined and programmed by a subject matter expert (SME), and a process of generating a splice function may comprise receiving code input from a user. In some embodiments, a splice function may be pre-written by an SME or by an AI-based generator engine, and a process of generating a splice function may comprise retrieving a link to or a copy of the splice function from a datastore. In some embodiments, a process of generating a splice function may comprise receiving a user selection of the splice function from a list of pre-written splice functions in a datastore, and retrieving a link to or a copy of the selected splice function. In some embodiments, a process of generating a splice function may comprise receiving a user input that defines an input/output schema and/or functionality of the splice function, and prompting an AI-based recommender engine to locate a pre-written splice function or an AI-based generator engine to write/create a splice function script. In some embodiments, a process of generating a splice function may comprise using an AI-based recommender engine to recommend one or more pre-written candidate splice functions, based on one or more of a user input, a DE model type or file format, and other appropriate context information such as user role in the specific project for which the model splice is to be used.

In some embodiments, third-party applications and users may refer to entities (e.g., software applications, human or non-human users) outside the model splicing system or service, but may leverage interfaces (e.g., APIs) provided by the model splice to access its functionality or data. Thus, model splice functions mask distinct DE tool functions, substantially reducing the complexity for users (e.g., specialized engineers, subject matter experts, and software developers) to engage deeply with multiple DE tools and native DE files. Aside from the illustrative splice functions 732 discussed in the context of the CAD model example in FIG. 7, other exemplary splice functions include, but are not limited to, read (e.g., functions 734) and write (e.g., functions 733) type functions that may retrieve a digital artifact (e.g., retrieve from the model splice, or retrieve from a secure storage area using an address contained in the model splice), model update functions that may be used to configure model parameters or provide an updated DE model file. In some embodiments, this generation step 1150 may involve retrieving pre-written splice function scripts from a splice function database in response to a user input or request. In some embodiments, such retrieval may involve interacting with service cells such as shown in FIG. 3.

At a step 1160, a sharable model splice of the DE model may be generated, wherein the sharable model splice comprises access to or a copy of a selective portion of the one or more digital artifacts, wherein the sharable model splice comprises access to or a copy of at least one of the one or more external, commonly-accessible splice functions, wherein the sharable model splice is accessible via the API or SDK endpoints by the third-party applications and users, and wherein the API or SDK endpoints provide a unified programming interface to sharable model splices generated from DE models having the DE model type. The model splicing process terminates at a step 1170. A model splice may take on the form of a digital file or a group of digital files (e.g., in a file directory, or nested directories). The generation of a sharable model splice may comprise creating such digital file(s). Access to digital artifacts and/or splice functions may refer to locators (references, addresses, pointers, indexes, Uniform Resource Locator (URL), etc.) to and/or copies of such digital artifacts and/or splice functions.

In some embodiments, each digital artifact referenced by or contained in the model splice may be associated with metadata that can be used to trace the origin of the digital artifact. For example, such metadata may include the version of the DE model file from which the digital artifact is derived from, and a timestamp that indicates when the digital artifact is derived. In some embodiments, the access to the splice functions or the unified programming interface may be representational state transfer (REST) enabled, such that subsequent execution of splice functions may be implemented as web services via a web-app, or portal.

An Exemplary Model Splicer Implementation

Figure 12:
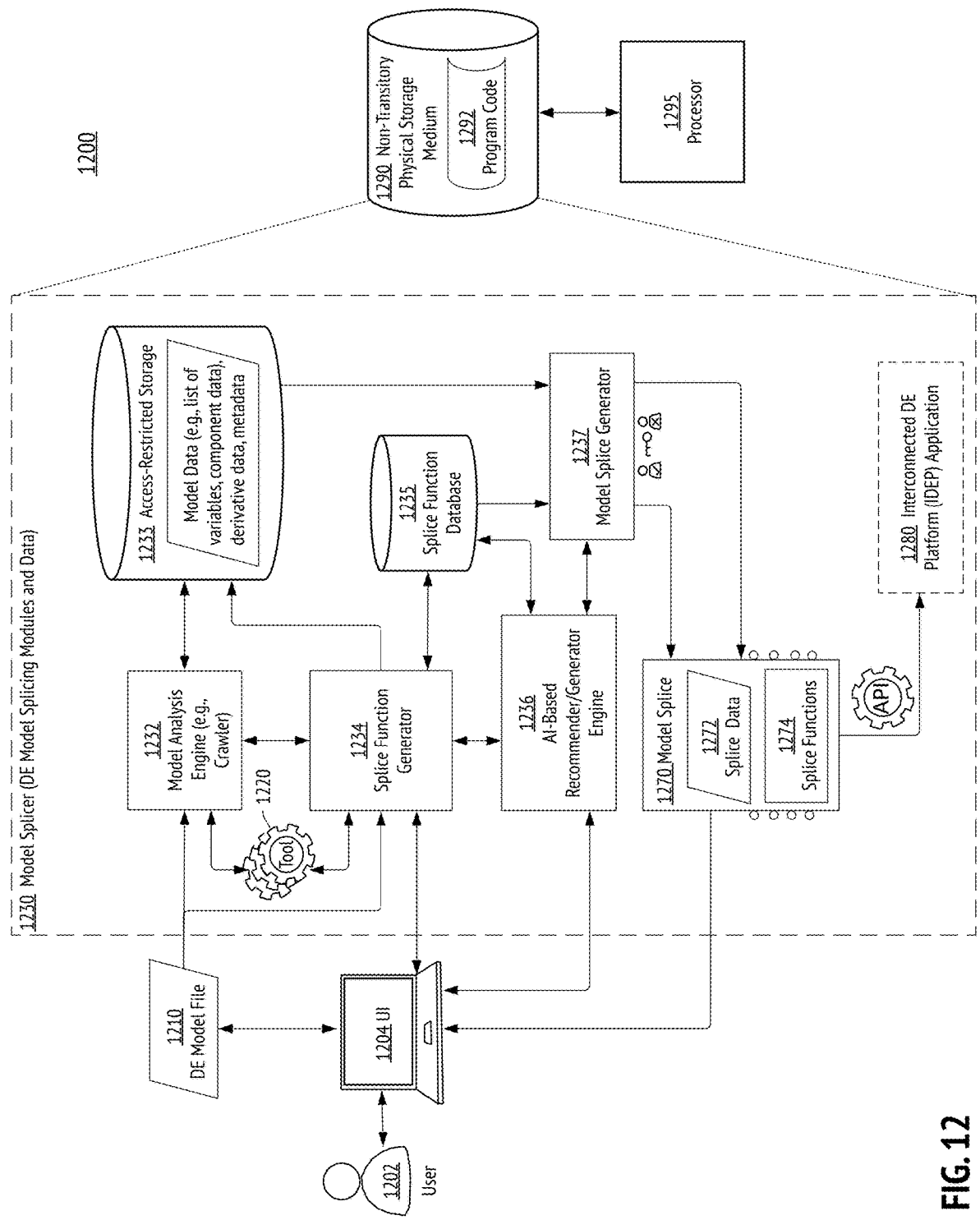
FIG. 12 shows an example system for generating a DE model splice, in accordance with some embodiments of the present invention.

FIG. 12 shows an exemplary system 1200 for generating a DE model splice, in accordance with some embodiments of the present invention. In this illustrative example, a non-transitory physical storage medium 1290 is provided to store program code 1292, the program code executable by a hardware processor 1295 to cause the hardware processor to execute computer-implemented processes, including model splicing or generating a sharable model splice 1270 from an input DE model file 1210 of a DE model.

In some embodiments, program code 1292 comprises code to receive DE model file 1210 of the DE model having a DE model type, in a source file format (e.g., in a native DE file format). In some embodiments, DE model file 1210 may be received from a user 1202 through a user interface (UI) 1204. User 1202 may be a human or a computing entity, and UI 1204 may be a graphical UI (GUI), a code interface such as an API/SDK interface, or a multimodal interface as discussed with reference to FIG. 5. For example, user 1202 may represent an artificial intelligence (AI) module that intends to link a generated model splice 1270 to another existing model splice to perform a DE task as part of a digital thread. In some embodiments, user 1202 may provide additional inputs for model splicing. Exemplary user input include, but are not limited to, requests for specific digital artifacts, splice function selections, intents for model splice usage, access restriction requirements on the generated model splice, authentication and/or authorization credentials, specific DE tools to be used for crawling through the input DE model file and/or for generating the model splice functions, request for proprietary or open-source DE tools, proprietary licenses or access codes for using proprietary DE tools during model splicing, and the like. In some embodiments, DE model file 1210 may be received directly from a data source, for example, retrieved from an internal database or a cloud-based storage service. In some embodiments, DE model file 1210 may comprise physical artifacts collected from physical twins and organized in a pre-defined source file format.

A model analysis engine 1232 analyzes input DE model file 1210 to extract model data that are in turn stored in a data storage area 1233, which may be access-restricted, cloud-based, or may be located in customer buckets within customer environments for a zero-trust implementation. In some embodiments, model analysis engine 1232 may comprise a crawler script that calls upon native functions of native DE tools 1220 associated with input file 1210 to parse the input DE model in detail to determine the model type, extract component data, identify metadata associated with the model file and/or component data, and generate a list of variables. In some embodiments, model analysis engine 1232 may generate derivative data from the extracted model data, with or without the assistance of a splice function generator 1234 and/or AI-assistance. When a derivative datum is generated and stored in storage 1233, associated metadata may be stored as well, for example to identify a time of the derivation, code used for the derivation, user authorizing the derivation, and/or a version of the input model file at the time of the derivation. Such metadata may be crucial in applications that require near-instantaneous auditability and clear traceability to original sources of truth.

Splice function generator 1234 generates one or more external, commonly-accessible splice functions that enable external access to one or more digital artifacts derived from the model data stored in the model data storage area. In the present disclosure, digital artifacts are functional outputs. Any model data, derivative data, metadata, or combinations and functions thereof may be viewed as a digital artifact, accessed or generated via model splice output functions. Both model analysis engine 1232 and splice function generator 1234 may call upon native functions of native DE tools 1220 associated with the input DE model's model type or as requested by the user. For example, splice function generator 1234 may generate API function scripts that call upon native DE tool functions to derive the digital artifacts, or to provide functionalities based on user input. The user may specify which DE tool to use or is preferred. In some embodiments, splice function generator 1234 may interact with user 1202 through UI 1204 to receive user-defined splice functions, to receive user selection from a list of existing splice functions previously defined by other users or previously generated and stored in splice function database 1235, and/or to receive user approval or revision to proposed splice functions. In some embodiment, the user may match between the model data and existing splice functions in splice function database 1235 to identify a selected number of splice functions that may be included in model splice 1270.

In some embodiments, an artificial intelligence (AI)-based recommender/generator engine 1236 may assist splice function generation. For example, AI-based recommender/generator engine 1236 may have been trained on existing splice functions associated with existing model splices for the same DE model types, analogous DE model types, and/or analogous DE models, and may have been further fine-tuned based on user inputs. In some embodiments, AI-based recommender/generator engine 1236 may utilize a large language model (LLM) to write function scripts that call upon APIs of native DE tools 1220. In some embodiments, AI-based recommender/generator engine 1236 may retrieve a list of splice functions from splice function database 1235, based on user input and other data inferred from the input DE model, such as file format, DE model type, intended purposes/use/audience, etc. In some embodiments, AI-based recommender/generator engine 1236 may autonomously match model type with existing splice functions to recommend a list of potential splice functions for the user to select from. In the present disclosure, analogous DE models or DE model types refer to DE models that are similar in some aspects, such as structure or behavior, but are not identical. Analogous DE models may be identified by analyzing the characteristics of different DE models and determining shared common features, attributes, or components that are relevant for model splicing. Analogous DE models may be used as reference, baseline, or starting point for model splicing, leveraging the similarities to improve efficiency and to capitalize on validated splice functions. Analogous models are particularly useful when they follow the same standard guidelines or reuse the same components or modules. For example, different variants of an aircraft may share a common propeller design but have different avionics. Splice functions generated for one variant of the aircraft may be used as training data for AI-based recommender/generator engine 1236, for generating splice functions of other variants of the aircraft.

The splice functions thus generated provide addressable API or SDK endpoints that are accessible by third-party applications and users. Such API or SDK endpoints enable access to the digital artifacts without access to the entirety of the DE model file and without requiring direct engagement by the third-party applications and users with native DE tools 1220 associated with the DE model type or the native DE file format. That is, splice functions mask native DE tool functions and DE tools. A user of a generated model splice is no longer required to have deep knowledge of the associated native DE tool. Furthermore, different users may access the same API or SDK endpoints that deploy different underlying native DE tools during model splicing. For example, a first user having a first input CAD model file and access to a proprietary CAD tool, and a second user having a second input CAD model file and access to an open-source CAD tool, can both obtain CAD model splice having the same splice functions that are implemented with the proprietary CAD tool and the open-source CAD tool respectively.

A model splicer generator 1237 bundles splice data 1272 and splice functions 1274 into shareable model splice 1270, in the form of locators (e.g., links, addresses, pointers, indexes, URLs, etc.) and/or copies of data/code. Splice data 1272 may be a selective portion of the digital artifacts obtained from input DE model file 1210. This selective portion may be selected based on data access permissions, such as a user input on the access level or security clearance level of another user that the generated model splice will be shared with, or on a need-to-know basis, such as metadata indicating the DE task which the model splice has been generated for. Splice functions 1274 may be selected from those stored in splice function database 1235. Sharable model splice 1270 is accessible via the API or SDK endpoints by third-party applications and users. These API or SDK endpoints provide a unified programming interface to all sharable model splices generated from various DE models having the same DE model type (e.g. CAD models of a same native file format, or CAD models of several native or neutral file formats). These endpoints may be utilized by applications 1280 within the IDEP to perform specific DE tasks, optimally under endpoint-specific, zero-trust access control. Thus, model splicing may be perceived as an use case-specific or application-specific process, as the data and functions of the model splice may be chosen or determined based on the intended use of the model splice.

In various embodiments, generated model splice 1270 may be shared with another user, who may in turn execute it to access and/or modify the digital artifacts and/or the input DE model. As discussed in the context of FIG. 7, in some embodiments, splice functions may be classified into input functions or model modification functions, and output functions or data/artifact extraction functions. Inputs into a model splice for execution may be input parameters for such input splice function and output splice functions. Outputs of model splice execution are digital artifacts and/or modified DE models that can be shared, viewed, further modified, linked into digital threads, and used for complete DE tasks.

While model analysis engine 1232, splice function generator 1234, model splice generator 1237 and AI-based recommender engine 1236 are shown as separate modules within FIG. 12, in various embodiments of the present invention, these modules may be integrated in any combination to facilitate seamless data exchange and functional collaboration to optimize the overall performance of the DE model splicing process. In some embodiments, parts of model splicer 1230 may be implemented within a customer environment behind a customer firewall and be managed by an IDEP agent, so that customer data within storage 1233 is fully protected under a zero trust setting. Splice function database 1235, which could be independent from specific model data, may be provided by the IDEP and accessed via the IDEP agent.

The discussion of the model splicing process and the model splicer in the context of FIGS. 11 and 12 so far has focused on model splicing a single, given DE model type. In some embodiments, model splicer 1230 may first identify a model type of the input model file (e.g., using model analysis engine 1231), then splice accordingly. For frequently used DE model types, splice functions may be written and tested by subject matter experts manually, and stored in splice function database 1235 for use to generate use case-specific model splices. As there is an extensively large number of DE model types currently employed in various interdisciplinary and multidisciplinary engineering fields, it would be advantageous to scale model splicer 1230 from a few widely used DE model types to a large number of model types. Furthermore, as model splicing is use case-specific, two different input DE model files of the same DE model type and intended for the same purpose may lead to similar model splices having different model data but identical splice functions.

In some exemplary implementations of the model splicing process, one or more of the following steps may be performed by the system shown in FIG. 12. First, model analysis engine 1232 may perform preprocessing steps before an input DE model file is received or uploaded. Specifically, model analysis engine 1232 may interpret file structure and schema for a library of model-type files, and build a library of typical use cases for model splices based on customer interviews and user inputs. Machine learning (ML) or AI-based algorithms may assist in scaling the model splicer, where exemplary splice functions and file structure details may be used to create archetype for potential splice functions for specific model-type files. Here the term "model-type" file refers to a DE model file of a specific DE model type.

In some embodiments, when a model-type file is received or uploaded, the model splicer may translate user instructions for typical use cases into specific functions that link appropriately with the model-type file. The model splicer may provide a selection of splices for common uses (e.g., query the model or perform specific actions on model data). The user may provide specific queries or desired actions to the system, for example to select from a list of model splices, or optionally input text prompt to an AI-assistance module to obtain a selection of model splices. Furthermore, in some implementations, endpoint calls to a model splice and its outputs may be tracked or audited as part of security implementation. Endpoint metadata tracking or auditing may also serve as training data set for user workflows that can be implemented in an automated or AI-assisted manner.

In other words, for a given DE model file, a model splicer generates model type-specific data files or structures and accompanying splice functions or native API function wrappers, which is a "second set of API functions" in addition to native APIs of the DE model. The model type-specific data files or database entries store all or a subset of model data extracted from the original DE model, while the splice functions allow access to and modification of the model type-specific data structures and/or extracted model data, metadata, and derived digital artifacts, allowing easy collaboration and sharing via an optional, dedicated, secure web-app portal. In an exemplary use case for model splices, a generated DE model splice or wrapper is analogous to an interactive portable document format (PDF) document with macro-functions embedded for annotation and collaboration. For example, an airplane manufacturer may share a redacted 3D view of an airplane's new wing design with an Air Force officer without giving the officer too much information or needing to share the original model file, which may be overly-complicated or unnecessary for the intended audience. Such a redacted 3D view may be generated using splice functions applied to data spliced from the original wing design model file.

In some embodiments, a model splice makes available a subset of the model through a subset of API endpoints or a GUI/web-app. The API endpoints may be accessed directly via code, while the GUI/web-app may offer not only handles to the API endpoints, but also interfaces for user interaction with model splices. In some instances, one of the API endpoints may still point to the location of the whole model. In some instances, a model splice may be used to share a sub-model built from extracted model data. In other instances, where the splice only provides a limited set of API endpoints, the pointer to the whole model may be needed for context. For example, a model splice that is generated from a CAD model with hidden sub-assemblies may internally connect with the whole extracted model in order to know the assembly structure.

The aforementioned splice functions allow users to share, modify, and redact the model with limited exposure to the complete model which could contain proprietary technical information. This means the model owner may retain control over who has access to which parts of the model, while still allowing others to work with the model collaboratively. Furthermore, the splice may webify the model and abstract its native API, exposing only those aspects of the model the owner intends to share. Model splicing enables secure and collaborative engineering workflows without the need to duplicate models or expose sensitive technical information. It enables efficient sharing, abstraction, and redaction of the model's functions without requiring full transparency to the entire model.

Generalized Model Splicing Process with Base Model Splices

Figure 13:
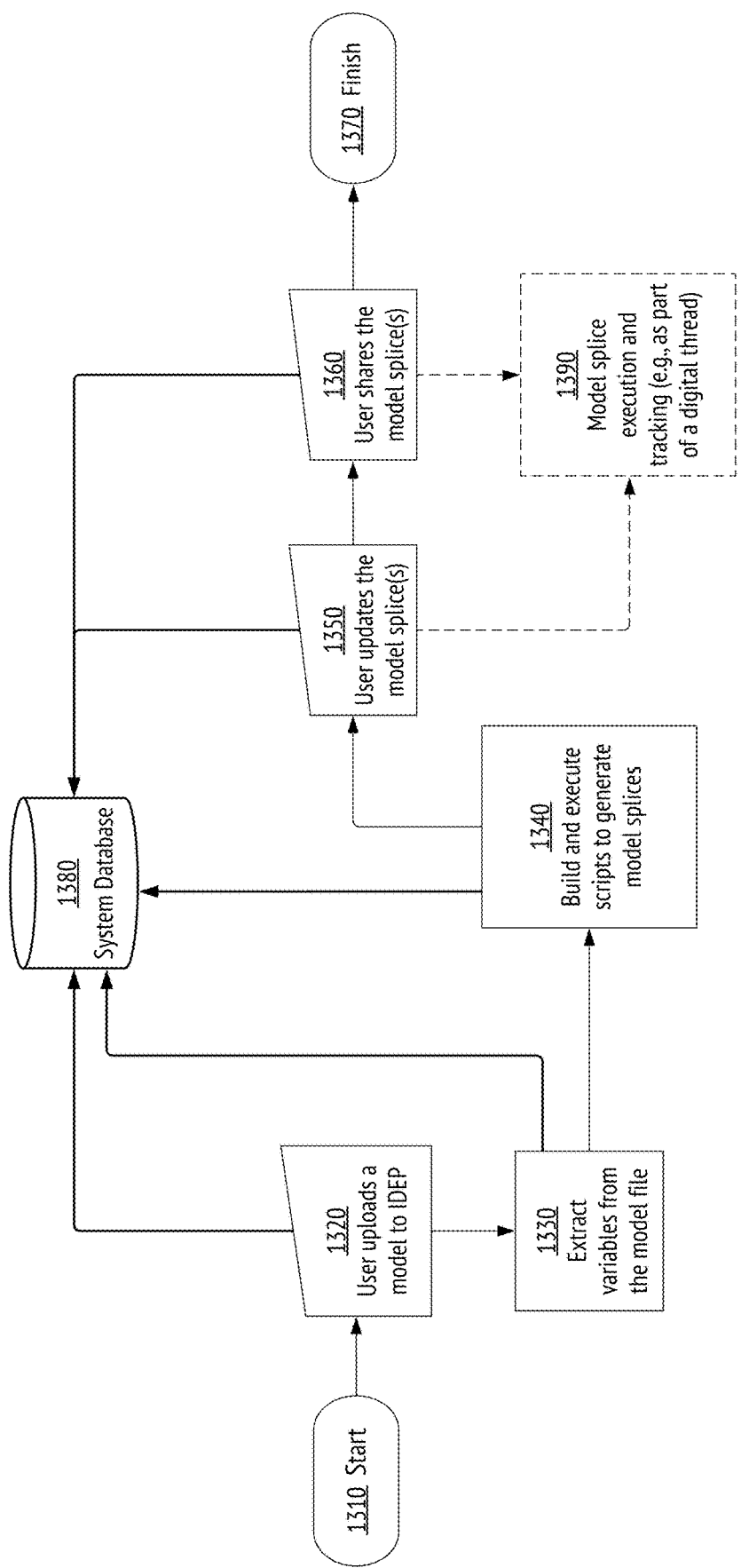
FIG. 13 shows a general process within the IDEP to perform model splicing and to generate model splices for all types of models, in accordance with some embodiments of the present invention.

While FIG. 7 illustrates the inputs and outputs to the model splicing process for a CAD model, it is important to note, as discussed within the context of FIGS. 11 and 12, that the implementation of the model splicer is generalizable across the breadth and range of various model type files. FIG. 13 further shows a general process 1300 within the IDEP to perform model splicing and to generate model splices for all types of models, in accordance with some embodiments of the present invention.

The following exemplary steps may be carried out in the generalized model splicing process shown in FIG. 13 upon initialization at a step 1310:

At a step 1320, a user uploads a DE model to the IDEP. A DE model file may be represented by one or more DE model files having respective source file formats. Recall that a DE model is a computer-generated digital model that represents characteristics or behaviors of a complex product or system. A DE model can be created or modified using a DE tool. A DE model file is the computer model file created or modified using the DE tool. A DE model within the IDEP as disclosed herein refers to any digital file uploaded onto the platform, including documents that are appropriately interpreted. For example, a computer-aided design (CAD) file, a Computer-Aided Engineering (CAE) file, a Computer-Aided Manufacturing (CAM) file, a Systems Modeling Language (SysML) file, a Systems Requirements Document (SDR) text file, a cost model, a scientific/engineering computing and simulation model file, a Model-Based Systems Engineering (MBSE) file, or a Neural Network Model JSON file may each be considered a DE model, in various embodiments of the present invention. A DE model may be machine-readable only, may be human-readable as well but written in programming codes, or may be human-readable and written in natural language-based texts. For example, a word-processing document comprising a technical specification of a product, or a spreadsheet file comprising technical data about a product, may also be considered a DE model. A DE tool is a DE application software (e.g., a CAD software), computer program, and/or script that creates or manipulates a DE model during at least one stage or phase of a product lifecycle. A DE tool may comprise multiple functions or methods. Exemplary DE tools include, but are not limited to, model-based systems engineering (MBSE) tools, augmented reality (AR) tools, computer aided design (CAD) tools, data analytics tools, modeling and simulation (M&S) tools, product lifecycle management (PLM) tools, multi-attribute trade-space tools, simulation engines, requirements model tools, electronics model tools, test-plan model tools, cost-model tools, schedule model tools, supply-chain model tools, manufacturing model tools, cyber security model tools, and mission effects model tools.

At a step 1330, based on the type of the input DE model, the system may send requests to an appropriate server, computing entity, or computing module to process the input model files and extract data (e.g., components, variables, metadata) from the DE model. In some embodiments, this model data extraction step may be performed using a model data crawler that interfaces with APIs/SDKs provided by native and/or open-source DE tools. In some embodiments, data extracted from the model may not represent the whole model, but may be a subset or a slice of the whole model, and may depend on the DE tool and tool APIs used to access the model. In some embodiments, data extraction may rely on inputs from human or AI experts, who may use native model APIs to understand model data structure and provide model crawling scripts for extracting variables and parameters. In some embodiments, the system may generate a data structure that holds the model data and stores it in a database. Such data structures may be model-type specific.

At a step 1340, the system may build and/or execute scripts to generate one or more model splices based on the type of the model and/or user input. The user may provide feedback to update such model splices at a step 1350, and share the ensuing model splice(s) with collaborators at a step 1360, before the process terminates at a step 1370. In some embodiments, the system may provide base model splices (e.g., see FIG. 16) at step 1340 according to typical use cases for the input model type. The user may select a based model splice for further customization (e.g., see FIGS. 17 and 18) at step 1350, before the model splice is shared with relevant stakeholders (e.g., see FIG. 19) at step 1360. In some embodiments, the model splice is executed by the user or the collaborator at a step 130, for example as part of a digital thread. The execution of a model splice refers to user-initiated or system-initiated execution or invocation of a splice function, for example to access or manipulate a digital artifact, or to update the DE model.

For example, CAD files are associated with general functions (e.g., operations, deltas) that can be applied to a CAD model, and CAD files are often reviewed in different representations such as as-designed and as-planned views of 3D models, 2D drawings with geometrical tolerances and technical specifications, attribute-based color-washings, simulation results (e.g., calculated weight and balance, finite element analysis), bill of materials (BOM) reports, and the like. Multiple base or default model splices may be generated from the general functions by the system, based on typical uses of CAD models as collected previously by the system, or as specified by user intent input. Such base model splices may be presented to a user through a UI for further revision and approval.

In another example, DE models in the type of scientific/engineering computing and simulation scripts may be spliced into one or more mode splices by default, and the user may provide feedback by selecting specific inputs and outputs of specific splices. In some instances, the model file may contain existing methods that may be used directly as splice functions, in addition to new scripts or plugins that are generated by the model splicer system. Additionally, a human or AI expert may identify specific splice functions or API endpoints for a splice, and the human or AI expert may create initial function scripts for the creation of model splices. The AI expert may be implemented using generative AI algorithms to automate any one of the aforementioned embodiments. More generally, during each of the process steps shown in FIG. 13, expert user actions, system actions, and user inputs may all be logged into a system database 1380. Such system logs may help in auditing and collecting datasets for AI systems capable of API function script generation, autonomous model splice linking and orchestration.

In the context of FIG. 13, model splicing may create several categories of model splice functions or API/SDK endpoints. A first category is predefined based on the model type, and may be viewed as base or default splice functions. For example, these may be written by a human expert using the API/SDK provided by the native DE tool. A second category may be extracted from a script, as in the case of scientific/engineering computing and simulation models. A third category may be provided by an AI algorithm trained on existing splice functions associated with existing model splices for the same and/or analogous DE models or DE model types. Similarly, a user may customize base model splices written by human experts or AI algorithms, or shared/received model splices within the user's editing rights. For example, the user may select/modify specific digital artifacts and/or functions within a model splice. The user may select a single splice function and/or a single digital artifact first and sequentially select several splice functions or the entire model-type file or the splice. Such user selections may be stored in the system database 1380 for creating based model splices.

In short, model splicing may comprise one or more of the following core processes:
1. Identifying a DE model type (e.g., CAD, requirements, etc.).
2. Breaking the DE model down into its smallest possible components or atomic units (e.g., solids, surfaces, edges, wireframes, parameters, assembly to parts, owner, reviewer, etc.).
3. Crawling through the model and determining the data structure of each atomic unit (e.g., for CAD it may crawl each part then find each face, curve, line, chord, etc.).
4. Creating a data structure of one or more data files to represent the DE model. These data files may include one or more of the original file, open-source clones, and other data representations such as JSON files and metadata inputs.
5. Providing an interface for humans and/or machines to update the DE model, which is now a collection of data files containing model data.
6. Providing an interface for humans and/or machines to extract digital artifacts from the model, which is now a collection of data files containing model data.
7. Identifying how humans interact with the model via a GUI or web-app.
8. Identifying how machines interact with the model via the APIs.
9. Automatically handling new version forks or variants of the original model based upon changes by users.
10. Tracking all of the above functions with metadata for auditability, traceability, accountability, and security Model Access Control and Tracking for Zero-Trust Security As disclosed herein, model splicing enables selective access to and modification of certain data and/or functions within a DE model, while keeping the rest of the model hidden. As such, model splicing enables the IDEP to be implemented under a zero-trust approach, where the users interact with the system through computer networks. Such a zero-trust approach methodology extends to the access and manipulation of data related to individual DE models, DE tools, and digital threads, for example at the model splice sharing step 1360 and/or the model splice execution step 1390.

In some examples, the policies of a security architecture implemented under zero-trust may include model storage policy, model access policy, attribute-based access control, handling of read vs. write queries, traceability and auditability, and a model trust policy, etc. For instance, model access may be restricted to specific splice functions, authenticating users and models at API endpoints to DE models, allowing customers (e.g., model owners or model developers) to set additional access control policies, implementing data restrictions and encryptions, recording endpoint transactions in a secure database, and incorporating metadata and digital watermarks for traceability and auditability, etc. The goal is to ensure the right authenticated user has access to the right authenticated model and to assess model truth and user credibility.

Specifically, embodiments of the present invention enable the implementation of the aforementioned zero-trust policies by restricting access to model data/digital artifacts to a specific subset of splice functions, and by tracking API endpoint transactions, which are executions or invocations of splice functions. In some embodiments, access restrictions to model data and digital artifacts may be implemented by authenticating users, for example using attribute-based access control. These attribute-based access controls can include username, password, email, security keys, information security (infosec) levels, DE model expertise, role in a digital review, etc.

In some implementations, a model splice may comprise one or more infosec tags or markings for zero-trust access control on a "need-to-know" basis, where an infosec tag may indicate an access level to one or more of the model splice itself, the digital artifacts, and/or the splice functions. Tagging individual or groups of digital artifacts and/or splice functions with infosec information may enforce zero-trust access control by categorizing each based on its sensitivity and the security requirements for access. This approach may minimize the risk of unauthorized access and data breaches while enabling secure collaboration and data sharing among authorized users.

In one non-limiting example, infosec levels may be defined based on the types of data handled within DE models. Such levels could range from public, to confidential, secret, or could be specifically defined based on organizational levels where a digital artifact or a splice function at a given infosec level can only be read and/or edited and/or executed by a user having a matching or higher infosec level, or having a particular role in a project. A model splice may inherit the input DE model's infosec level, and each individual digital artifact or splice function contained within the model splice may be assigned the same infosec level. In some embodiments, the DE model owner creating the model splice, or an admin or managing user who understands the nature of the data and the potential impact of its disclosure, may specify infosec levels for individual digital artifacts or splice functions. Such infosec metadata may travel with the model splice, digital artifact(s), or splice function(s) to ensure that the security level is clear, no matter where the data is moved to and how the functions are invoked. When a model splice is shared, access control policies may be practiced to correspond with the defined infosec levels, to dictate who can access the model splice, data, or functions, based on their security clearance, role within an organization, and/or the context of access requests. With such infosec metadata, access control may be enforced at every access point or API/SDK endpoint of the DE model. When a user attempts to invoke a splice function to access a digital artifact, the infosec tag of the digital artifact and/or the splice function may be checked against the user's credentials and any active access control policies. Access may be granted if the user's clearance level meets or exceeds infosec level.

In a zero-trust model, verification is not a one-time event. The system may continuously monitor access and re-verify credentials and security levels to ensure that access remains appropriate. Any changes in a user's role, clearance level, or the data/function's infosec level may trigger a re-evaluation of access permissions.

In some embodiments, a traceability and auditability policy may be implemented by tracking or tracing any access to or specific manipulation of a specific DE model via its model splice. In particular, a detailed audit log of all access attempts, both successful and unsuccessful, may be maintained, to enable traceability and to facilitate review of access patterns. Such event logs on any splice function execution or API endpoint transaction may be recorded as metadata, for example in an endpoint transaction database or as non-fungible tokens on a private blockchain.

Table 1 below shows exemplary endpoint metadata associated with the generation or execution of a model splice. Such metadata may be stored in a secure endpoint transaction database or on a private blockchain, and may be linked from, or contained in, the model splice itself. Such metadata may include model owner organization, model owner ID, user ID, access rights of user, device ID, device location according to IP number and geographic location identifiers, and ID for the model splice and splice functions, transaction commands related to the model splice and splice function calls, a time associated with each transaction command, and a value associated with the transaction. Other examples can include a function ID, a type of method to be called; a start time of the transaction; an end time of the transaction, a duration; the parameters of the call made by the model splice and splice function, the success of the call (e.g., either "TRUE" or "FALSE"); CPU cost time in money, time and cycles; and GPU cost time in money, time and cycles. Other examples are also possible.

TABLE 1

| Exemplary Endpoint Metadata | |
|---|---|
| Model ID | 1 |
| Model Address | 192.168.1.100 |
| Wrapper ID | 1 |
| Function ID | 1 |
| METHOD | GET |
| Started (Time) | Jan. 1, 2022 8:00 |
| Finished (Time) | Jan. 1, 2022 8:15 |
| Duration | 15 mins |
| Value ($) | $50 |
| API Call ID | 1001 |
| Call Parameters | {"input1": 5} |
| Success? | TRUE |
| Model Owner ID | 1 |
| Model Org ID | Acme Inc |

TABLE 1-continued

Exemplary Endpoint Metadata

| Model Type | NLP |
|---|---|
| Model Type ID | AI-Acme-1 |
| Encryption Type? | AES256 |
| CPU Cost (Time, $, cycles, etc.) | 0 sec, $0.50, 100 cycles |
| GPU Cost (Time, $, cycles, etc.) | 5 sec, $0.25, 100 cycles |

Model Splicing enables zero-trust access for several reasons:
1. Model splice provides API endpoints for accessing model data.
2. Data security in the IDEP may follow a zero-trust approach for users, networks, and models with attribute-based access control for authorization.
3. Zero trust for models implies users are authenticated and authorized in order to use specific model splices for accessing specific API functions.
4. Endpoint metadata tracking allows access-based controls to specific functions of models for authorized users, and models can be digitally watermarked for traceability and auditability.

Providing Training Data for AI

As discussed with reference to AI-based recommender/generator engine 1236 and system database 1380, in some embodiments, user inputs and actions, input DE model and the resulting model splice (e.g., data descriptors, model component details, specific digital artifact calculated from splice functions, etc.) may be stored and consolidated to provide core training data for AI-assisted capabilities that may enable the scalable sharing of large libraries of models and versatile linking of different models into digital threads. That is, such training data may be used to fine-tune AI algorithms which may assist users in creating model splices and/or digital threads.

The IDEP may also implement additional steps to ensure that the model splices created provide a continuous data stream that serves as training data for automation and AI-assisted capabilities. Example steps include, but are not limited to:
1. Determine which APIs and functions within the DE model are necessary to execute an identified workflow and user action.
2. Develop a model splice that links only the necessary APIs and functions, and captures data on user interactions with those APIs and functions.
3. Use the model splice to create a data stream that reflects user workflows and actions, as well as the specific API functions in specific model-type files.
4. Use the model splice actions' dataset to automate user actions or feed into machine learning engines that perform predictive analytics on typical user actions or security audits.
5. Use the resulting data stream as a training dataset to fine-tune AI algorithms that can assist users in creating digital threads and performing other tasks related to the DE system.
6. Continue to capture data using the model splicer to improve the accuracy and effectiveness of the training dataset over time.
7. Enhance the training dataset using synthetic data generation, as well as customization for enterprise-specific models for customers.
8. Continuously evaluate and update the model splicer and training dataset to ensure they remain aligned with the evolving needs of the digital engineering system and the workflows and actions of users.

Thus, a model splicer's action dataset may be used to automate user actions, or feed into machine learning engines that perform predictive analytics on typical user actions, security audits, etc. The training dataset can also be enhanced using synthetic data generation and can be customized to train enterprise-specific models for customers.

Exemplary Implementation for Model Splicing Computer Aided Design (CAD) Models

Figure 14:
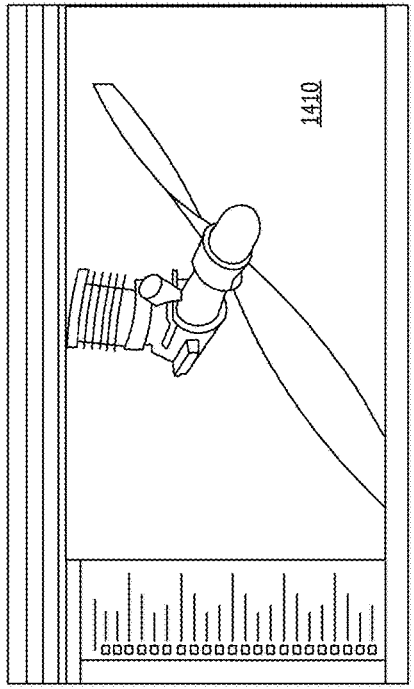
FIG. 14 shows a collection of exemplary representations and edit interfaces for a computer-aided design (CAD) of an aircraft propeller engine, in accordance with some embodiments of the present invention.
Figure 14:
Figure 14:
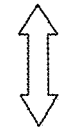
Figure 14:
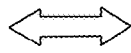
Figure 14:
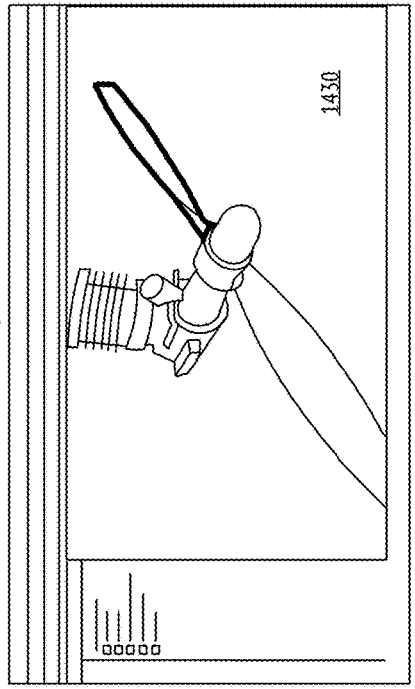
Figure 15:
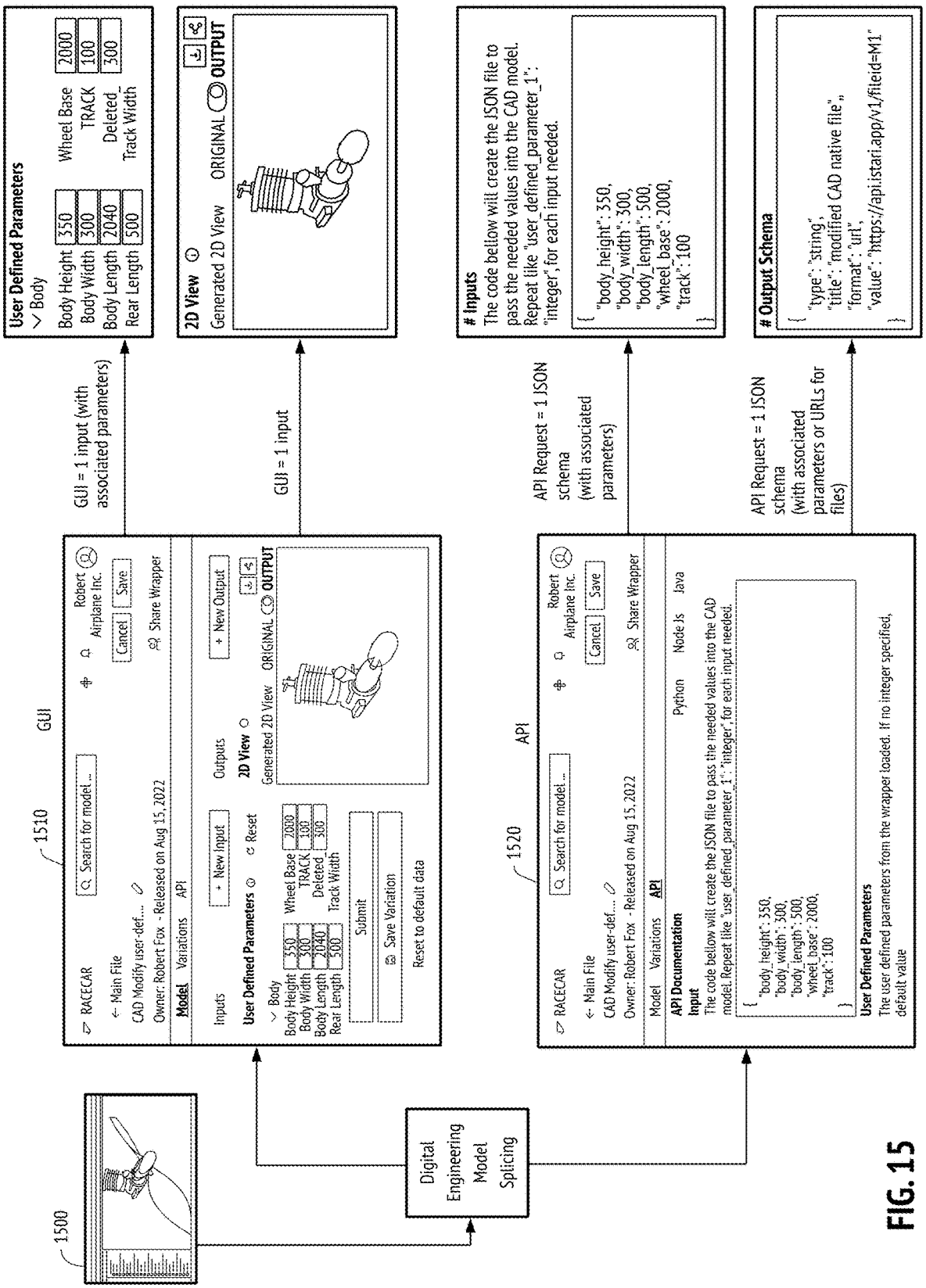
FIG. 15 shows an illustrative example of CAD model splicing results within the IDEP, in accordance with some embodiments of the present invention.

As illustrative examples of the model splicing process and model splicer implementation, illustrative examples of how an end user may interact with a model splicer via a user interface is described next. Specifically, FIG. 14 shows a collection 1400 of exemplary representations and edit interfaces 1410, 1420, 1430, and 1440 for a computer-aided design (CAD) of an aircraft propeller engine, in accordance with some embodiments of the present invention. FIG. 15 shows an illustrative example of CAD model splicing results within the IDEP, and FIGS. 16 to 19 are additional exemplary screen captures for DE model uploading, model splicing, and splice sharing respectively, in accordance with some embodiments of the present invention.

Shown in FIG. 14 is an exemplary representation 1410 is of a computer-aided design (CAD) for an aircraft propeller engine, as presented to a human user via a graphical user interface (GUI). This propeller engine or propeller assembly comprises a two-bladed propeller and an accompanying propeller engine having an engine cylinder, an engine cap, and an engine radiator. Also shown in FIG. 14 is a corresponding human-readable and computer-readable textual representation 1420 of the aircraft propeller engine design. A mechanical engineer typically looks at the propeller engine design via the GUI 1410 to perform measurements on this visual model, but software for a Bill of Materials (BOM) cost analysis would read the text-based descriptions 1420 of design parameters.

Further shown in FIG. 14 is an exemplary edit action 1430 on the aircraft propeller engine, where one blade of the propeller is manually selected by the user for further visualization, modification, analysis, and/or optimization. For example, the user may choose to hide the blade from view. Correspondingly, a function script 1440 is shown for execution on the CAD model file to perform the same component removal/hiding function.

In general, DE model creation and editing are performed via a GUI, using different DE tools as provided by proprietary modeling software, or by scripting, using API commands provided by the modeling software. Just as it takes time for a user to learn a GUI, the learning curve for a scripting language is also steep. For example, commonly available commercial API libraries are typically highly sophisticated with tens of packages each having hundreds of nested classes, enumerations, methods, and properties.

FIG. 15 shows an illustrative example of CAD model splicing results within the IDEP, in accordance with some embodiments of the present invention. In this example, an input CAD file 1500 for a propeller engine is spliced into model data and splice functions written as scripts that call upon native DE tool APIs. Exemplary model data are shown in an GUI interface 1510 with input parameter fields on the left, and an output visualization on the right. Data schemas and/or API scripts may be accessed via a separate tab 1520 in the GUI, listing input schemas and output schemas for API endpoints to pass needed values into the CAD model, or for providing output locations of modified native files.

Figure 16:
FIG. 16 is a screen capture of an exemplary model splicer interface showing a visual representation of an input aircraft propeller engine file, in accordance with some embodiments of the present invention.
Figure 17:
FIG. 17 is a screen capture of an exemplary model splice "Hide parts & Share 2D file" generated from the input CAD file shown in FIG. 16, in accordance with some embodiments of the present invention.
Figure 18:
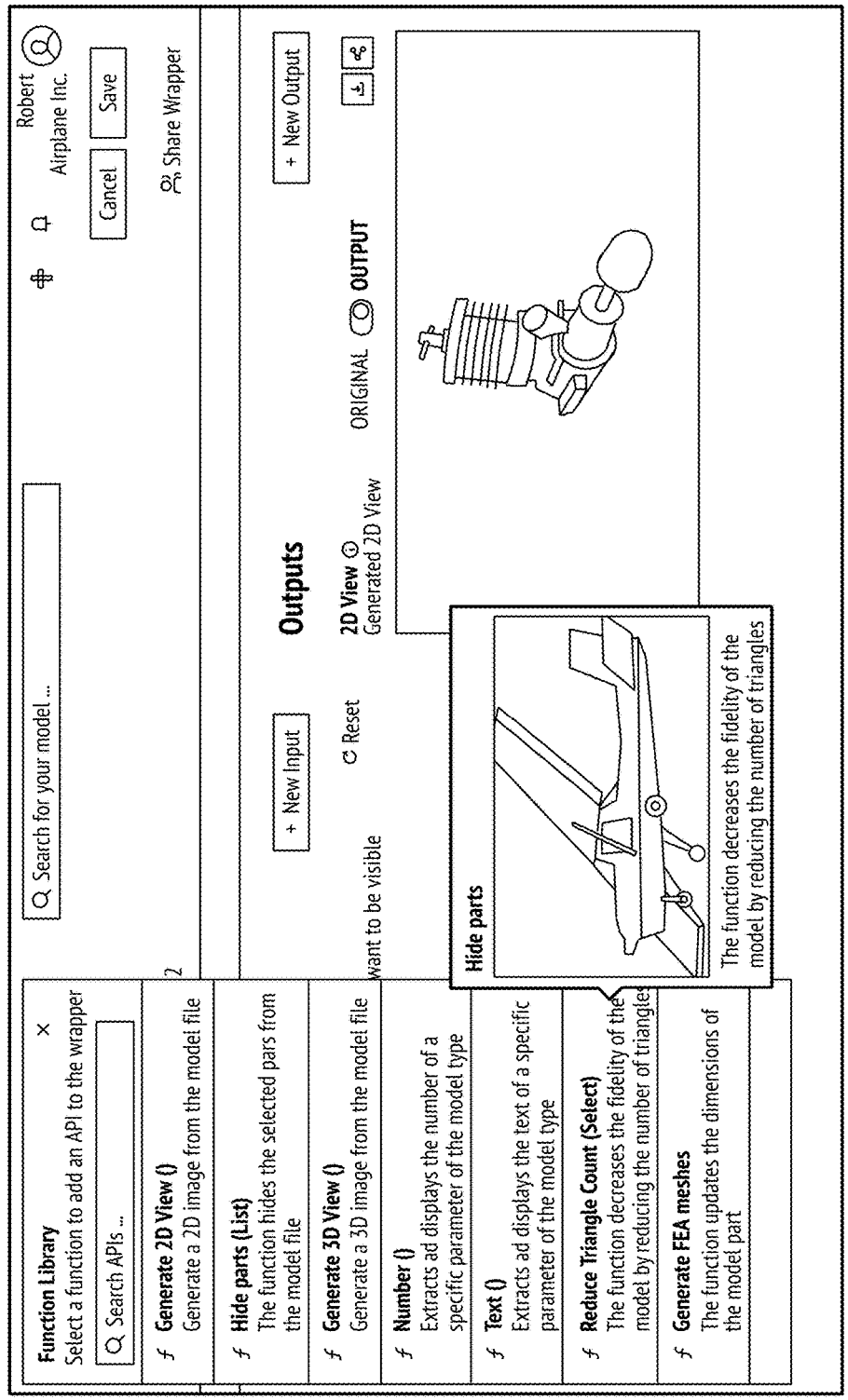
FIG. 18 is a screen capture of an exemplary user interface for receiving user input to add a splice function to the exemplary model splice in FIG. 17, in accordance with some embodiments of the present invention.
Figure 19:
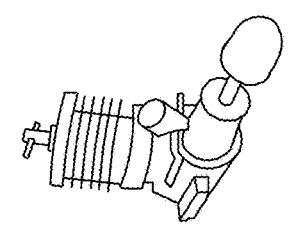
FIG. 19 is a screen capture of the exemplary model splice in FIG. 17 after user modification according to FIG. 18, and executed to provide an output, in accordance with some embodiments of the present invention.

FIG. 16 is a screen capture 1600 of an exemplary model splicer interface, showing a visual representation of an input aircraft propeller engine file, and three default/base model splices resulting from a model splicing process: Hide parts & Share 2D file, Share 2D image of model, and Share editable parameters to 2D image, in accordance to some embodiments of the present invention. FIG. 17 is a screen capture 1700 of an exemplary model splice "Hide parts & Share 2D file" generated from the input CAD file shown in FIG. 16, in accordance with the examples disclosed herein. FIG. 18 is a screen capture 1800 of an exemplary user interface for receiving user input to add a splice function to the exemplary model splice in FIG. 17, in accordance with the examples disclosed herein. FIG. 19 is a screen capture 1900 of the exemplary model splice in FIG. 17 after user modification according to FIG. 18, and executed to provide an output, in accordance with the examples disclosed herein.

In some embodiments, model type-specific base model splices may be generated automatically by the IDEP when a model file is uploaded. In this particular example, the input file is in a CAD data file format containing 3D model attributes for the model part (e.g., surface and solid information). The base model splices shown in FIG. 16, each containing one or more API scripts, may be generated automatically by the model splicer system, specific to the input CAD file type. These base model splices represent typical model data and function sets used for model reviewing and sharing. For example, when a Hide parts & Share 2D file model splice is selected by a user and executed, one or more updated part files (e.g., engine_noPropeller.prt) may be generated that hide selected part(s) of the input 3D model of the aircraft propeller engine. In FIG. 17, user input is received to hide a selected propeller part of the propeller engine. This model splice comprises component part data of the input propeller engine such as propeller, engine cylinder, engine cap, and engine radiator, as well as splice functions written as API function scripts for hiding one or more selected component parts from view, and for sharing the wrapper execution result. On the left is an input panel for receiving user selection of component parts to hide. On the right is an output panel showing visually the wrapper execution result.

The user may further modify the selected base model splice/wrapper by adding one or more functions specific to the input model data file type. For example, by selecting the "+New input" icon in FIG. 17, a function library may be shown to the user, who may choose to add a Reduce Triangle Count (Select) function to decrease the fidelity of the model by reducing the number of triangles in its rendering, as shown in FIG. 18. Once added, new input fields are displayed, as illustrated by FIG. 19, allowing the user to select from High, Medium, Low, and Lowest fidelity options.

FIG. 19 shows an exemplary screen capture 1900 of a spliced model ready to be shared, in accordance with the examples disclosed herein. The model splicer wraps the input model file into a variant for secure sharing. In this particular example, the variant is a low-fidelity version of the input aircraft propeller engine without the propeller, as visualized on the right side of FIG. 19. In general, a model splice/variant, when executed, may provide a variety of capabilities to link, query, and manage DE models and digital artifacts, including but not limited to the following.

1. Data queries, for example:
   a. For a given 3D CAD model, what is the center of gravity? What is the weight?
   b. For a given digital requirements model, what are the technical architecture components associated with this requirement?
   c. For a given DE model, what is the cost associated with a specific requirement?
2. Selective modifications to model parameters, for example:
   a. Query and change subset of requirements
   b. Change scale of certain sub-assemblies
   c. Change related properties or metadata of a selection
3. Data redaction, for example:
   a. Redact details of an assembly (e.g., hide sub-part or sub-assembly)
   b. Change visual display to lower fidelity or lower resolution
   c. Redact aspects of the technical architecture
   d. Obscure how the proprietary model calculations are executed
4. Creation steps, for example:
   a. Create a new product or model from text input
   b. Create and link documentation that accompanies an existing model
5. Collaboration, for example:
   a. Owner (e.g., creator of a model splice) uploads file and shares with a collaborator:
      i. Upload CAD model file
      ii. Create a model splice using inputs to hide parts and reduce fidelity and output a digital artifact such as a 2D image
      iii. Execute the wrapper
      iv. Share the wrapper with collaborator(s) and give them viewer privileges
   b. Collaborator interacts with file from the owner:
      i. View a low fidelity 2D image with a redacted part API Script Generation In the aforementioned aircraft propeller engine example, the model splicer generates a HideParts(parts_list) API function script or splice function (see FIG. 17, 18 or 19) which can hide parts or components within a CAD model, and may be executed via the Hide parts & Share Compressed 2D File model splice with a single function call:

Settings.Operation=Operations.HideParts

By comparison, below are pseudo code for HideParts, which shows the complexity involved, as well exemplary code written using native API functions to implement the HideParts splice function, which a user of a CAD software would need to write on their own, by first learning the software's native API Library.

Pseudocode Example:

//Pseudocode for Hide_Parts code
1. function RemoveComponents( ):
   a. Clear error list in Session UpdateManager
   b. Create parts array & add the parts' components to it
   c. Add the components to UpdateManager's delete list
   d. Get newest visible undo mark (id) & perform update
   e. Catch & log exceptions, then throw new exception with error
2. Main code:
   a. Loop through ModelParts in modelAssembly.Parts Call RemoveComponents on part if part.Name in removedParts
   b. Create EntityBuilder with theSession & get workPart
   c. Get root component; Build the entityBuilder object
   d. Create ModelAssembly & set properties using entityBuilder results
   e. Set ModelAssembly.Status to "Success" & FilePath to InputFilepath

```
// End of Pseudocode
Code Example:
// Hide_Parts
// Need to remove the components from the root assembly
    first
// Then rebuild the model assembly object
foreach {ModelPart part in modelAssembly.Parts)
{
    if (removedParts.Contains(part.Name))
    {
        part.RemoveComponents( );
    }
}
entityBuilder=new EntityBuilder(theSession);
workPart=thesession.Parts.work;
root=workPart.ComponentAssesbly.RootComponent;
if {root !=null)
    entityBuilder.Built(root);
else
    entityBuilder.Build{workPart1;
modelAsseably=new ModelAssembly{theSession);
modelAssecbly.Root=entityBuilder.Root;
modelAsseably.BillOfMaterials=entityBuilder.
    BillOfMaterials;
modelAsseably.Parts=entityBuilder.Parts;
modelAssecbly.Status="Success";
modelAsseably.Fi\ePath=settings.InputFilepath;
internal void RemoveComponentso
{
    try
    {
        Session.UpdateManager.ClearErrorlist( );
        Open.TaggedObject[ ] Objects=new
          Open.TaggedObject[_components.Count];
        for (int i=0; i<_components.Count; ++i)
            Objects[i]=_components[i];
        int nErrs1;
        nErrs1=Session.UpdateManager.Add
            ObjectsToDeleteList(Objects);
        Open.Session.UndoMarkID id1;
        id!=_Session.NewestVisibleUndoMark;
        int nErrs2;
        nErrs2=Session.UpdateManager.DoUpdate(id1);
    }
    catch (Exception ex)
    {
        Logger.Log(LogLevel.Error,    $"Error    removing
            {_part.Name}");
        Logger.Log(LogLevel.Error, $"Message: {ex.Message}");
        throw new Exception($"Error While hiding part
            \"{_part.name)"");
    }
}
```

It is clear that this HideParts function is rather complex when written using the native DE tool API and may need to be done with multiple script files. A user has a steep learning curve to interface with the CAD model via only the native API without relying on a graphical user interface (GUI). It becomes even more complex when multiple DE models with different tool APIs are considered. In the IDEP, this complexity is absorbed by the model splicer, which encapsulates tool-specific API commands into platform API scripts.

Furthermore, API execution may require expensive software licenses in order to interface with proprietary model file formats. Current engineering design and simulation software platforms all offer similar models, but no one has the best tools.

Various embodiments of the model splicer as disclosed herein may employ both proprietary and/or open-source file formats and API functions. In a first embodiment, the model splicer may write splice function scripts for customers, who may execute these scripts using their own licenses consistent with their End-User License Agreements (EULAs). In a second embodiment, the model splicer uses a combination of open-source files and open-source APIs, for example, pivoting from using proprietary files (e.g., *.prt) to open-source files (e.g., *.obj, *.stl, *.stp). There are many open-source model file types available. In a third embodiment, the model splicer may use only APIs from open-source tools, and convert at the end back to proprietary formats. One challenge in this process is that there may be some losses in data between conversions, but proprietary tool providers may offer good importing tools to import from open-source file formats. Table 2 below lists exemplary combinations of proprietary and open-source file formats and DE tool functions/APIs that may be used for model splicer implementation. Three combinations are listed in three rows below, but other combinations are possible as well.

TABLE 2

Proprietary and Open-Source File Formats and Functions
in Exemplary Model Splicer Implementations

| Input File Format | Intermediary File Formats | DE Tool API Functions used to generate splice function scripts | Output File Format |
| --- | --- | --- | --- |
| Proprietary | Proprietary | Proprietary | Proprietary |
| Open Source | Open Source | Open Source | Open Source |
| Proprietary | Open Source | Open Source | Proprietary |

Figure 20:
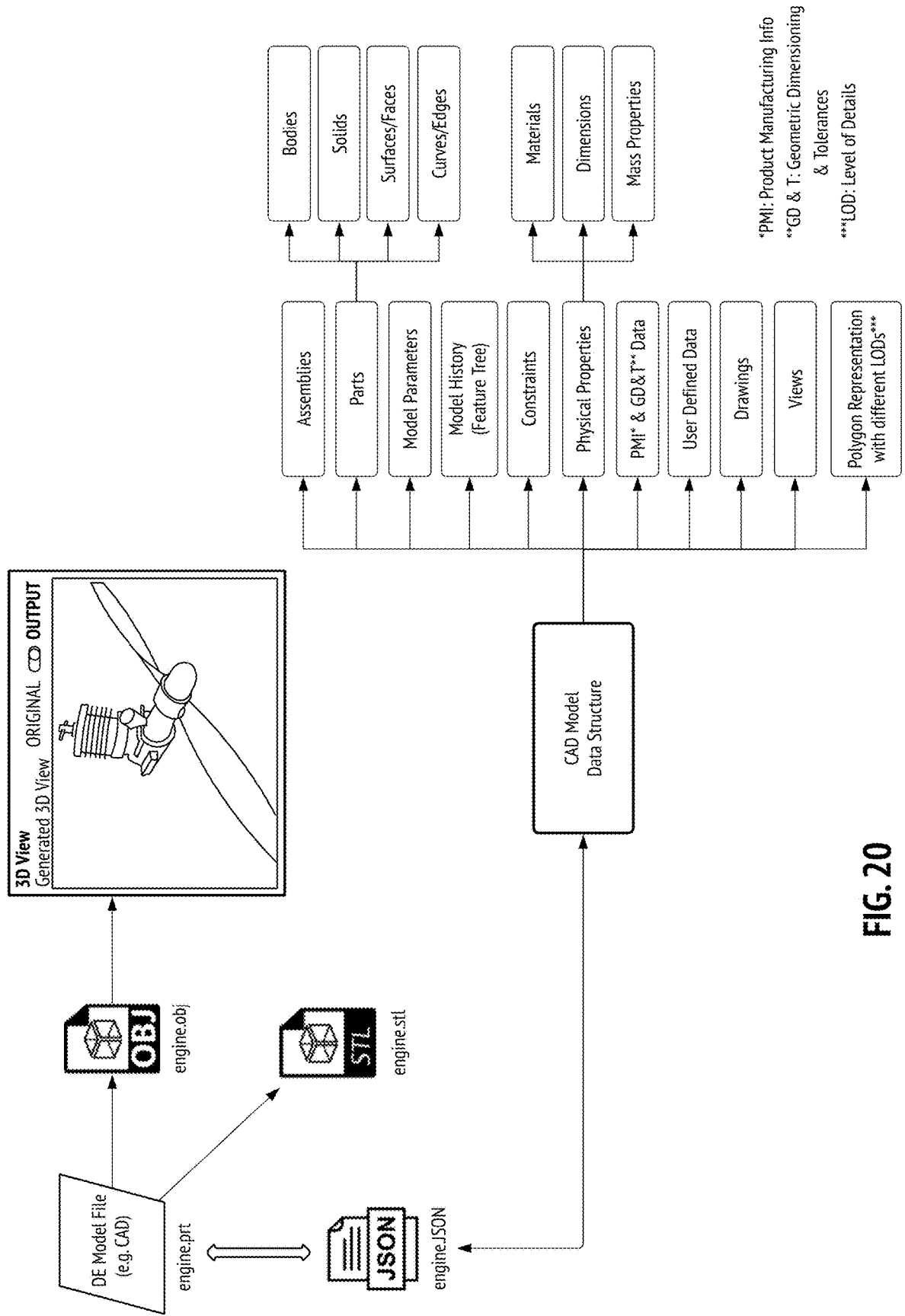
FIG. 20 is an exemplary data structure schematic for storing model data and digital artifacts extracted or derived from computer aided design (CAD) or computer aided design and drafting (CADD) models, in accordance with some embodiments of the present invention.

Exemplary Model Data and Digital Artifacts from Computer Aided Design (CAD) Models FIG. 20 is an exemplary data structure schematic 2000 for storing model data and digital artifacts extracted or derived from computer aided design (CAD) or computer aided design and drafting (CADD) models, in accordance with some embodiments of the present invention. As illustrated by the example shown in FIGS. 16 to 19, computer-aided design is the use of computers to digitally create real-world products in 2D or 3D to aid in the modification, analysis, and optimizations of the design. There are numerous widely available types of proprietary and open-source CAD file formats, including but not limited to, .dwg, .dxf, .sldprt, .sldasm, .slddrw, .catpart, .catproduct, .prt, .asm, .ipt, .iam, .cas, .dat, .foam, .mph, .sim, .sce, .ans, .rst, .inp, .odb, .nas, .pch, .op2, .f06, .pdb, .bdf, .dxl, .alm, .eap, .eapx, .archimate, .rsa, .vpp, .adf, .rsk, .xls, .xlsx, .cstx, .dpl, .pfd, .tc, .we, .enovia, .rvt, .rfa, .rte, .pln, .lcf, .gsm, .dgn, .dgnlib, .vwx, .skp, .nlogo, .alp, .rs, .gaml, .java, .vmf, .vpm, .itm, .stmx, .adm, .bin, .spc, .mbd, .mvw, .vl, .hfss, .cst, .feko, .cir, .ckt, .asc, .ms14, .tsc, .ipk, .pdml, .zmx, .zda, .cv, .srf, .fred, .lt, .asap, .shp, .gdb, .mxd, .qgs, .gpkg, .gmw, .grass, .gvsig, .doe, .simproj, .fsm, .mox, .m, .mat, .vi, .df, .shm, .dem, .dtm, .tif, .asc, .grd, .simscale, .hm, .unity, .asset, .prefab, .uproject, .umap, .uasset, .html, .js, .max, .fbx, .pb, .ckpt, .pt, .pth, .pkl, .h5, .json, .bin, .gjf, .g03, .g09, .inp, .dat, .nw, .nwo, .inp, .out, .in, .out, .gro, .top, .mdp, .psf, .pdb, .conf, .crd, .psf, .inp, .prmtop, .inperd, .mdin, .lmp, .data, .in, .inp, .out, .bin, .inp, .out, .log, .hysplit, .inp, .out, .adms, .cfg, etc., in text-file format or in binary format. A CAD file contains a technical drawing, blueprint, schematic, or rendering of a real-world object and may be parsed to obtain digital artifacts, which may comprise model data, metadata, and derivative data. In some embodiments, a CAD model splicer is capable of splicing a single CAD file format using appropriate DE tools that support this CAD file format (e.g., a native DE tool associated with a native CAD file format). In some embodiments, a CAD model splicer is capable of splicing a selected number of CAD file formats by first detecting the file format, then determining available or accessible engineering toolboxes. As shown in FIG. 20, a CAD model file may be disassembled into component data including, but not limited to, assemblies, parts (e.g., bodies, solids, surfaces/faces, curves/edges), model parameters, model history (e.g., feature tree), constraints, physical properties (e.g., materials, dimensions, mass properties), product manufacturing information (PMI), geometric dimensioning and tolerances (GD&T), user defined data, drawings, views, and polygon representation with different levels of details (LODs).

In the IDEP, model data or digital artifacts from a CAD model, as well as other types of digital models, may be stored as individual files and JSON metadata files. This universal and standardized setup helps maintain unified data types for different model types. Such digital artifacts may include, but is not limited to, metadata, original CAD file in native format, CAD model polygonal representation for visualization and 3D printing, different views of the model, and Bill of Materials Table.

The following is an exemplary data structure for digital artifacts extracted or derived from a CAD model, written in JSON format as a list of variables.

```
{
    "rootAssembly": {
        "id": 0,
        "name": "Gear",
        "type": "Part",
        "children": null
    },
    "billOfMaterials": [
        {
            "partName": "Gear",
            "type": "Part",
            "partCount": 1,
            "weight": 0.0,
            "mass": 0.0,
            "volume": 0.0,
            "area": 0.0,
            "material": null
        }
    ],
    "parts": [
        {
            "name": "Gear",
            "material": null,
            "bodies": [
                {
                    "name": "",
                    "id": 0,
// type can be Sheet or Solid.
                    "type": "Solid",
// The bounding box of the body.
                    "boundingBox": {
                        "minCorner": {
                            "x": -363.29020457370183,
                            "y": -370.328341109766,
                            "z": 0.0
                        },
                        "maxCorner": {
                            "x": 363.29020457370206,
                            "y": 370.32834110976592,
                            "z": 120.0
                        },
                        "dimensions": {
                            "x": 726.58040914740388,
                            "y": 740.65668221953183,
                            "z": 120.0
                        },
                        "center": {
                            "x": 1.1368683772161603E-13,
                            "y": -2.8421709430404007E-14,
                            "z": 60.0
                        }
                    },
                    "massProps": {
// SurfaceArea: The total surface area of the body.
                        "surfaceArea": 11182.427352959272,
// Volume: The volume of the body. Zero if the body is of type Sheet.
                        "volume": 39681.4510976672,
// Mass: The total mass of the body in grams.
                        "mass": 310731.15822343668,
// CenterOfMass: The coordinates of the center of mass of the body in the World Coordinate
System (WCS).
```

```
                    "centerOfMass": {
                        "x": -2.0251382073768754E-16,
                        "y": -5.4736686832914439E-15,
                        "z": 6.0
                    },
// FirstMoments: The first moments (centroidal) of the body in the WCS.
                    "firstMoments": {
                        "x": -6.2927354074075078E-11,
                        "y": -1.7008394096905041E-09,
                        "z": 1864386.94934062
                    },
// MomentsOfInertia WCS: The moments of inertia of the body in the WCS.
                    "momentsOfInertiaWCS": {
                        "x": 113042396.68129998,
                        "y": 113042396.68130012,
                        "z": 196254602.17315021
                    },
// MomentsOfInertiaCentroidal: The moments of inertia (centroidal) of the body.
                    "momentsOfInertiaCentroidal": {
                        "x": 101856074.98525627,
                        "y": 101856074.98525642,
                        "z": 196254602.17315021
                    },
// SphericalMomentOfInertia: The spherical moment of inertia of the body.
                    "sphericalMomentOfInertia": 199983376.07183146,
// InertiaProductsWCS: The inertia products of the body in the WCS.
                    "inertiaProducts WCS": {
                        "x": -1.0635097345378154E-08,
                        "y": 6.4592450027546993E-10,
                        "z": -5.7042166671551855E-09
                    },
// InertiaProductsCentroidal: The inertia products (centroidal) of the body.
                    "inertiaProductsCentroidal": {
                        "x": -4.3006088723513236E-10,
                        "y": 1.0234886247199205E-09,
                        "z": -5.7042166671551855E-09
                    },
// PrincipalAxesWCS: The principal axes of the body in the WCS.
                    "principalAxesWCS": [
                        {
                            "x": 0.0,
                            "y": 0.0,
                            "z": 1.0
                        },
                        {
                            "x": 1.0,
                            "y": 0.0,
                            "z": 0.0
                        }
                        {
                            "x": 0.0,
                            "y": 1.0,
                            "z": 0.0
                        }
                    ],
// PrincipalMomentsCentroidal: The principal moments (centroidal) of the body.
                    "principalMomentsCentroidal": {
                        "x": 196254602.17315021,
                        "y": 101856074.98525627,
                        "z": 101856074.98525642
                    },
// RadiiOfGyrationWCS: The radii of gyration of the body in the WCS.
                    "radiiOfGyrationWCS": {
                        "x": 19.073407013460528,
                        "y": 19.073407013460542,
                        "z": 25.131448629202641
                    },
// RadiiOfGyrationCentroidal: The radii of gyration (centroidal) of the body.
                    "radiiOfGyrationCentroidal": {
                        "x": 18.105105774369981,
                        "y": 18.105105774369996,
                        "z": 25.131448629202641
                    },
// SphericalRadiusOfGyration: The spherical radius of gyration of the body.
                    "sphericalRadiusOfGyration":
25.369069951463558,
// Density: The density of the body.
                    "density": 7.8306400000000007
                }
            }
```

```
],
"userDefinedExpressions": [
  {
    "name": "HoleDiam",
    "value": 180.0,
    "exprString": "HoleDiam=180"
  },
  {
    "name": "CogsCount",
    "value": 10.0,
    "exprString": "CogsCount=10"
  }
],
"features": [
  {
    "name": "Extrude(1)",
    "type": "EXTRUDE",
    "expressions": [
      {
        "name": "p0",
        "value": 0.0,
        "exprString": "p0=0"
      },
      {
        "name": "p1",
        "value": 120.0,
        "exprString": "p1=120"
      }
    ]
  },
  {
    "name": "SKETCH_001:Sketch(2)",
    "type": "SKETCH",
    "expressions": [
      {
        "name": "HoleDiam",
        "value": 180.0,
        "exprString": "HoleDiam=180"
      }
    ]
  },
  {
    "name": "Extrude(2)",
    "type": "EXTRUDE",
    "expressions": [
      {
        "name": "HoleDiam",
        "value": 180.0,
        "exprString": "HoleDiam=180"
      },
      {
        "name": "p3",
        "value": 120.0,
        "exprString": "p3=120"
      }
    ]
  },
  {
    "name": "SKETCH_002:Sketch(3)",
    "type": "SKETCH",
    "expressions": [
      {
        "name": "Pattern_p28",
        "value": 10.0,
        "exprString": "Pattern_p28=10"
      },
      {
        "name": "Pattern_p29",
        "value": 360.0,
        "exprString": "Pattern_p29=360"
      }
    ]
  },
  {
    "name": "Extrude(6)",
    "type": "EXTRUDE",
    "expressions": [
      {
        "name": "p4",
```

```
        "value": 0.0,
        "exprString": "p4=0"
      },
      {
        "name": "p5",
        "value": 120.0,
        "exprString": "p5=120"
      }
    ]
  },
  {
    "name": "Pattern Feature [Circular](7)",
    "type": "Pattern Feature",
    "expressions": [
      {
        "name": "CogsCount",
        "value": 10.0,
        "exprString": "CogsCount=10"
      },
      {
        "name": "p16",
        "value": 360.0,
        "exprString": "p16=360"
      }
    ]
  }
 ],
 "status": "Success",
 "message": null
}
```

Figure 21:
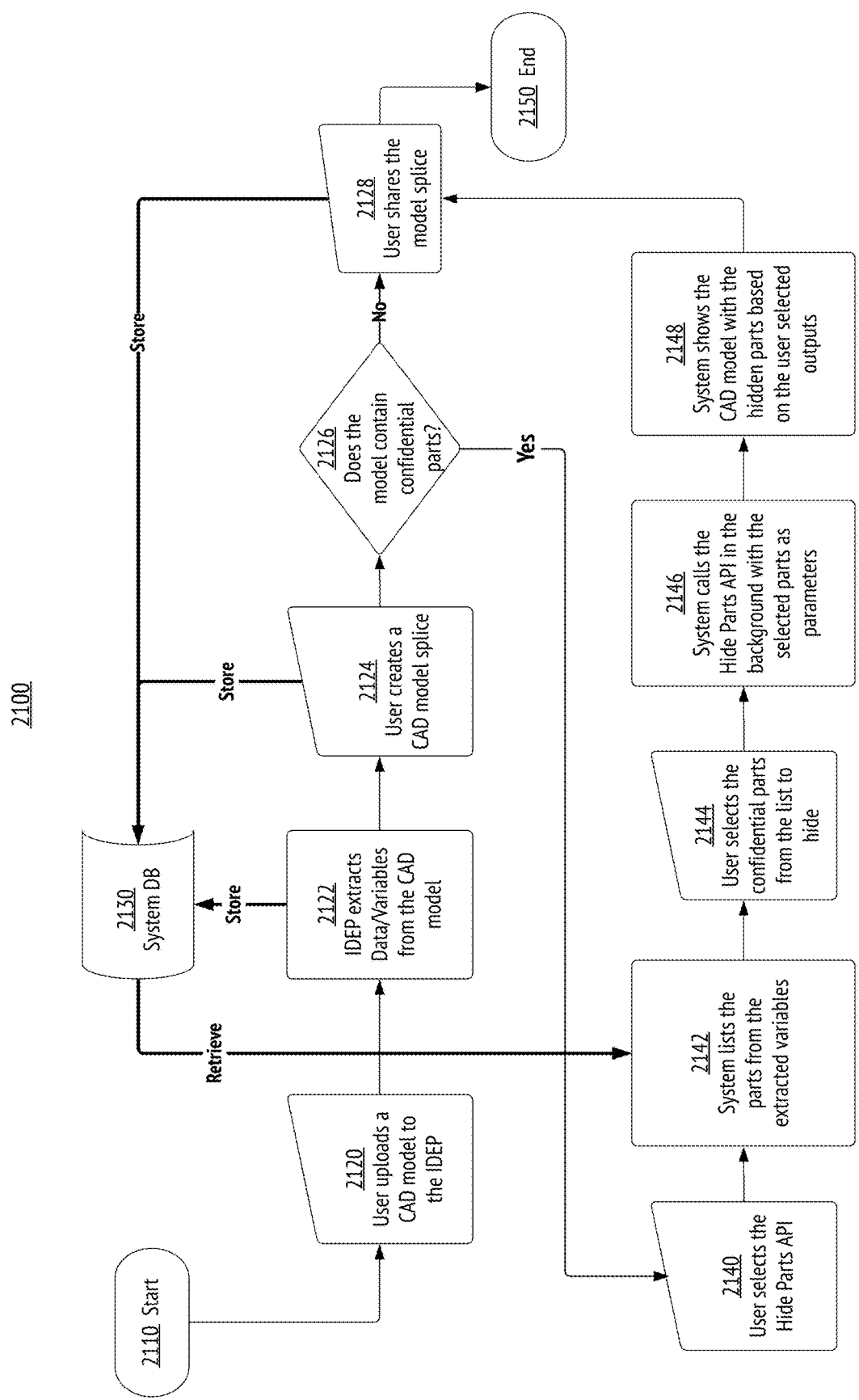
FIG. 21 illustrates a model splicing process for hiding parts of a CAD model, in accordance with some embodiments of the present invention.

FIG. 21 expands on FIG. 13 and illustrates a model splicing process 2100 for hiding parts of a CAD 30 model, in accordance with some embodiments of the present invention. Upon initiation at a step 2110, Assuming the user is logged-in, the user first uploads a CAD model to the IDEP at a step 2120. The IDEP may send messages to an appropriate server, microservice, computing entity, or computing module to process the input model file and extract data from the CAD model into a data structure at a step 2122, for example as discussed with reference to FIG. 20. Note data extracted from the model may not represent the whole model, and some fields in the data structure shown in FIG. 20 may be empty/null. The system may store the model type-specific data structure in a system database 2130, and create a CAD model splice at a step 2124.

Next, the system may prompt the user to determine if the model contains confidential model parts 2126. For example, the HideParts splice function may be made available, and the user may select this function at a step 2140 (e.g., through an interface such as in FIG. 18), as an implicit indication that the model contains confidential information. The system may list the parts from the extracted variables at a step 2142, further allowing the user to select one or more confidential part from the list to hide at a step 2144 (e.g., through an interface such as in FIG. 19). The system may then call the HideParts API in the background with the selected parts as parameters at a step 2146, while showing the CAD model with the hidden parts based on the user selected outputs at a step 2148. In various embodiments, the output of this model splicing and hiding CAD parts process may include, but are not limited to, 3D views (e.g., the visual representation of the model with the selected parts hidden from the view), downloadable links (e.g., a link to the CAD model with the parts removed), 2D renders from standard views such as top, left, right, isometric, etc., BOM table (e.g., a table that shows the frequency of parts and materials attributes), and STL files for 3D printing. The process terminates at a step 2150 after the user shares the model splice with collaborators at a step 2128.

Exemplary Implementation for Model Splicing Computing and Simulation Scripts

Figure 22:
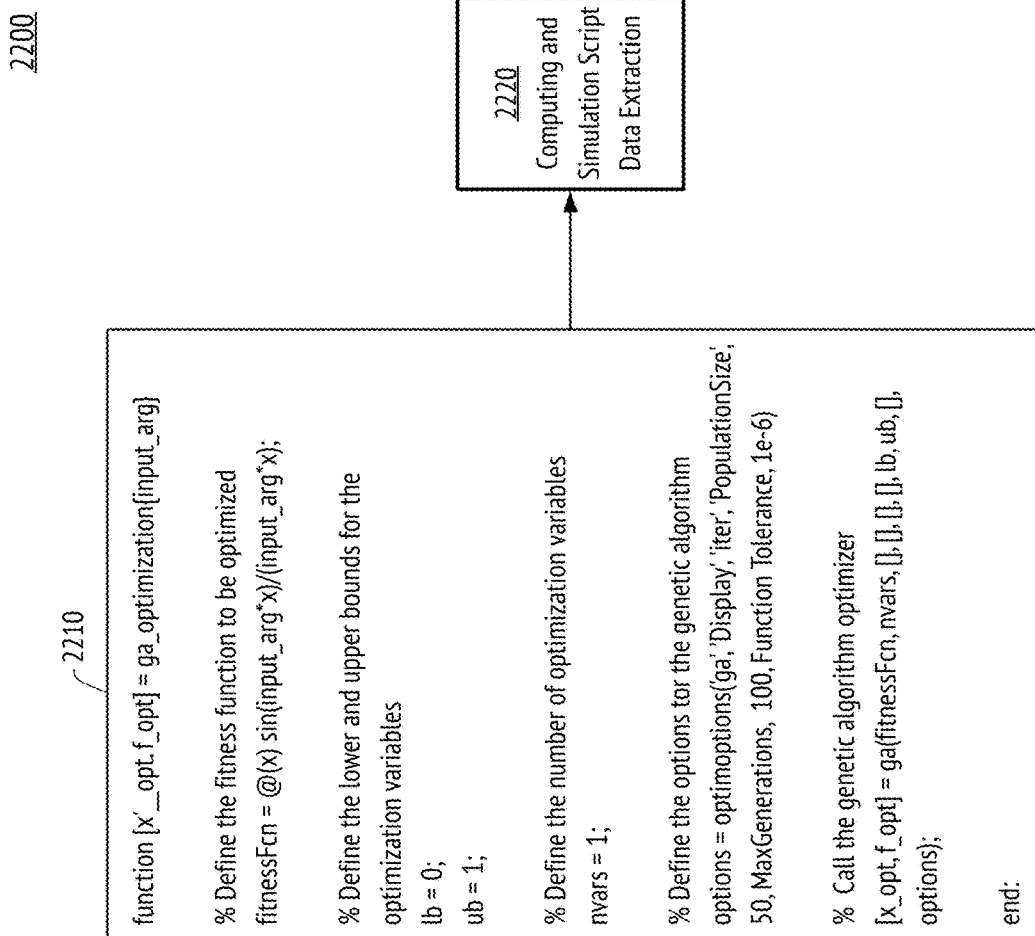
FIG. 22 is an illustrative schematic showing an exemplary computing and simulation script that defines an optimization problem and an exemplary data structure for storing data extracted from such scripts, in accordance with some embodiments of the present invention.
Figure 23:
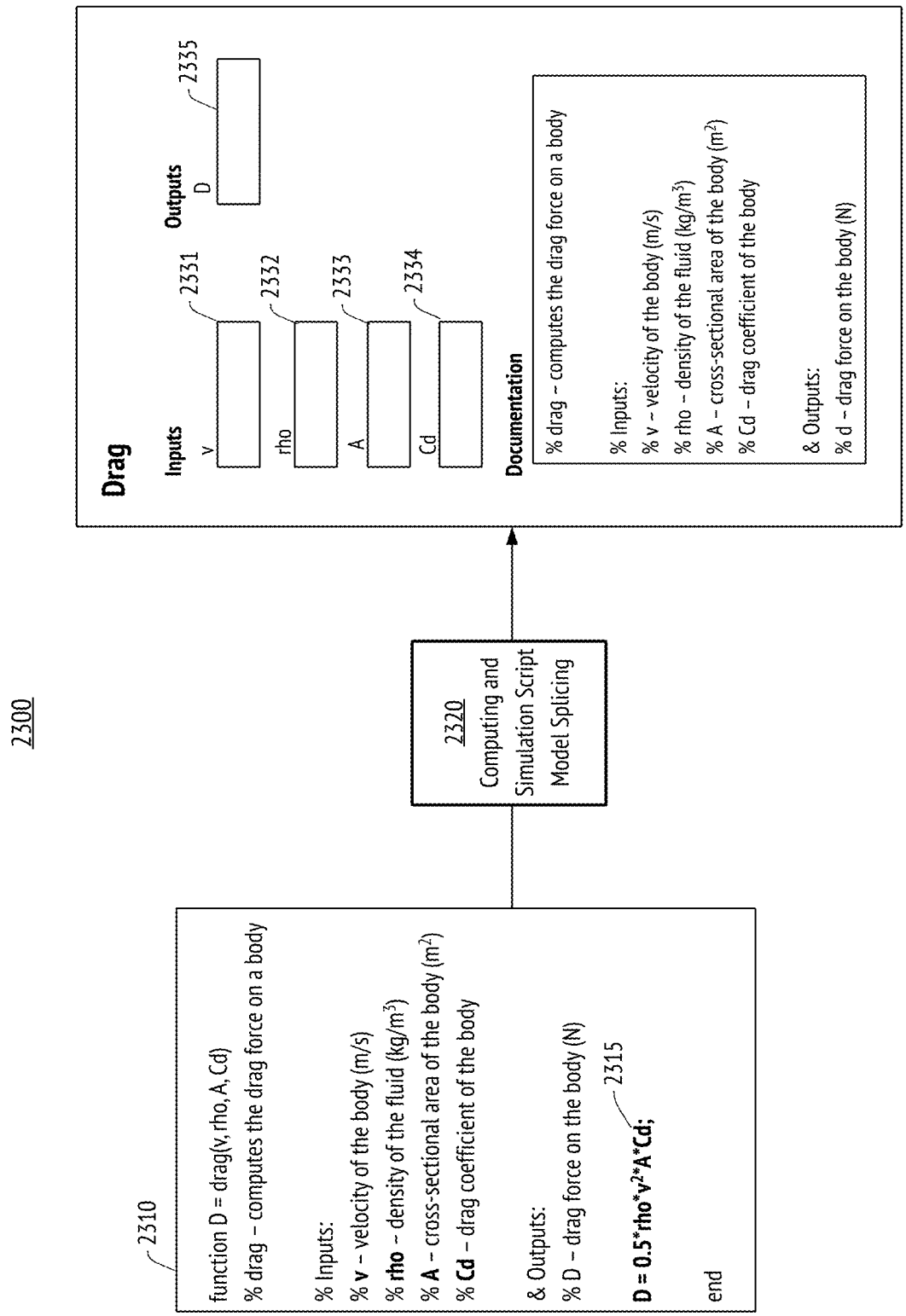
FIG. 23 is an illustrative schematic showing how information may be extracted from a scientific or engineering computing and simulation script representing a mathematical function, and may be used to build a model splicer user interface, in accordance with some embodiments of the present invention.
Figure 24:
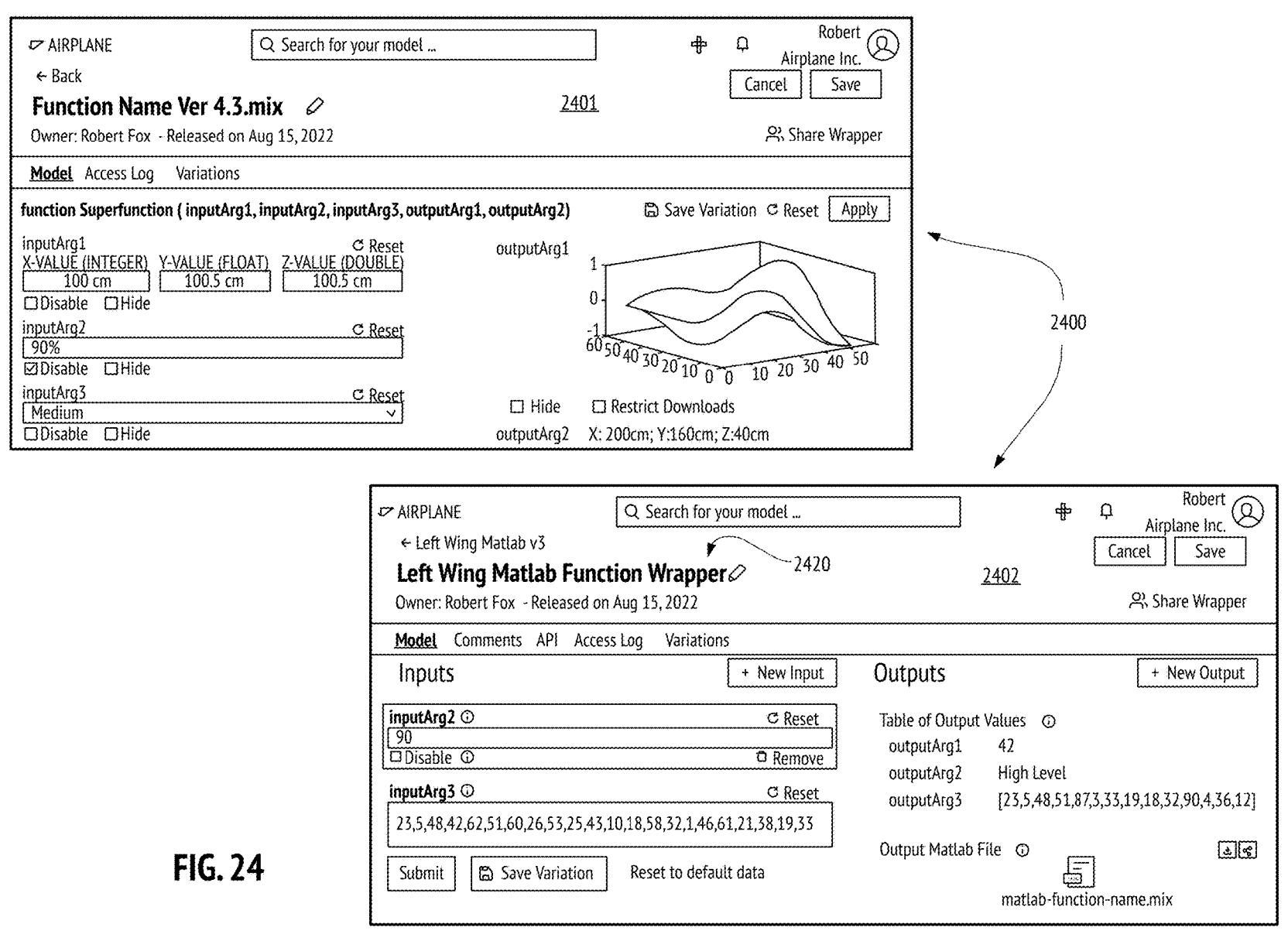

FIGS. 22 to 24 illustrate an exemplary model splicing process for scientific and engineering computing and simulation models. FIG. 22 is an illustrative schematic 2200 showing an exemplary computing and simulation script that defines an optimization problem and an exemplary data structure for storing data extracted from such scripts, in accordance with some embodiments of the present invention.

Specifically, FIG. 22 lists potential data items to extract from a given computing and simulation script 2210, by parsing the file/script and exacting, via a step 2220, one or more of variables, function signatures, function arguments, code comments, file load/save function calls, package dependencies, documentation strings, execution dependency graph for entry function extraction, etc. Here "function" refers to script functions or methods contained in the input computing and simulation script. Extracted model data is stored, and when the user creates a new model splice, the system may present all extracted data so the user may select what to share/execute.

In various embodiments, the exemplary extracted model data listed on FIG. 22 may be defined as follows:
 1. Function signatures: represent function name, input arguments, and return data.
 2. Function arguments: argument names that are passed to the function and possibly the argument types, even if not specified in the function signature.
 3. Variables: system parameters that are usually defined outside function definitions, allowing a user to vary the system's parameters. Note that not all input scripts have variables.

a. Global variables
b. Constant variables
c. Parameters, e.g., defined in the input script outside of functions and are neither global nor constants
4. File Load/Save function calls: similar to variables but usually declared inside functions. The file load/save calls help identify files that need to be packaged with the model splice.
   a. Load/Save (e.g., a script file)
   b. csvread/csvwrite (e.g., CSV files)
   c. xlsread/xlswrite (e.g., spreadsheet file formats)
5. Dependencies of the input code (e.g., codetools.requiredFilesAndProducts) that represent the dependencies on system packages or user-defined packages. Such dependencies may not affect the model splicing process in some embodiments of the present invention.
6. Code execution dependency graph to extract entry functions: generate Directed Acyclic Graphs (DAG) based on dependencies between extracted functions and their calls in the tools package. Having the roots of these DAGs enables the identification of main entry functions of a simulation package. As a result, entry functions may be listed for a user to select from instead of listing all functions in a scientific/engineering computing and simulation package.

Exemplary Model Data and Digital Artifacts from Computing and Simulation Script Models The following is an exemplary data structure for digital artifacts extracted or derived from a scientific or engineering computing and simulation script model, again written in JSON format as a list of variables.

```
{
  "output": {
    "type": "mt"
  },
  "node_id": "backend-01ab1010-88c7-4e3a-8247-2b753ce3f207",
  "node_name": "extract_signatures",
  "result": {
    "calculateAverage": {
      "inputs": [
        "x"
      ],
      "outputs": [
        "ave"
      ]
    },
    "testFn": {
      "
      inputs": [
        "in1",
        "in2"
      ],
      "outputs": [
        "out1",
        "out2"
      ]
    }
  }
}
```

FIG. 23 is an illustrative schematic 2300 showing how information may be extracted from a scientific or engineering computing and simulation script representing a mathematical function, and may be used to build a model splicer user interface, in accordance with some embodiments of the present invention. Specifically, a script 2310 of a drag function with four inputs 2331, 2332, 2333, and 2334 may be spliced via a computing and simulation script model splicing process 2320, so that when a user of the model splice updates the inputs, the corresponding output drag 2335 is computed via a splice function (i.e., written in an IDEP platform script) that implements an equation 2315 in the input script 2310, without needing the native scientific or engineering computing and simulation platform for executing the function script on the left.

FIG. 24 shows two screenshots of a GUI 2400 that can be used to view or execute a model splice of a mathematical function script, and can be used to model splice an input function related to a left wing of an airplane under design respectively, in accordance with some embodiments of the present invention. Again, here these input functions are defined by scientific or engineering computing and simulation scripts. Similar to FIG. 23, in screenshot 2401, individual fields are provided for the model splice user to set input arguments for the input function and enable or hide selected input and/or output fields. A graph of the computed output is also provided in screenshot 2401, as well as options given to the user to further modify or share the model splice. In screenshot 2402, a second input function related to a left wing of an airplane under design is being spliced. A user may choose to include additional model data in the model splice, or generate new digital artifact outputs. The user may run this model splice 2420 directly without access to the scientific or engineering computing and simulation platform that is needed to execute this second input function.

Although not shown explicitly in FIG. 24, the model splicer implementation as illustrated may provide the following exemplary functionalities, which are not limited in scope. The data owner may upload a scientific or engineering computing and simulation file, create a model splice or wrapper by selecting function inputs and outputs, execute the model splice, share the model splice with collaborator(s), and give them viewer privileges. A collaborator may interact with the model splice from the owner by providing input(s) to splice function(s), and receiving output(s) from splice functions.

Figure 25:
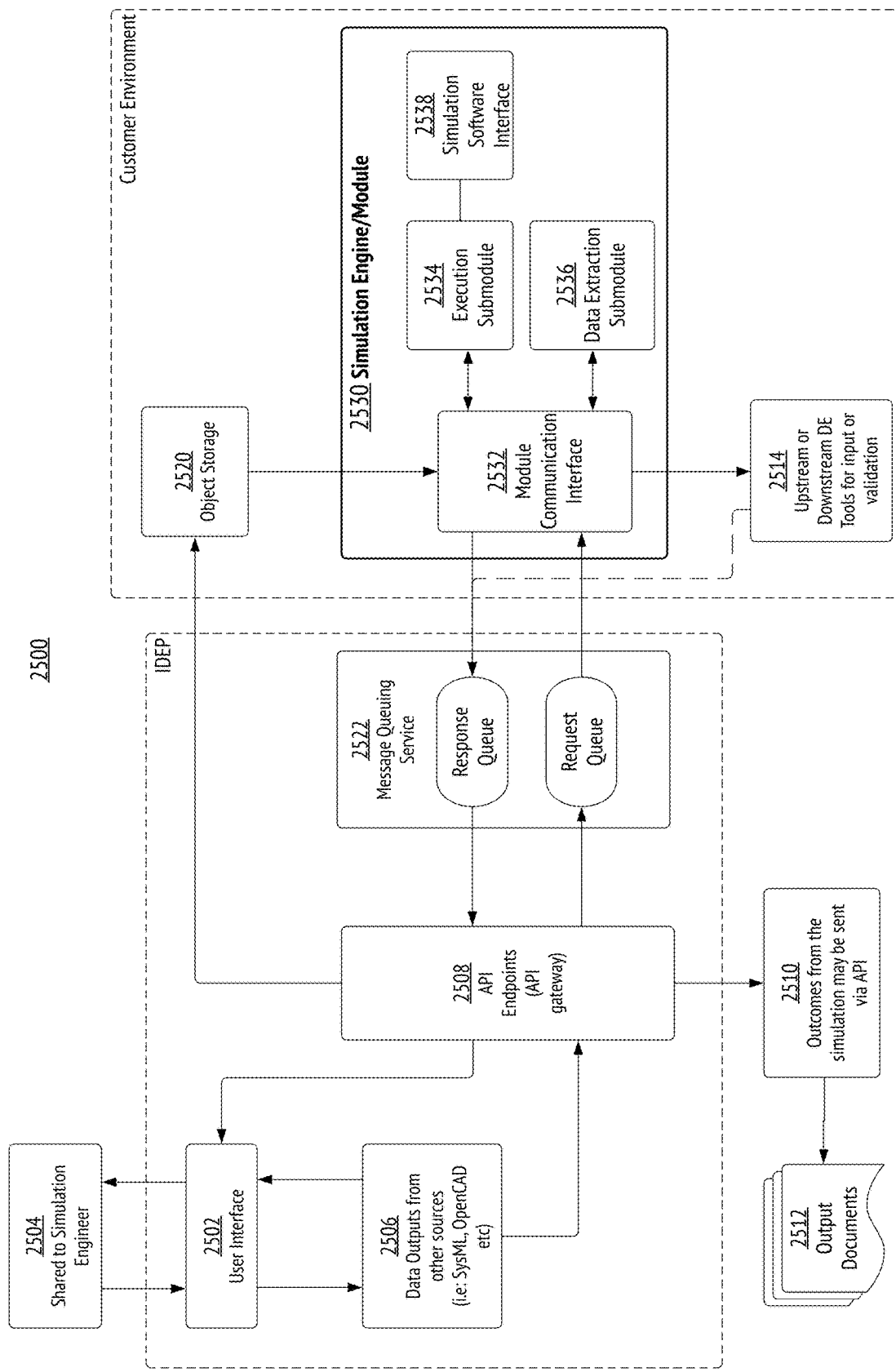
FIG. 25 is a schematic of an exemplary implementation that illustrates the integration of the IDEP with simulation modules using model splicing, in accordance with some embodiments of the present invention.

Exemplary Implementation to Integrate the IDEP with Simulation Engine Using Model Splices FIG. 25 is a schematic 2500 of an exemplary implementation that illustrates the integration of the IDEP with simulation modules using model splicing, in accordance with some embodiments of the present invention. This exemplary architecture is applicable to event-based simulations, co-simulations, or any generalized simulations that may or may not use computational and simulation scripts.

Generally, simulations do not initiate entirely from scratch and instead need a collection of input points in the form of models and simulation parameters. For example, data outputs 2506 from other DE tools and data sources such as SysML and OpenCAD may be channeled to or shared with a simulation engineer 2504 via a user interface 2502. The simulation engineer may revise and update such data before they are sent to a simulation platform via APIs or a GUI, to become inputs for simulation runs conducted by simulation engine 2530. For example, simulation engineer 2504 may appropriately link individual DE models and data points into a digital thread, modify simulation parameters, and feed these through user interface 2502 to an API gateway 2508 within the IDEP. This API gateway may provide REST APIs for various simulation scripts and actions and may be connected with an object storage 2520 (e.g. cloud storage simple storage service (S3) buckets) that are utilized for accessing the DE models, storing the digital threads, etc.. Object storage 2520 may also be used to store simulation scripts that simulation module 2530 may need to run simulations. Such simulation scripts may have been created as individual splices from a reference scientific or engineering simulation software.

An orchestration script that commands on the digital thread to run the simulation may go through a message queuing service 2522, for example the IDEP's job service (e.g., as provided by service cells in IDEP 302 of FIG. 3), to reach a module communication interface 2532 of a simulation module 2530.

Simulation engine 2530 may further constitute an execution submodule 2534, a data extraction submodule 2536, and a simulation software interface 2538. Upon receiving a request message, simulation module 2530 may process the message, extract data, access object storage 250 and execute the simulation through simulation software interface 2538.

In some embodiments, module communication interface 2532 may be implemented as part of an IDEP agent (e.g., IDEP exclave 316 of FIG. 3) on the customer side of the platform. Output from simulation runs may be fed back via a response queue in message queueing service 2522 to API gateway 2508, for example for review by the simulation engineer. User interface 2502 may present the simulation outcome for user review, and enable further simulations if necessary. Additional digital threads may further link simulation outcomes 2510 via API endpoints to output documents 2512, or DE tools such as SysML tools to verify requirements or for performing other relevant DE tasks.

In some embodiments, simulation outputs with commonly-accessible API endpoints may be sent upstream or downstream 2514 of digital threads into other DE tools within the customer environment, for example, as an ensuing input or for validation and verification purposes. In some embodiments, such digital threads may be managed by the IDEP agent (e.g., IDEP exclave 316 of FIG. 3) as well, and execution outputs 2510 (via message response queue and API gateway) may be further linked into output documents 2512.

Exemplary Implementation for Model Splicing Model-Based Systems Engineering (MBSE) Models FIGS. 26-29 provides illustrative examples of how users may interact with a MBSE model splicer and model splices via different user interfaces, where the MBSE model is written in a Systems Modeling Language (SysML).

Figure 26:
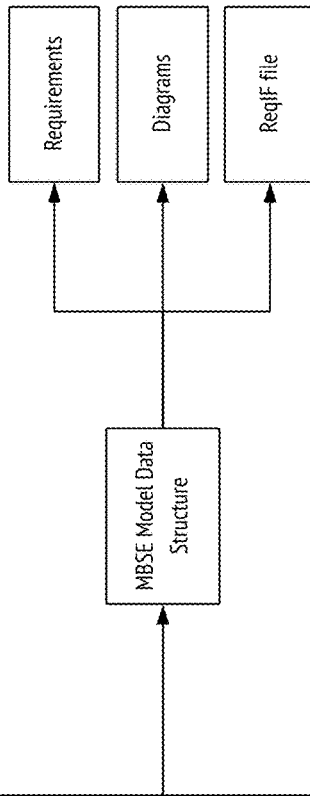
FIG. 26 shows an exemplary script that defines a model-based systems engineering (MBSE) model and an exemplary data structure for storing data extracted from such MBSE models, in accordance with some embodiments of the present invention.

Specifically, FIG. 26 shows an exemplary script 2610 that defines an MBSE model and an exemplary data structure for storing data extracted from such MBSE models, in accordance with some embodiments of the present invention. When analyzed, the inputSysML file may be decomposed into and stored as requirements, diagrams, and Requirements Interchange Format (ReqIF) files.

Figure 27:
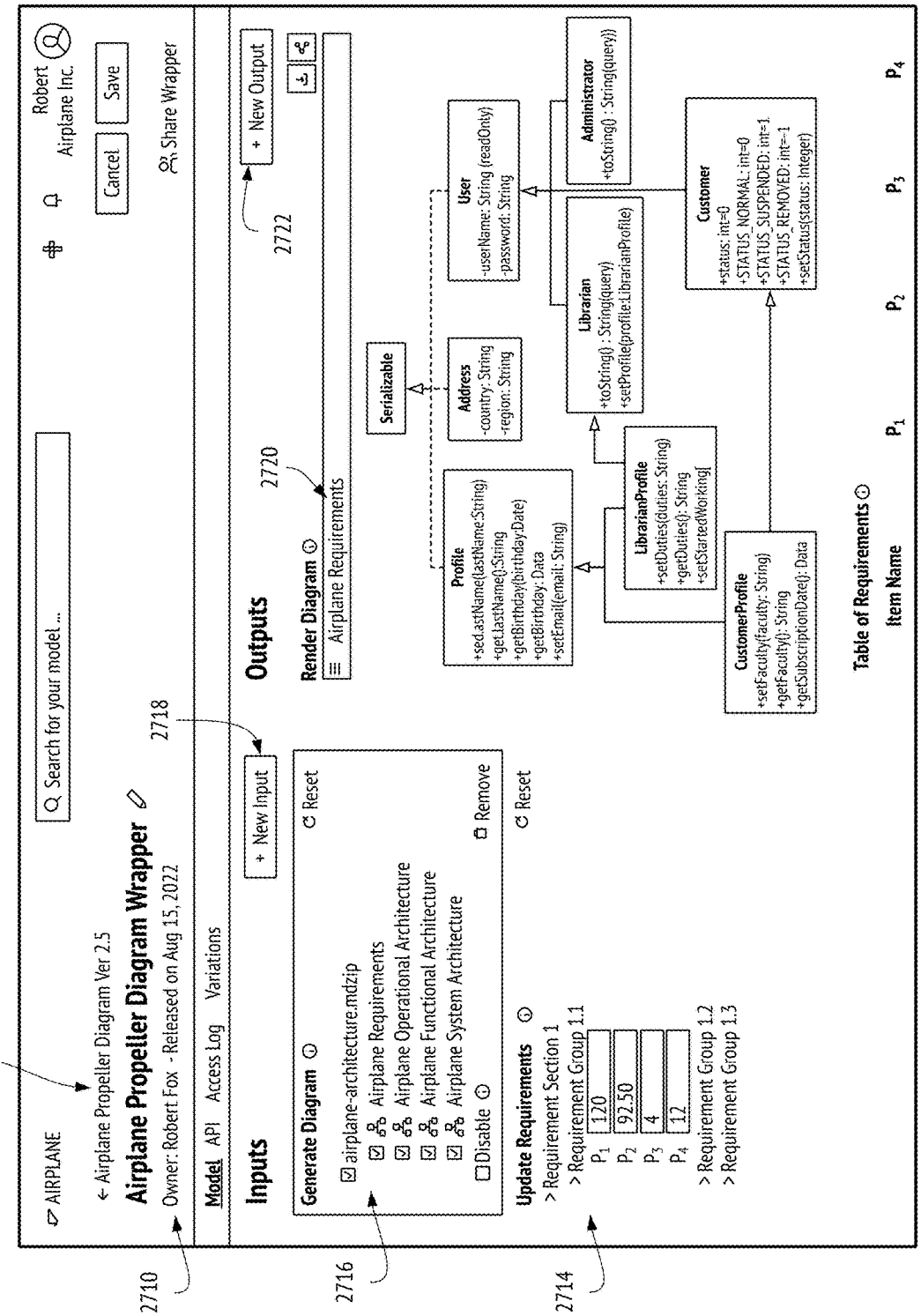
FIG. 27 shows a screen capture of an exemplary model splicer GUI for receiving user input to model splice a MBSE model of an airplane propeller, in accordance with some embodiments of the present invention.

FIG. 27 shows a screen capture of an exemplary model splicer GUI 2700 for receiving user input to model splice a MBSE model of an airplane propeller, in accordance with some embodiments of the present invention. In this example, a data owner Rober Fox 2710 uploads an input MBSE model "Airplane Propeller Diagram Ver 2.5" 2712, and a base model splice "Airplane Propeller Diagram Wrapper" is presented. On the left, under an "Inputs" panel of GUI 2700, airplane requirements 2714 that have been extracted from the input MBSE model file 2712 are presented. If the input model file already contains airplane architecture diagrams, a list 2716 of such diagrams may be listed within the input panel as well, with interactive fields to receive user input on which ones to present, or render, based on user-updated requirements 2714. In some embodiments, the input model file may contain requirements data only, yet the model splicer system may identify list 2716 based on the requirement data and/or model metadata. In some instances, the user may select a "+New Input" icon 2718 to select additional model data or choose additional splice functions specific to the input model file type to generate desired digital artifacts. On the right, under an "Outputs" panel of GUI 2700, user-selected diagrams such as an airplane requirements diagram 2720 may be rendered by model splice functions and presented through the GUI upon user request. The user may further select a "+New Output" icon 2722 to generate additional digital artifacts to be included in the generated model splice.

Although not shown explicitly in FIG. 27, the model splicer implementation illustrated therein enables the following functionalities, which are non-exhaustive, non-limiting, and for illustrative purposes only. Data owner 2710 may upload an MBSE file, create a first requirements splice to facilitate updating requirements or verifying requirements, execute the model splice, share the model splice with collaborator(s) and give them viewer privileges, create and execute a second diagram splice to view/hide diagrams, and share the diagram splice with collaborator(s) and give them viewer privileges. A collaborator may interact with a model splice from the owner to view diagrams, view requirements, and update requirement values.

Figure 28:
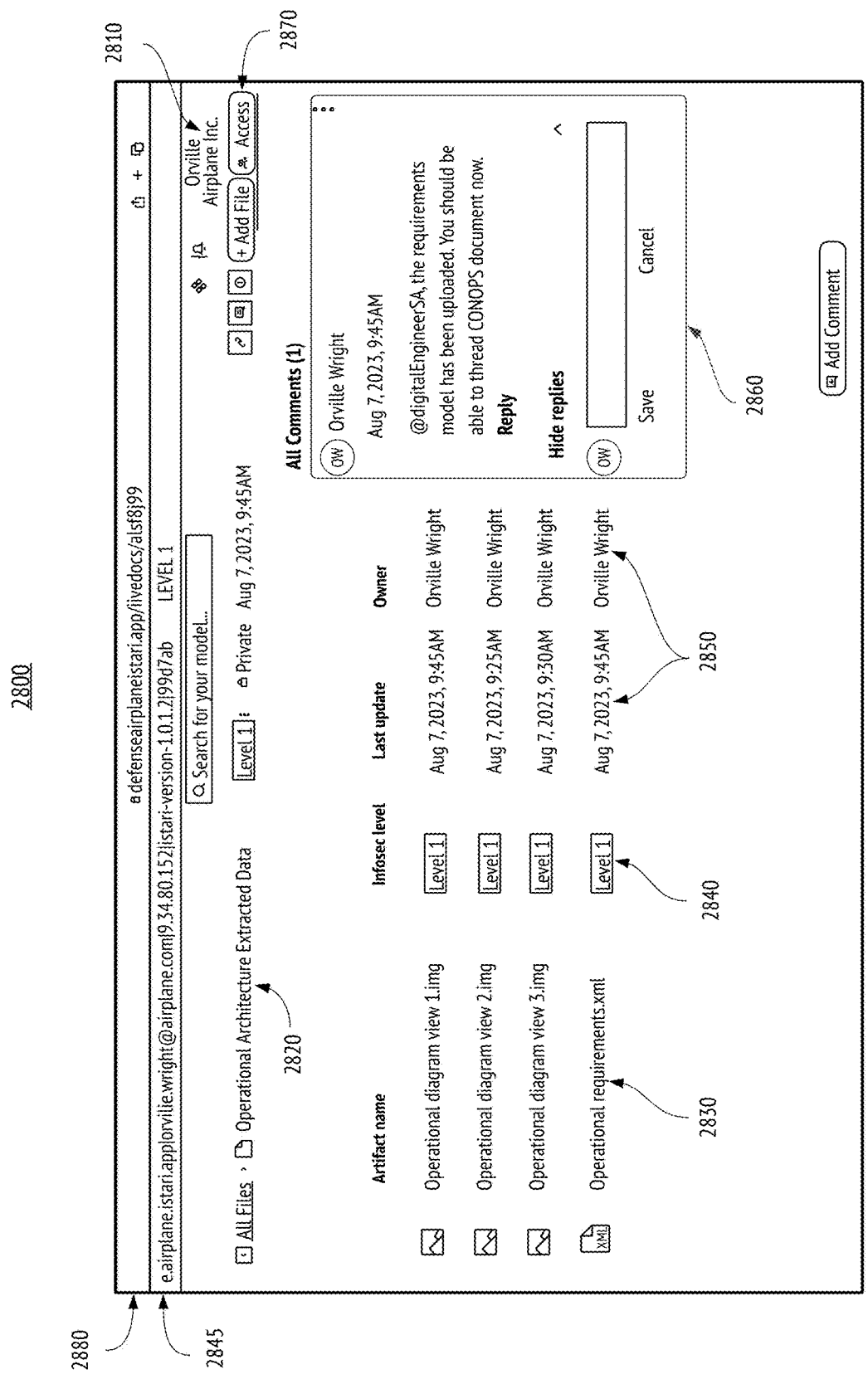
FIG. 28 shows a screen capture of an exemplary GUI provided by the IDEP to a collaborator to view digital artifacts from a received model splice, in accordance with some embodiments of the present invention.

FIG. 28 shows a screen capture of an exemplary GUI 2800 provided by the IDEP to a collaborator to view digital artifacts from a received model splice, in accordance with some embodiments of the present invention. This exemplary GUI 2800 may be provided via a web-portal. After user Orville Wright 2810 logs in, he can open a received requirements model splice to see digital artifacts from a requirements model. A directory 2820 entitled "Operational Architecture Extracted Data" contains requirements model digital artifacts 2830, including diagrams and a requirements data file. Such digital artifacts may be contained in the received model splice as part of a compressed .zip file. Alternatively, in some embodiments, a digital artifact such as an operational architecture diagram image may be stored in a customer bucket and assigned a unique Uniform Resource Locator (URL) address such that it can be loaded upon user request. Similarly, this URL may be referred to in other model splices or documents. Additionally in this example, each digital artifact listed is assigned the same information security (Infosec) level 2840 as the domain security level shown in banner 2845. In some embodiments, digital artifacts may inherit security attributes or characteristics of the parent DE model. In some embodiments, Infosec level of a digital artifact may be downgraded from, but not exceeding, that of the source model. In some embodiments, user authorization may be checked against infosec levels when the user requests to view digital artifacts. For example, a user having a lower infosec level (e.g., level 1) may not be allowed to view details of a digital artifact having a higher infosec level (e.g., level 2). Other fields shown in exemplary GUI 2800 includes additional metadata 2850 that may be recorded to trace when a digital artifact was created or updated by whom using what code and/or parameters, comments and review/approval logs 2860, user interface buttons 2870 (e.g., copy link, add a comment, view document information, add a new file, share access etc.), and browser window header 2880 with a digital thread link. A single model splice such as shown in FIG. 28 with executable splice functions may be viewed as a simple, addressable digital thread.

Figure 29:
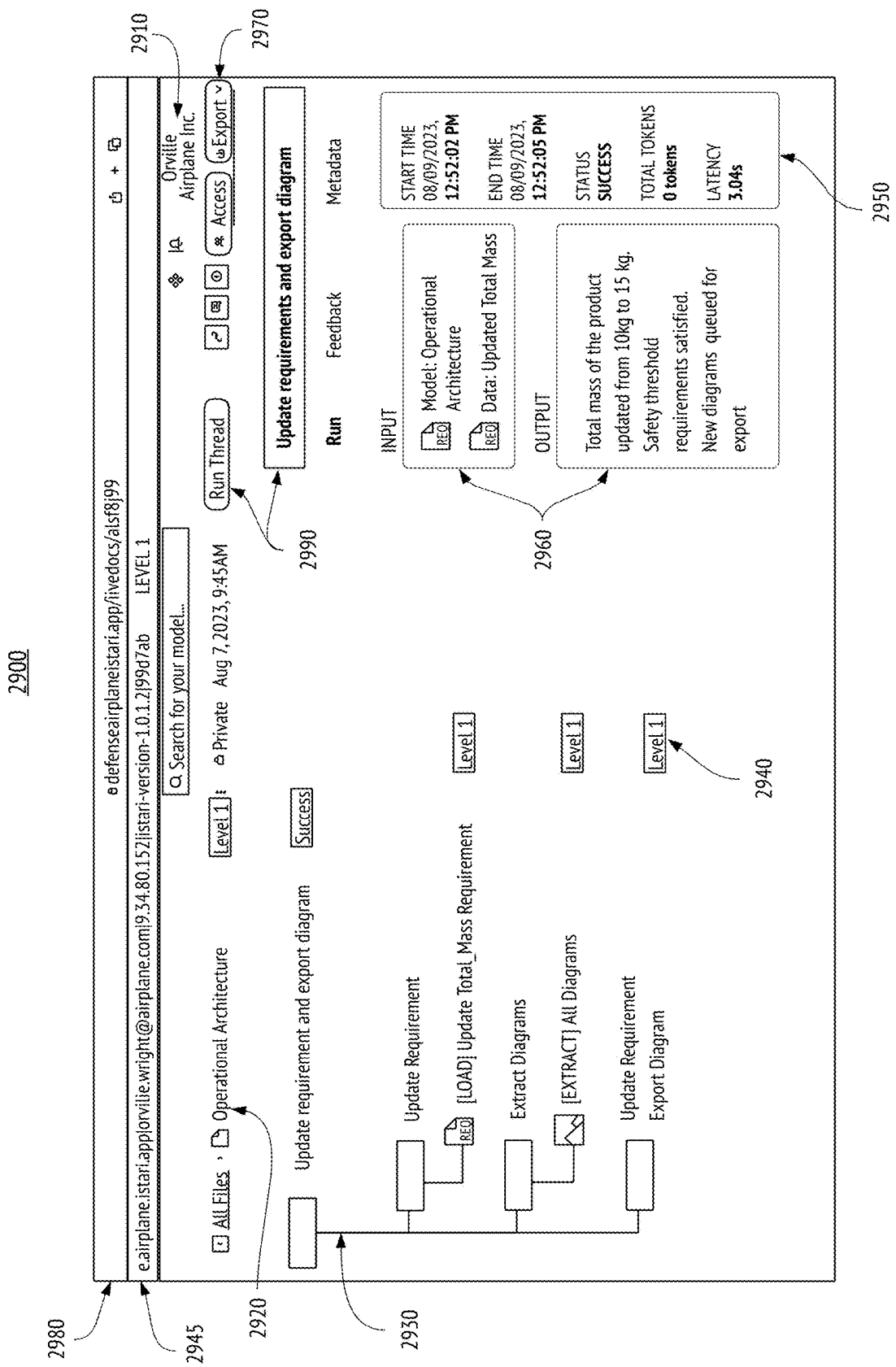
FIG. 29 shows a screen capture of an exemplary GUI or web-portal provided by the IDEP to a collaborator to view, execute, and update a received model splice, in accordance with some embodiments of the present invention.

FIG. 29 shows a screen capture of an exemplary GUI or web-portal 2900 provided by the IDEP to a collaborator to view, execute, and update a received model splice, in accordance with some embodiments of the present invention. After user Orville Wright 2910 logs in, he can open a received requirements model splice 2920 entitled "Operational Architecture" to see requirement model update splice functions 2930, including options to update requirements, extract diagrams, and export diagrams. Splice functions 2930 may also be viewed as user intent for a digital thread, with a tag for result of execution. Additionally in this example, each splice function listed is assigned the same information security (Infosec) level 2940 as the domain security level shown in banner 2945. In some embodiments, splice functions may inherit security attributes or characteristics of the parent DE model. Other fields shown in exemplary GUI 2900 includes user interface button and data fields 2990 to execute a digital thread to update the requirements model or the requirements model splice, and to generate or export new diagrams; additional metadata 2950 that may be recorded to trace when model splice functions were run to update the requirements data; input and output panels 2960 that indicate and/or link to the input model, input data, and output summaries; user interface buttons 2970 (e.g., copy link, open a comments section, view document information, add a new file, share access and export etc.), and browser window header 2980 with a digital thread link. This model splice shown in FIG. 29 is a simple, addressable digital thread similar to 609 in FIG. 6 that may be executed to update a requirements model and extract digital artifacts (e.g., diagrams).

In some embodiments that employ zero-trust implementations such as shown in FIG. 3, zero trust security in the IDEP ensures users interact with DE models and their associated splices/wrappers, splice functions, and digital artifacts under strict access controls, embodying the principle of least privilege. Users may undergo multi-factor authentication and are credentialed according to the required information security levels. Access may be managed via an attribute-based access control (ABAC) system, authorizing users for specific functions, actions (e.g., view, edit, share), security levels, and durations within specific model splices for specific DE models. Thus, model splicing enables the right stakeholders to access the right information from the right source with the right tools at the right time for the right duration in the right context for the right purpose, and facilitates the secure, auditable, traceable, iterative, and effective development and review of components and/or systems.

Furthermore, encryption safeguards data at rest and in transit, enhancing confidentiality and integrity. Trust assumptions are continuously re-evaluated, maintaining security throughout each session. The IDEP may employ continuous monitoring and detailed logging to proactively detect and mitigate threats, highlighting the system's capability to address security challenges in real-time.

These measures together, including multi-factor authentication, ABAC, ongoing trust verification, encryption, and proactive threat detection, integrate within the IDEP enclave (e.g., 302 in FIG. 3) along with cloud services (e.g., 304 in FIG. 3) to uphold zero-trust security principles, significantly minimizing unauthorized access and data breaches.

Exemplary Implementation for Model Splicing Document Models

Figure 30:
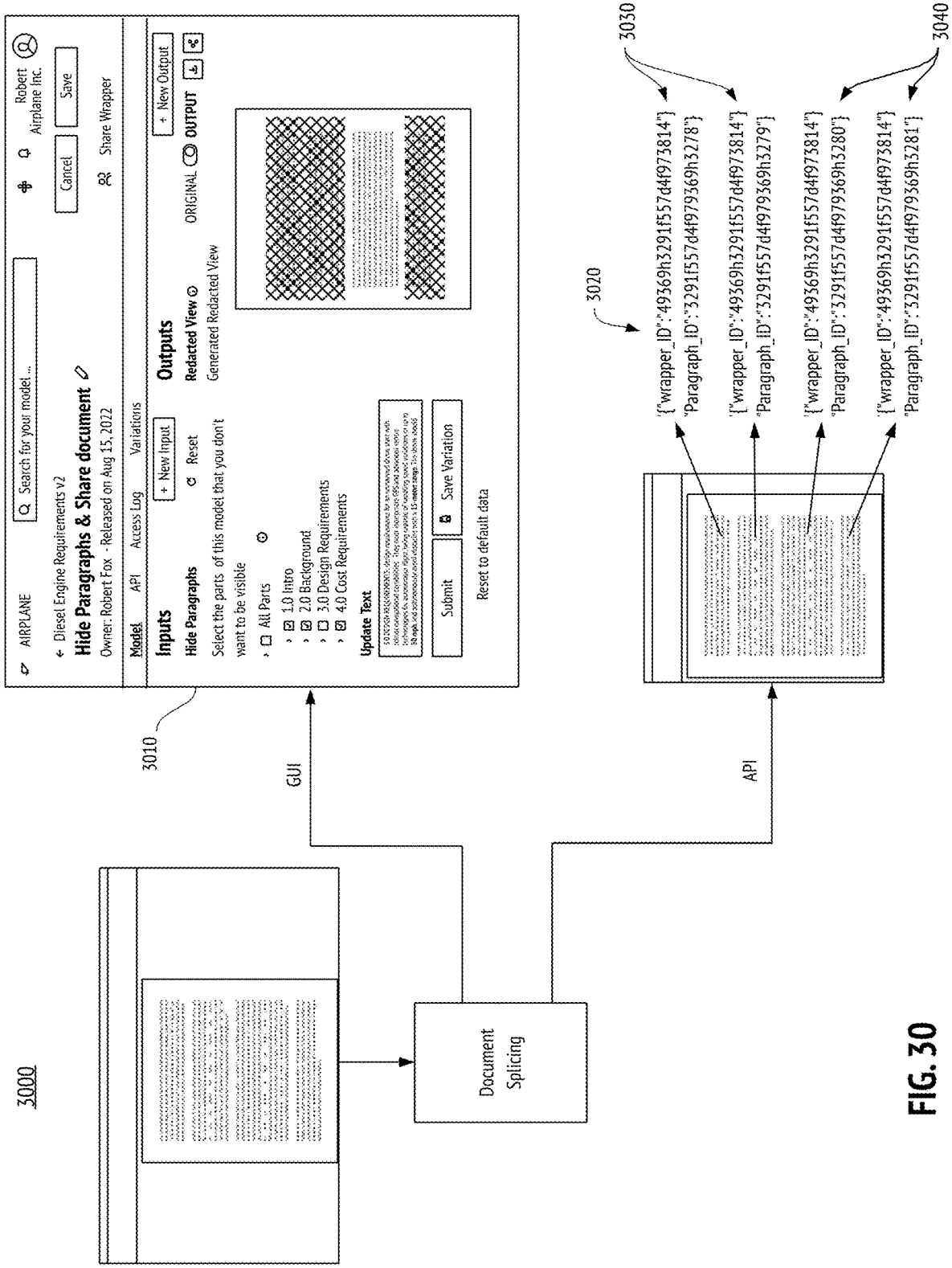
FIG. 30 shows an illustrative example of document splicing or document model splicing within the IDEP, in accordance with some embodiments of the present invention.
Figure 31:
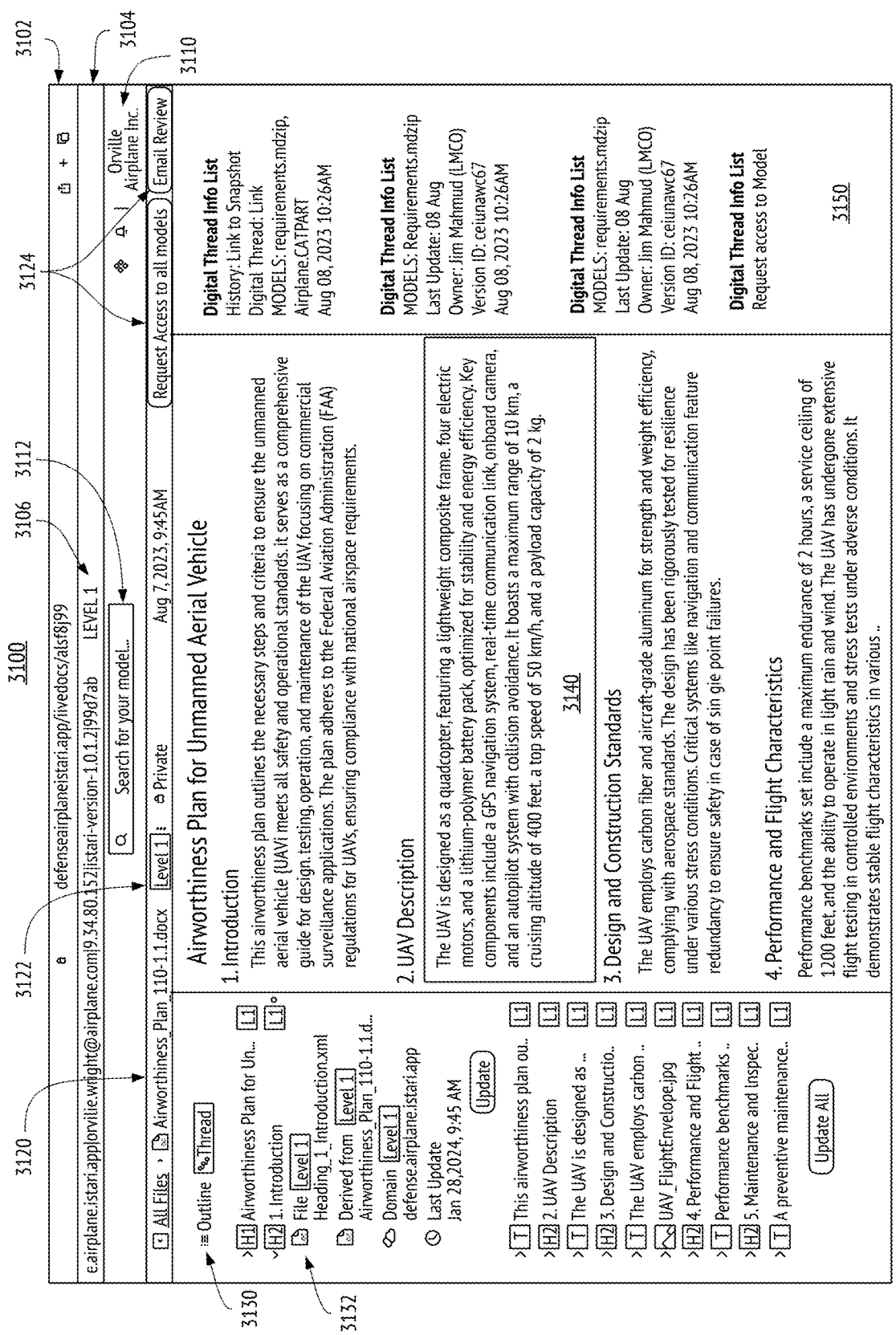
FIG. 31 shows a screenshot of an exemplary GUI used with a digital documentation system, in accordance with some embodiments of the present invention.

FIGS. 30 and 31 illustrate an exemplary implementation for model splicing document models and executing document splices. Model splicing of document models may also be referred to as "document splicing."

Specifically, FIG. 30 shows an illustrative example 3000 of document splicing or document model splicing within the IDEP, in accordance with some embodiments of the present invention. FIG. 30 is structured similarly to FIG. 15 for CAD model splicing. In FIG. 30, an input document file is spliced into chunks, parts, sub-units, or components, with or without a hierarchy, and each with at least one API endpoint for access and handling. In this illustrative example, the input document is written in paragraph form, in text only, and parsed, divided, or segmented into individual paragraphs as delineated by carriage returns and paragraph spacing. In various embodiments, document parts or sub-units may be classified according to type, formatting, spacing, syntax, sectioning, content, theme, or any other pre-defined or user-defined rules. For example, a sub-unit may be a chapter, a section, a subsection, a paragraph, a sentence, a comment, a hyperlink, a word, a table, a graph, an equation, and sub-parts thereof. In some embodiments, parts identified from the same document may be of different types, for example, title, version number line, author line and publisher line, table of contents, chapters, sections, and paragraphs. In some embodiments, an LLM may be deployed to understand user-defined rules for splicing a document.

In FIG. 30, exemplary model data are shown in an GUI 3010 with input parameter fields on the left, and an output visualization on the right. Also shown are API 3020 for the document splice, with a single wrapper ID 3030 and individual API endpoints 3040 for document parts. Parts of the input document are organized first by sections (e.g., 1.0 Intro, 2.0 Background, 3.0 Design Requirements, 4.0 Cost requirements), then by individual paragraphs as sub-parts, each identified by a unique paragraph identifier (ID) serving as an API endpoint 3040. An API wrapper/script titled "Hide Paragraphs & Share document" is displayed in GUI 3010. The API wrapper's input parameter fields are listed on the GUI's left side, where each document part/sub-part is represented by a label and arranged in a tree structure. A user has the option to choose which part(s) to hide or conceal from view, and the result of this action is visualized on the right side of the GUI. In this particular example, "hidden text" appears as crossed-out. That is, a creator of the document splice may select which paragraphs to hide from users with whom the document splice is shared. Conversely, a user of the document splice can propose changes or suggest modifications only to the parts or sections they have access to.

In various embodiments, a document splicer crawls through the input document file and extracts document data, based on factors such as formatting, spacing, punctuation, sectioning, content, semantics, syntax, and so on. As the document model splicer crawls through the document file, it determines how document data may be organized and accessed, as fundamentally defined by the document file's formatting and/or semantics, as well as the document processing tool used in splicing the document, for example to establish a document data schema. This document schema may describe the structure and formatting of the document data, some of which are translated into, or used to create input/output API endpoints with corresponding input/output schemas.

An exemplary set of input and output types/schemas is shown below:
{
"inputs": [
{
"id": 1
"type": "Dropdown",
"name": "Paragraph Selection",

```
"options": "List of available paragraphs"
},
{
"id": 2,
"type": "Number",
"name": "Paragraph ID",
"unit": "integer"
},
{
"id": 3,
"type": "Text",
"name": "Paragraph Content",
"unit": "string"
{
"id": 4,
"type": "Checkbox",
"name": "Add New Paragraph"
},
{
"id": 5,
"type": "Checkbox",
"name": "Delete Paragraph"
}
[
}
{
"outputs": [
{
"id": 1,
"type": "Text",
"name": "Paragraph Content",
"unit": "string"
},
{
"id": 2,
"type": "JSON",
"name": "Document Structure",
"unit": "JSON object representing the document's hierarchical structure"
},
{
"id": 3,
"type": "Number",
"name": "Total Paragraph Count",
"unit": "integer"
},
{
"id": 4,
"type": "File",
"name": "Download .docx File"
},
{
"id": 5,
"type": "Array",
"name": "Extracted Numeric Variables",
"unit": "Array of numeric variables found in the document"
},
{
"id": 6,
"type": "File",
"name": "Export as .txt",
"unit": "Text file (.txt) version of the document"
},
{
"id": 7
"type": "File",
"name": "Export as .pdf",
"unit": "PDF file (.pdf) version of the document"
}
]
}
```

In one exemplary embodiment, once document splicing is completed, a "Hide Paragraph" document splice may comprise the following:

1. An instantiation of document data structure: a set of parts, possibly in an hierarchical order, saved in one or more files, including one or more of the following:
   a metadata (e.g. in JSON format) file, for example, comprising part names/titles, and/or API endpoints written according to document model splicer input/output schemas
   an extracted data file having a unified data structure (e.g. can be JSON or text format file, with pointers to hyperlinks)
   an open source file (e.g. JPG for a graph, OpenDocument for text), and
   other files (e.g. PDF files, RAR files).
2. API Scripts, which are code executable on 1 above to achieve desired functionalities (e.g., hiding paragraphs).
   In some embodiments, some API scripts may already exist (e.g., if the document has been uploaded and analyzed before). During splicing, a user may select a specific subset of API scripts for use within a splice.
   In some embodiments, the platform may automatically generate business process-specific APIs for document splices. For example, a collection of business process-specific APIs such as HideParagraphs(ParagraphsList) may be created for an input requirements verification report file; in some cases, one splice may be created and the user may add or remove functions to update the splice
   The implementation of API endpoint creation and/or linkages via API scripts
   API scripts are executed through API endpoints. API endpoints are like the URL or address pointer. Each API endpoint may correspond to a specific function or resource, such as retrieving document data, updating document data, or deleting document data.
3. Optionally, the original document file is included in the splice as a separate entry. In this particular Hide Paragraphs example, only a modified document (after the "hide" function) may be shared, not the original full document (with all the parts or sub-parts).

It is important to note that document splicing involves a combination of human-readable data extraction accompanied by programming code generation. Once spliced, subsequent processing for new document splices may involve text search of specific metadata (e.g. API endpoints of part that must be linked to a subsequent DE model or document splice for a digital thread). That is, text search is a component within the data processing of the document file, or new documents created. However, the search operation is accompanied by implementation of logic through API scripts or context-specific insights (e.g. What is the likely document file to link to? What API endpoints are needing links?).

FIG. 31 shows a screenshot of an exemplary graphical user interface (GUI) 3100 used with a digital documentation system, in accordance with some embodiments of the present invention. The GUI provides the user of the IDEP with digital documentation capabilities. FIG. 31 shows a browser window header 3102 which includes a document link for easy navigation. Below the header, a domain and security level banner 3104 displays the domain, platform software version, and security level, ensuring that users are aware of the domain they are operating in and the security protocols in place. The security level indicator 3106 displays the user's maximum security access level within the platform (e.g., "Level 1").

The interface also includes a search bar 3112, allowing the user to carry out comprehensive cross-platform searches through the IDEP for digital engineering models, files, and documents, thus facilitating efficient retrieval of information across the platform. Adjacent to this, the user & domain field 3110 provides information on the user's domain (e.g., client name). The user and domain field may allow the user to login and to access user profile and subscription information.

The top menu of the GUI offers additional functionalities. For example, the document name field 3120 displays the document's name, and may include its version. The document security level indicator 3122 displays the security level (e.g., "Level 1") of the document being accessed. In one embodiment, using an expandable security level menu adjacent to the document security level indicator 3122, the user may select the document's target security access level "view", thus filtering only the parts of the document accessible through a given security level. In other embodiments, the user may also use the document security level indicator 3122 to down-select the security level while sharing the document, thus sharing portions of the document that correspond to the specified security level. Only security access levels below the user's security level (e.g., "Level 1" in FIG. 31) would be available for the user to view and share. The user interface buttons 3124 include options to request access to all models related to this document, or email review information to a stakeholder.

The granular dynamic info security tags (e.g., 3106 and 3122, and the like) are an important but optional element of the digital documentation system and its associated GUI. The model splicer and the IDEP system enable the granular dynamic information security tags 3106 and 3122. In some embodiments, the digital documentation system uses metadata of DE models or documents to cross-reference against authorizations, licenses, or regulations to update. In some embodiments, the granular dynamic information security tags 3106 and 3122 are dynamic, and are refreshed ahead of any document updates to confirm the right authenticated user has the right authorized access to the digital artifacts and data to perform or view the updates.

For document organization and navigation, the GUI features a document outline viewer 3130 on the left of FIG. 31, providing links to the document's headers and paragraphs and/or sections. Within the outline viewer 3130, a digital thread viewer 3132 shows sections of the document along with the linked digital engineering (DE) model(s), the source IT domain, and the last update timestamp, each tagged with the appropriate security level (e.g., "L1"). In some examples, if sections of a document contain content requiring a higher security level for viewing, the user may be presented with an option to request access. Were the user to request such access, an authorized user with access at a higher security level is notified for their review. In other examples, if sections of a document contain content requiring a higher security level for viewing, such sections will not be shown for display, nor provide the user with any prompt for requesting access.

At the center of FIG. 31, the section viewer 3140 displays the content of each document section and ensures that every paragraph is updated based on the data of the DE models that are linked to it. The model data and associated security access may be provided through model splicing, as discussed previously. Lastly, on the right of FIG. 31, a digital thread metadata pane 3150 lists digital thread execution/transaction information.

Universality and Extensibility of Model Splicers

In FIGS. 14-31, four digital engineering model types are shown for illustrative purposes: CAD models, MBSE/SysML models, scientific and engineering computing and simulation models, and document models. The IDEP user interface (UI) for showing splices of these model types are very similar. These UIs provide easy visualization of the digital models to a human user, and may be used to accept user input, request, and/or instructions to the respective model splices. Visualizations of different model types are different (e.g., propeller engine 3D model vs. airplane requirement diagram vs. multi-input mathematical function vs. airworthiness plan report), but each model may be described in computer codes or scripts. Additionally, each different model type has, or is associated with, its own API structures or suites provided by corresponding DE tools. The model splicer, implemented according to various embodiments of the present invention, can build splice functions in the form of API scripts to call respective native APIs to create, modify, and interact with all types of DE modes. Extensibility and scalability can therefore be achieved because all DE models are treated in a similar fashion in the code domain.

Alternative Implementation of a Model Splicer as a Microservice Architecture

In FIG. 3, an exemplary implementation of the IDEP is shown where model splicing is built from microservices under zero-trust safeguards enabled by API services and endpoints. In particular, agents within FIG. 3 are not necessarily trusted, and authentication/authorization may be required for each specific job involved in model splice generation and execution. By comparison, FIGS. 32 and 33 provide an alternative implementation where the IDEP provides a message bus to trusted agents that participate in the model splicing process.

Figure 32:
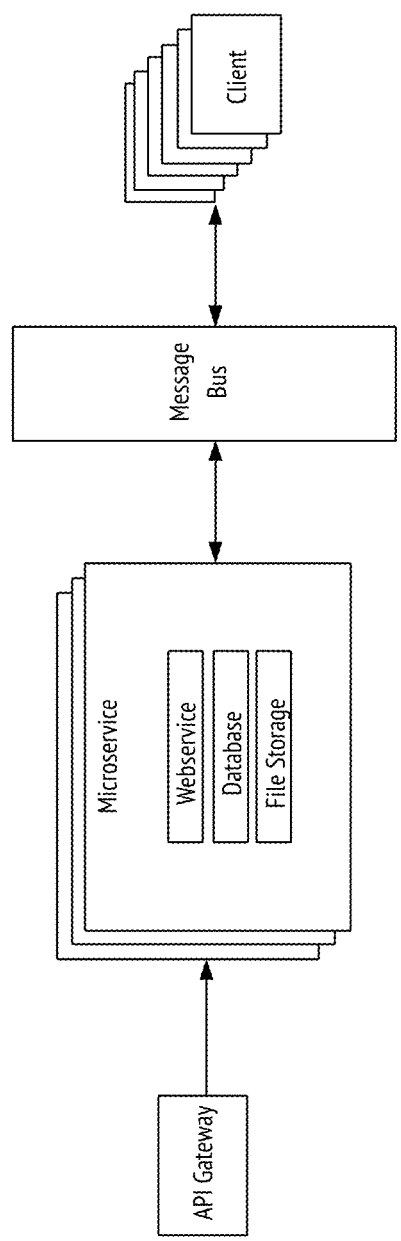
FIG. 32 is an illustrative microservice architecture for implementing model splicers for a variety of DE tools and model-type files, in accordance with some embodiments of the present invention.

More specifically, FIG. 32 is an illustrative microservice architecture 3200 utilizing trusted agents connected via a message bus for implementing model splicers for a variety of DE tools and model-type files, in accordance with the examples disclosed herein. A microservice is a software development approach where a large application is built as a suite of small, modular services. In the context of model splicing, process steps performed by a model splicer may be implemented by modular software components that can be linked as individual services. In this exemplary implementation, an API gateway is provided to upload DE models to microservice modules with respective web service, database, and file storage capabilities. Individual microservice modules may crawl through the model and determine data structures for atomic units of the model (e.g., for CAD, crawl through each part then find each face, curve, line, chord), and may further create a data structure of multiple files to represent that model. These files may comprise one or more of the original file, open-source clones, and other data representations such as JSON files and database inputs. Microservice modules may communicate with one another, and communicate with native modeling tools via a message bus. Based on user instructions/requests or target applications, the model splicer implementation shown in FIG. 32 may be used to create or generate further microservices in the form of model splices that are linkable to other model splices generated from different model-type files.

Figure 33:
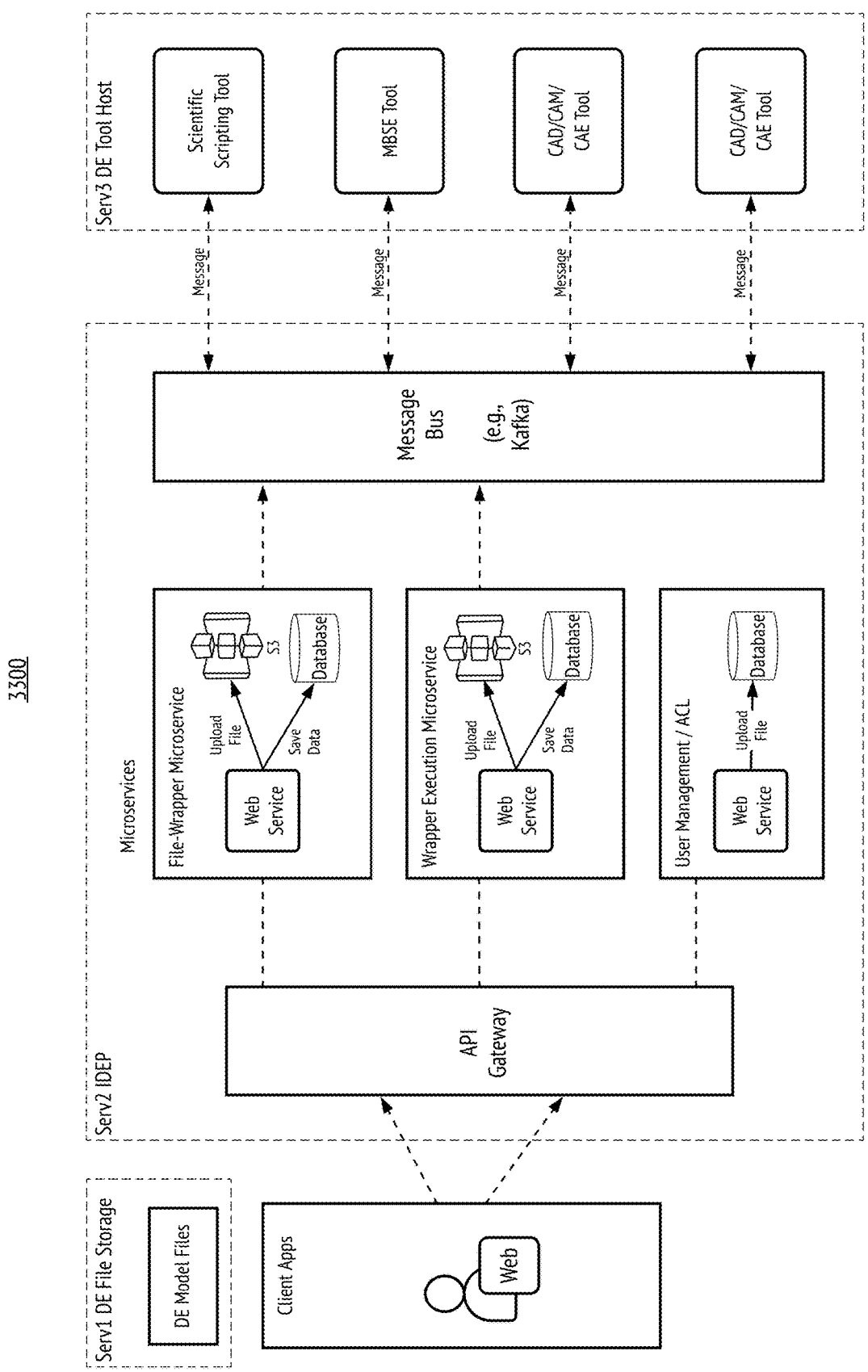
FIG. 33 is a more detailed microservice architecture for implementing model splicers for a variety of DE tools and model-type files, in accordance with some embodiments of the present invention.

FIG. 33 is a more detailed microservice architecture 3300 utilizing trusted agents connected via a message bus for implementing model splicers for a variety of DE tools and model-type files, in accordance with some embodiments of the present invention. Expanding on the example shown in FIG. 32, three microservices are provided: File-Wrapper microservice, Wrapper Execution microservice, and user management/access control list (ACL). In this embodiment, the File-Wrapper microservice generates model splices while the Wrapper Execution microservice executes wrapped API scripts on wrapped model data, based on user instructions, and the user management microservice controls user access to subsets of data and API functions. A message bus (e.g., open-source platform such as Kafka) is used to provide high-throughput and low-latency messaging services between the microservice modules and native digital engineering servers or platforms, which a client may have access to through user licenses. Note there are two CAD/CAM/CAE servers on the right, representing instances where multiple CAD/CAM/CAE servers are utilized by the same client, depending on what the client is working on. These servers may need to be isolated for contractual or finance reasons or the like. Although some data flow lines in FIG. 33 connecting client apps, gateway, microservices and message bus are drawn as unidirectional (e.g., with a single arrow), or drawn without arrows, it should be understood that each data link is bidirectional to enable data exchanges among connected modules.

In some embodiments, the microservice architecture in FIG. 33 may be implemented with distributed servers. For example, a first server Serv1 may store DE model files. This server may be hosted locally with the client, or in a Product Lifecycle Management (PLM) system such as Teamcenter. A second server Serv2 may implement the IDEP while one or more third servers Serv3 may host DE tools. In some embodiments, additional servers Serv4 and Serv5 may be used to host the API manager gateway and the message bus/microservice gateway respectively, separate from the IDEP microservice modules on Serv2.

Depending on confidentiality and security requirements, in some embodiments, the IDEP may include packages or microservices installed on the client's IT stack. In some embodiments, services may be split between cloud and on-premise servers, depending on which the customer uses. Furthermore, in some embodiments, the distributed servers shown in FIG. 33 are not separated physically, but rather separated logically (e.g., located on the same physical server but kept modular, to flex to enterprise user's IT stacks and other needs). In some embodiments, it is possible to deploy services on an enterprise customer's infrastructure entirely. The distributed server implementations as shown in FIG. 33 enable tight model access control by different parts of different organizations.

Next, an exemplary data flow through the microservice architecture in FIG. 33 is described for implementing the CAD model splicer example discussed with reference to FIGS. 14 to 21, according to some embodiments of the present invention. In particular, one or more of the following specific steps may be performed by an embodiment of the present invention, in place of, in addition to, or in combination with any process steps discussed in reference to FIGS. 11-13.

Model Splicing—Data Structure Creation
1. User uploads a CAD model-type file (e.g., drag-and-drop for user upload over Model Splicer UI).
2. An "Upload File API" is called via the API Gateway (e.g., AMAZON Gateway for cloud implementation of the API Gateway, or WS02 for on-premise implementation of the API Gateway).
3. A set of files and identifiers are constructed on Serv2, including File ID, Wrapper ID, Execution ID, etc.
4. This file information is uploaded to a database located in Serv2, along with user ID, size, etc.
5. A (producer) message is sent to Kafka, the message comprising model type/file format (e.g., CAD), file location, and function to be called (e.g., "DataExtraction")
6. Kafka forwards the (consumer) message to the server with the appropriate software tool (e.g., Serv3), based on the model type (e.g., CAD).
7. The Kafka message, which may be a JSON file, is parsed at the server hosting the software tool (e.g., Serv3) by a script (e.g., Wrapper.py) for creating folder structure on this server.
8. A file folder structure is created on the tool server (e.g., Serv3).

Model Splicing—Data Extraction
9. The file is copied (e.g., via Wrapper.py) over from Serv2 (e.g., cloud server) to Serv3 (the tool server), and a JSON file is created with the needed functions. When a file is uploaded for the first time via the model splicer interface, the first function call (e.g., 'DataExtraction') analyzes how the model file is structured. This function is similar to other functions/model splice API scripts, but is also a prerequisite for performing other functions.
10. During file processing/data extraction, a proprietary software tool API may be called to separate the model into its component parts (e.g., figuring out if there is a main function, and identifying nested functions).
11. The model file is further 'crawled' to determine its structure (e.g., features, dimensions, views, etc.), and the output may be saved as a JSON file. The term "crawling" broadly refers to text parsing the model type file and/or traversing the model syntax tree through proprietary or open-source software tool API. The crawling of different model type files may be different due to the model type file syntax and schema and the specific proprietary or open-source API tool involved.
12. This JSON file contains a simplified structure of the CAD model—this is valuable data for training AI-assisted embodiments.
13. Additional output may include open-source, neutral file formats (e.g., .obj, .stl), which may be used for visualization or rendering tasks without the need for the original proprietary file.
14. A spliced file package including the .JSON and any derived files and data structures (e.g., .OBJ and .STL files) are returned by the splicing platform.
15. A message is sent back through Kafka to the File-Microservice, to signal the completion of the data extraction process.
16. The File-Microservice parses the message and updated the database (e.g., Couchbase) with the paths for the extracted files (e.g., .JSON, .OBJ, .STL)

Model Splicing—Function Wrapping
17. A file wrapping/splicing API is called with the file ID and model file type.
18. The file wrapping/splicing service identifies a list of functions (e.g., HidePart (list)) that applies to the model type. The splicing service is capable of identifying functions across multiple disciplines and tools (e.g., FIG. 18).

19. Each function (e.g., ReducePolygonCount) contains information about the applicable file types, needed parameters, etc.
20. The model splicer may create a number of starter function wrappers for each uploaded model type to help the user understand roughly how to use the systems. In the CAD model example shown in FIG. 18, these base functions are Generate 2D view( ), Hide parts (List), Number ( ), Reduce Triangle Count (Select), etc. In some embodiments, these starter functions are learned by an AI module (e.g., FIG. 16).
21. Next, starter/default/base model-splices/model-wrappers are generated step-by-step via a loop from the set of files in Serv2 (e.g., model/data parts), and the list of functions that apply to the model file type.
22. The model splicer platform begins processing the files and the functions shown under Step 21 to create the starter/default/base splices/wrappers. To create a model splice/wrapper, first an entry for the wrapper is created in the database.
23. A model splice/wrapper node may be created with the functions and data from the descriptive JSON file under Step 21. Each model splice node includes certain input API endpoints/user inputs (e.g., fidelity, resolution, size, parts to include, parts to exclude) and output API endpoints. The model splice node may be initiated with default values (e.g., in the airplane propeller example shown in FIG. 19, may start with low fidelity, none of the parts hidden, and the 3D view).
24. If applicable a user can add functions which update the model splice/wrapper (e.g., FIG. 18).
25. The user can also update the parameters (e.g., user selecting "All Parts-Propeller" in FIG. 17), which updates the node represented in the new data format, not in the original model format.
26. Once satisfied, the user may provide instructions to execute the splice/wrapper (e.g., clicking on "submit" button in FIG. 19). The process steps 24 and 25 are iterative, whereby users may add/remove functions or change input values and parameters, with or without AI assistance.

Model Splicing—Model Wrapper Execution

27. Once the user submits, the "Wrapper-Execution" microservice is called.
28. A producer message is sent via Kafka to Serv3, with payload set to node_ID, which includes required inputs and outputs for the model wrapper. For example:
"payload":"[{\"node_id\":\"a6778ccd-49ea-44bB-8587-251fb71311b8\",
\"node_name\":\"Reduction\",
\"input",{\"partslist\":[ ],
\"modelFidelity\":\"Low\"}}]",
"output_payload":"[{\"node_id\":\"e3fclf10-e8lb-4352-bd7c-f7071b3400c9\",
\"node_name\":\"Generate-2D-render\",
\"input\":{ },
\"output\":{\"alias\":\"Generate 2D image\", \"description\":
\"Generate 2D image\", \"downloadable\":true,
\"name\":\"Generate-2D-render\", \"shareable\":true,
\"type\":\"2d\", \"view_component\":\"2d_viewer\",
\"visible\":true}}]
29. An executable function (e.g., OpenCADFunctions.exe) is called by a script on Serv3, with the node as input, which then runs program.cs to modify the native CAD file using IDEP-generated scripts of CAD APIs.
30. Thus, the IDEP turns complex coding from many model types into simple function calls. In an alternative embodiment, one or more LLMs are trained to automatically generate the required transformations (e.g., API function scripts) on the source model file.
31. The splicing system uses the native model-type APIs to modify the source model file, generating a new fork of the model. For example, native APIs may be used to modify the native part(s), e.g., take engine.prt as input and use HideParts with all native API (i.e., under a proprietary product license, modify the part to create a new fork of the part, called engine_noPropeller.prt). Alternatively, the platform may rely only on open-source files of the file package to generate a new fork of the model, without returning to the model type's native software tool, e.g., the system creates a new "fork" (e.g., engine_noPropeller.obj, engine_noPropeller.stl, engine noPropeller.JSON) from the input files engine.obj, engine.stl, and engine.JSON. A new engine_noPropeller.prt file can then be generated from the open-source files. This new "fork" of the files is stored on Serv2 (e.g., Amazon S3) and as an updated "execution" on the database. That is, the script on Serv3 uploads the updated .prt, .JSON, .obj, and .stl files to Serv2.
32. If the user creates more variations, more 'forks' would be created, all with full traceability and auditability.
33. The updated versions are served back to the user within the model splicing platform UI/within the web-app. The modular architecture of the model splicer enables alternative embodiments to meet enterprise customers' needs. In further embodiments, encryption and access control may be implemented between the different servers, modules, and services described above.

On a high-level, the exemplary microservice architecture implementations of the model splicer platform are capable of performing the following:

1. Extracting data and information from an input DE model. This can be done using specialized software tools which parse the data contained in the model and extract the relevant information. The extracted information can include model data, other characteristics of the physical object represented by the model, and model-type file structure and schema.
2. Creating a microservice using the extracted data and information. The extracted data from the model is used to create a model splice. The model splice may be deployed as a microservice and provides specific information and functionality related to the physical object represented by the digital engineering model.
3. Deploying the microservice on a server and making it available to other applications over a network. This can be done using standard techniques for deploying and hosting microservices. The microservice can be accessed and used by other applications using standard protocols and APIs, allowing it to be integrated into a wide range of engineering workflows and applications.

Embodiments of the present invention offer a number of advantages over existing approaches for converting digital models into microservices. First, it provides a scalable and flexible method for extracting data and information from models and using it to create model splices/wrappers as microservices. This allows engineers to leverage the detailed information contained in digital engineering models to create powerful and flexible microservices that can be used in a wide range of applications. Second, the invention is easy to use and does not require specialized skills or knowledge. This makes it accessible to a wide range of engineers and other users, allowing them to easily convert models into microservices and integrate them into their existing workflows and tools. Third, the present invention is highly versatile and can be applied to a wide range of engineering applications. For example, it can be used to create microservices that provide information about the dimensions, weight, and performance characteristics of physical objects such as cars, airplanes, and buildings. It can also be used to create microservices that provide real-time simulation and visualization of physical systems, allowing engineers to analyze and optimize the behavior of complex systems in a virtual environment.

ADDITIONAL ALTERNATIVE IMPLEMENTATIONS

AI-Assisted Model Splicer Creation

In one embodiment, the IDEP may utilize Language Learning Models (LLMs) to generate model splicers for a generalized variety of model type files, effectively bridging the gap between various DE tools. Such LLMs may be trained and deployed as part of AI-Based Recommender/Generator Engine 1236 shown in FIG. 12. Initially, a desired DE tool may be selected, and its respective API documentation webpages may be collated using advanced techniques such as autoGPT. The system may then proceed to scrape all text and API calls from these documentation webpages and related forums using web scraping tools such as Elinks and Selenium. The extracted text may then be converted into embeddings using a tokenizer and an embeddings API or similar technology. These API texts and their corresponding embedding vectors may be stored in a vector database, which may be further enhanced by summarizing each API text using a fast Language Model (e.g., GPT-3.5) and adding these summaries additionally in the database.

To facilitate seamless interaction with developers or users, the system may convert user questions about API usage into embeddings and identifies the closest embeddings in the vector database using techniques such as cosine similarity. The API summary and text of the closest embeddings may then be converted back into regular text, which serves as input for an advanced LLM (e.g., GPT-4) to construct a script for a wrapper. The generated script may be tested on the actual software (e.g., OpenFOAM) for compilation, and if unsuccessful, the advanced LLM may be requested to fix the script until it compiles successfully. The successfully compiled code and the original request are added to the vector database, and the process iterates for approximately 10,000 requests to generate a diverse sample of API usage. This iterative approach is repeated for each tool listed in the initial step, ultimately creating a comprehensive knowledge base for various DE tools. Optionally, additional human or alternative checkers can be employed to ensure code functionality, and fine-tuned LLMs can be developed for each specific tool, enhancing the system's overall performance.

AI-Assisted Requirements Verification

In an illustrative example utilizing model splicing in an AI-assisted requirements verification, a user may upload a digital model file (e.g., CAD file for an airplane seat) into the IDEP, via a GUI or an API interface. The CAD file may be in .zip format with the entire seat assembly included, and a 3-dimensional (3D) view of the design may be displayed via the GUI for the user to confirm that the correct file has been uploaded. The same GUI may receive further user input/instructions for seat requirements verification.

Next, the user may upload the requirements file. For example, the user may click on an "Upload requirements" icon to initiate the upload process, then choose an excel requirements document to upload. The IDEP may convert the excel file into CSV format. Requirements describe the necessary functions and features of the system when designed, implemented, and operated. As such, requirements set constraints and goals in the design space and the objective space, trading off design characteristics or limitations such as performance, schedule, cost, and lifecycle properties.

Once processed, a list of requirements as extracted from the requirements file may be displayed to the user for a walk through, where the user may make any corrections to individual requirements as needed. In some embodiments, the IDEP may display an error message to the user if any potential errors or conflicts are detected automatically.

Next the user may interact with the GUI to start the AI-assisted requirements verification process. A workflow of the verification process may be displayed to the user to monitor the verification progress, allowing the user or a human expert to review correctly verified items, review error list examples, and provide feedback to the system if needed.

A report may be generated automatically by the IDEP once verification is completed. The IDEP may further provide functions for tracking/archiving verification histories, and for sharing the report via a downloadable link.

In an exemplary AI-assisted requirements verification process, LLMs may be employed as well to analyze an input requirement file. Before running the AI-assisted requirement verification process, pre-processing may be completed to add embeddings from reference requirements documentation (e.g., MIL-HDBK-516C Airworthiness Certification Criteria, for all manned and unmanned, fixed and rotary wing air systems) to the LLM.

Upon initiation of the AI-assisted requirement verification process, a requirements file (e.g., in excel or CSV format) and a corresponding digital model file (e.g., CAD) to be verified against the requirements may be uploaded.

The requirements file may be spliced into a Model Splice R, using a dedicated Requirements Model Splicer, to extract the individual requirements, which may be quantitative or qualitative. Model Splice R may be further processed to assess, classify, or categorize qualitative and quantitative requirements, using the pre-processed LLM.

Next, each requirement may be individually assessed. A requirement determined to be quantitative may be checked or corrected via expert feedback, and its category may be edited or reassigned if incorrect. Similarly, a requirement determined to be qualitative may be checked or corrected via expert feedback, and its category may be edited or reassigned if incorrect.

For every correctly identified quantitative requirement, variables needed for evaluation against the requirement may be identified, and the input CAD model may be spliced accordingly into a Model Splice M, to extract current value from input variables or to calculate from model parameters. If Model Splice M already exists (i.e., variable values against an earlier requirement have been extracted already), Model Splice M may be updated with values for new/additional variables.

For every correctly identified qualitative requirement, the LLM may be used to extract relevant information to query the input CAD model when creating or updating Model Splice M. That is, model specific data may be extracted from the input CAD model to answer qualitative questions from Model Splice R.

Next, Model Splice R and Model Splice M may be linked appropriately, such that corresponding requirements from splice R is evaluated with the corresponding model parameters from splice M, to check against requirement and output satisfiability. A human expert may review, validate, and approve each requirement verification result, and a verification report may be generated once all requirements have been considered.

Machine Learning (ML) and Neural Networks

Machine learning (ML) algorithms are characterized by the ability to improve their performance at a task over time without being explicitly programmed with the rules to perform that task (i.e., learn). An ML model is the output generated when a ML algorithm is trained on data. As described herein, embodiments of the present invention use one or more artificial intelligence (AI) and ML algorithms to perform splice function recommendation, model splice updating, and/or model splice generation. Various exemplary ML algorithms are within the scope of the present invention. The following description describes illustrative ML techniques for implementing various embodiments of the present invention.

Neural Networks

Figure 34:
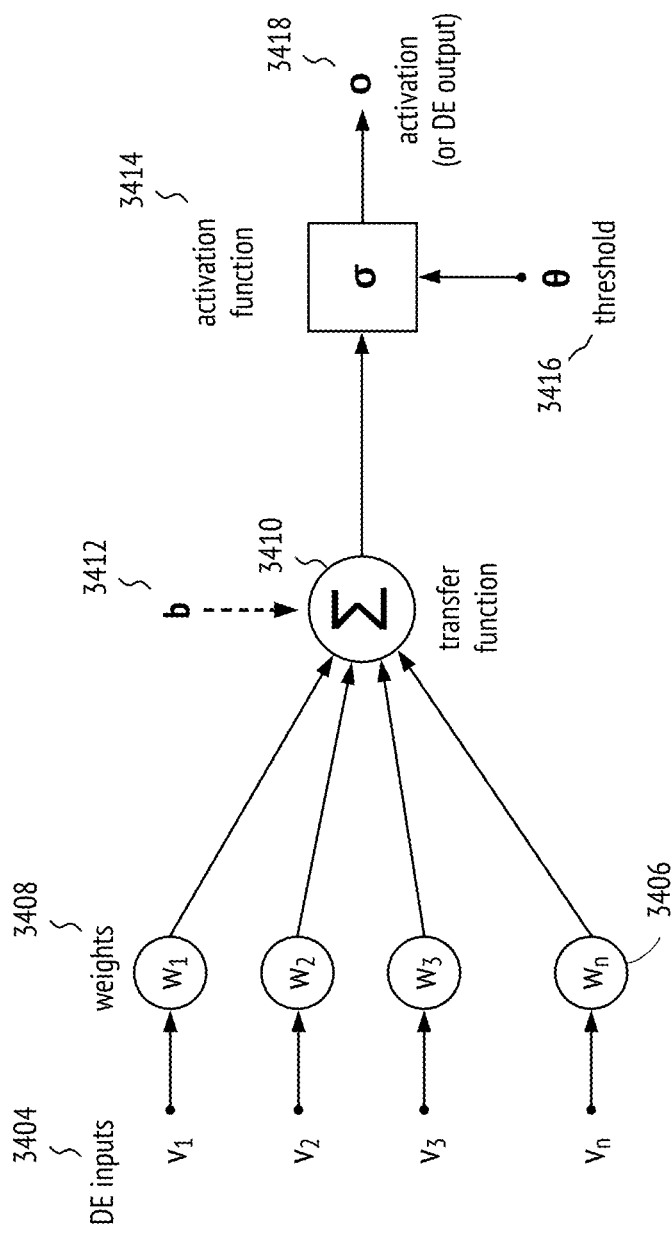
FIG. 34 describes neural network operation fundamentals, in accordance with some embodiments of the present invention.

A neural network is a computational model comprising interconnected units called "neurons" that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 34 describes neural network operation fundamentals, according to exemplary embodiments of the present invention.

FIG. 34 shows a single-layered neural network, also known as a single-layer perceptron. The operation of a single-layered neural network involves the following steps:
1. Input: Receiving a DE input vector v 3404 with elements $v_j$, with $j \in [1, n]$ representing the $j^{th}$ DE input, and where each element of the vector corresponds to an element 3406 in the input layer. For an exemplary neural network model (e.g., to implement a recommender engine 1236) trained to determine whether a splice function is to be recommended based on user input, the DE input vector v 3404 may take the form of a user prompt. A DE input can be a user prompt, a DE document, a DE model, DE program code, system data from the IDEP, and/or any useful form of data in digital engineering.
2. Transfer Function: Multiplying each element of the DE input vector by a corresponding weight $w_j$ 3408. These weighted inputs are then summed together as the transfer function, yielding the net input to the activation function $$\sum_{j=1}^{n} v_j \cdot w_j \quad 3410.$$

Each neuron in a neural network may have a bias value 3412, which is added to the weighted sum of the inputs to that neuron. Both the weights and bias values are learned during the training process. The purpose of the bias is to provide every neuron with a trainable constant value that can help the model fit the data better. With biases, the net input to the activation function is $$\sum_{j=1}^{n} \{v_j \cdot w_j\} + b.$$

In the exemplary neural network model described above (e.g., to implement a recommender engine 1236), the value of the transfer function 3410 may represent the probability that the target splice function will be recommended.

3. Activation Function: Passing the net input through an activation function 3414. The activation function a determines the activation value o 3418, which is the output of the neuron. It is typically a non-linear function such as a sigmoid or ReLU (Rectified Linear Unit) function. The threshold θ 3416 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.

In the exemplary neural network model described above (e.g., to implement a recommender engine 1236), the activation function σ 3414 may be a ReLU that is activated at a threshold θ 3416 representing the minimum probability for the target splice function to be recommended. Hence, the activation function 3414 will yield a positive recommendation when the recommendation likelihood exceeds the threshold θ 3416.

4. Output: The activation value o 3418 is the output of the activation function. This value is what gets passed on to the next layer in the network or becomes the final DE output in the case of the last layer. In the exemplary neural network model described above (e.g., to implement a recommender engine 1236), the activation value o 3418 is a DE output that is a boolean or binary parameter taking a positive value when the target splice function is to be recommended and a negative value otherwise. A DE output can be a DE document, a DE model, DE program code, or any useful form of data in digital engineering.

In the exemplary neural network discussions of FIG. 34, examples are provided with respect to a particular recommender engine implementation using neural networks. Analogous approaches can be used to implement the generator engine and any other NN-based components of the systems and subsystems described herein.

Figure 35:
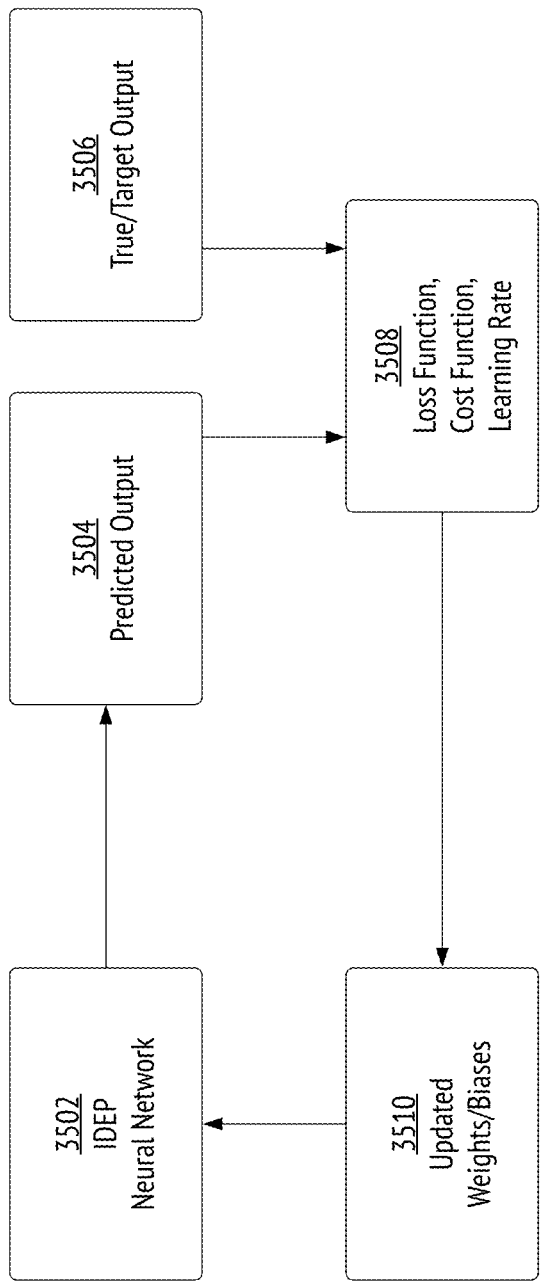
FIG. 35 shows an overview of an IDEP neural network training process, in accordance with some embodiments of the present invention.

FIG. 35 shows an overview of an IDEP neural network training process, according to exemplary embodiments of the present invention.

The training of the IDEP neural network involves repeatedly updating the weights and biases 3510 of the network to minimize the difference between the predicted output 3504 and the true or target output 3506, where the predicted output 3504 is the result produced by the network when a set of inputs from a dataset is passed through it. The predicted output 3504 of an IDEP neural network 3502 corresponds to the DE output 3518 of the final layer of the neural network. The true or target output 3506 is the true desired result. The difference between the predicted output and the true output is calculated using a loss function 3508, which quantifies the error made by the network in its predictions.

The loss function is a part of the cost function 3508, which is a measure of how well the network is performing over the whole dataset. The goal of training is to minimize the cost function 3508. This is achieved by iteratively adjusting the weights and biases 3510 of the network in the direction that leads to the steepest descent in the cost function. The size of these adjustments is determined by the learning rate 3508, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

For an IDEP neural network model 3502 based on the exemplary neural network model (e.g., to implement a recommender engine 1236) discussed above in the context of FIG. 34, and trained to determine whether a target splice function is to be recommended based on user instructions:
- the weights and biases 3510 are the IDEP neural network's hyperparameters that get updated at each iteration of the training process, as discussed in the context of FIG. 34,
- the predicted output 3504 is the binary prediction on whether the target splice function is to be recommended based on a sample user prompt, (or a normalized score ranking prioritizing the order of splice functions to be displayed to the user),
- the true/target output 3506 is the correct decision (i.e., sample ground truth output) on whether to recommend the target data based on the sample user prompt,
- the loss function 3508 is the difference between the evaluation and the true output (e.g., a binary error indicating whether the IDEP neural network's decision was correct),
- the cost function 3508 is the average of all errors over a training dataset including sample user prompts and corresponding binary recommendations on the target splice function, and
- the learning rate 3508 is the rate at which the cost function 1408 in consecutive training epochs approaches a pre-specified tolerable cost function.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 3510 of the network based on the error (e.g., cost function) 3508 of the output. After forward propagation through the IDEP neural network 3502, the output 3504 of the network is compared with true output 3506, and the error 3508 is calculated. This error is then propagated back through the network, starting from the output layer and moving towards the input layer. The weights and biases 3510 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

Figure 36:
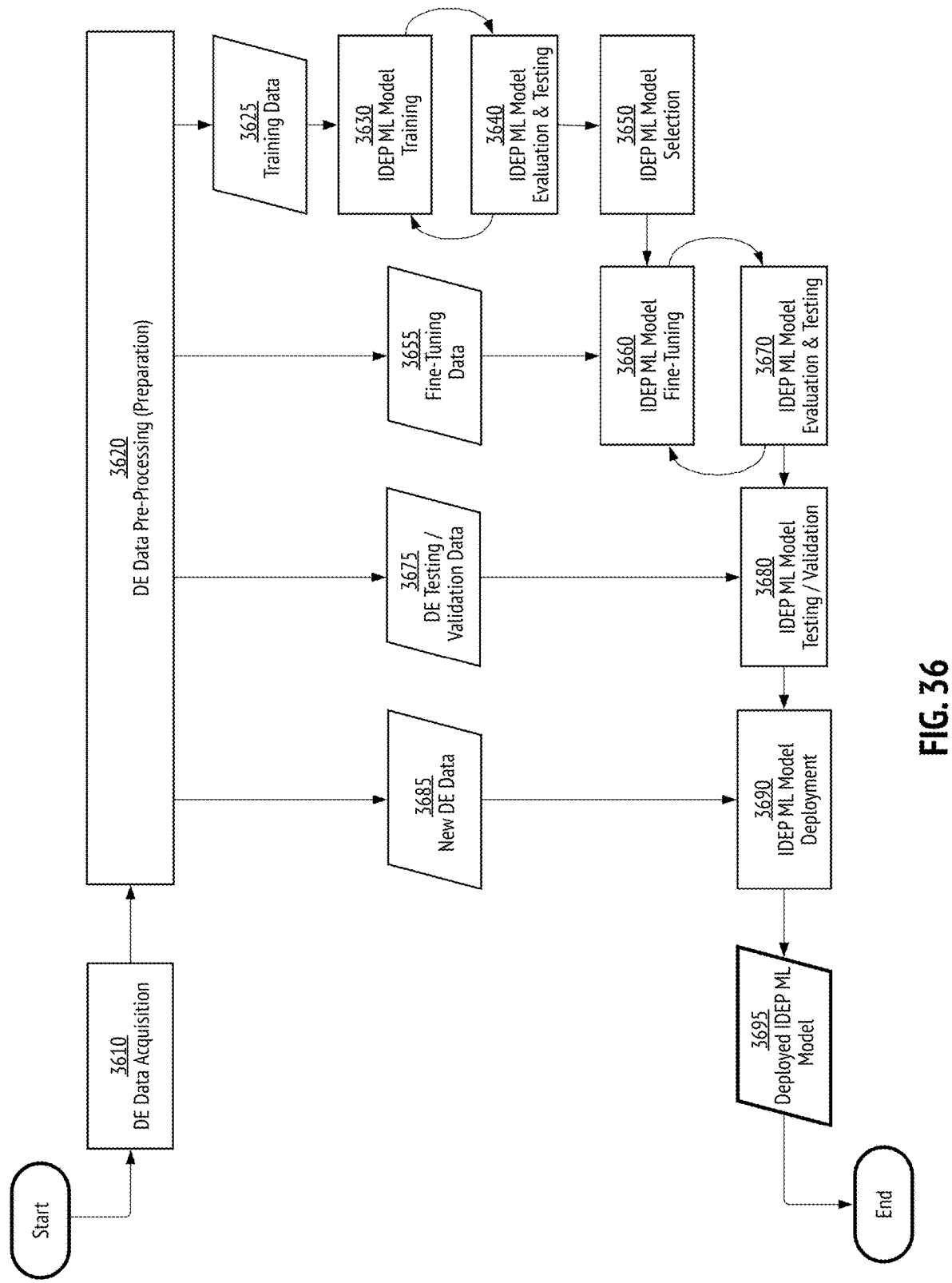
FIG. 36 is an illustrative flow diagram showing the different phases and datasets involved in training an IDEP machine learning model, in accordance with some embodiments of the present invention.

FIG. 36 provides additional details on the training process or an IDEP machine learning model, according to exemplary embodiments of the present invention.

Transformer Model Architecture

The transformer architecture is a neural network design that was introduced in the paper "*Attention is All You Need*" by Vaswani et al. published in June 2017 (available at arxiv.org/abs/1706.03762), and incorporated herein by reference as if fully set forth herein. Large Language Models (LLMs) heavily rely on the transformer architecture.

The architecture (see Fig. 1 in Vaswani et al.) is based on the concept of "attention", allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens". This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space)

to an embeddings space. This process, referred to as "encoding", transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding". Therefore, the training of a neural network and its evaluation (i.e., its use upon deployment) both occur within the embeddings space.

In this document, the processes of tokenization, encoding, decoding, and de-tokenization may be assumed. In other words, the processes described below occur in the "embeddings space". Hence, while the tokenization and encoding of training data and input prompts may not be represented or discussed explicitly, they may nevertheless be implied. Similarly, the decoding and de-tokenization of neural network outputs may also be implied.

Training and Fine-Tuning Machine Learning (ML) Modules

FIG. 36 is an illustrative flow diagram showing the different phases and datasets involved in training an IDEP ML model, according to exemplary embodiments of the present invention.

The training process starts at step 3610 with DE data acquisition, retrieval, assimilation, or generation. At step 3620, acquired DE data are pre-processed, or prepared. At step 3630, the IDEP ML model is trained using training data 3625. At step 3640, the IDEP ML model is evaluated, validated, and tested, and further refinements to the IDEP ML model are fed back into step 3630 for additional training. Once its performance is acceptable, at step 3650, optimal IDEP ML parameters are selected.

Training data 3625 is a dataset containing multiple instances of system inputs (e.g., user inputs, user prompts, input DE models, etc.) and correct outcomes (e.g., data descriptors, specific dimensions calculated from splice functions, model component details, specific splice function scripts etc.). It trains the IDEP ML model to optimize the performance for a specific target task, such as the prediction of a specific target output data field for a specific task In FIG. 36, training data 3625 may also include subsets for validating and testing the IDEP ML model, as part of the training iterations 3630 and 3640. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 3625 may be expanded via a document database augmentation process.

In some embodiments, an additional fine-tuning 3660 phase including iterative fine-tuning 3660 and evaluation, validation, and testing 3670 steps, is carried out using fine-tuning data 3655. Fine-tuning in machine learning is a process that involves taking a selected 3650 pre-trained model and further adjusting or "tuning" its parameters to better suit a specific task or fine-tuning dataset 3655. This technique is particularly useful when dealing with deep learning models that have been trained on large, general training datasets 3625 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 3625, such as ImageNet (available at image-net.org) for image recognition tasks. The model's existing weights, which have been learned from the original training, serve as the starting point. During fine-tuning, the model is trained further on a new fine-tuning dataset 3655, which may contain different classes or types of data than the original training set. This additional training phase allows the model to adjust its weights to better capture the characteristics of the new fine-tuning dataset 3655, thereby improving its performance on the specific task it is being fine-tuned for.

In some embodiments, additional test and validation 3680 phases are carried out using DE test and validation data 3675. Testing and validation of a ML model both refer to the process of evaluating the model's performance on a separate dataset 3675 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the IDEP ML model is trained 3630, selected 3650, and optionally fine-tuned 3660 and validated/tested 3680, the process ends with the deployment 3690 of the IDEP ML. Deployed IDEP ML models 3695 usually receive new DE data 3685 that was pre-processed 3680.

In machine learning, data pre-processing 3620 is tailored to the phase of model development. During model training 3630, pre-processing involves cleaning, normalizing, and transforming raw data into a format suitable for learning patterns. For fine-tuning 3660, pre-processing adapts the data to align with the distribution of the specific targeted task, ensuring the pre-trained model can effectively transfer its knowledge. Validation 3680 pre-processing mirrors that of training to accurately assess model generalization without leakage of information from the training set. Finally, in deployment 3690, pre-processing ensures real-world data matches the trained model's expectations, often involving dynamic adjustments to maintain consistency with the training and validation stages.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "*Understanding Large Language Models—A Transformative Reading List*", by S. Raschka (posted Feb. 7, 2023, available at sebastianraschka-.com/blog/2023/llm-reading-list.html), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances and output instances or may be generated synthetically by subject matter experts.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be cloud-based, and in direct or indirect communication with, for example, one another over the same or different wired or wireless networks. All of these devices, including servers, clients, and other computing entities or nodes may be run internally by a customer (in various architecture configurations including private cloud), internally by the provider of the IDEP (in various architecture configurations including private cloud), and/or on the public cloud.

Figure 37:
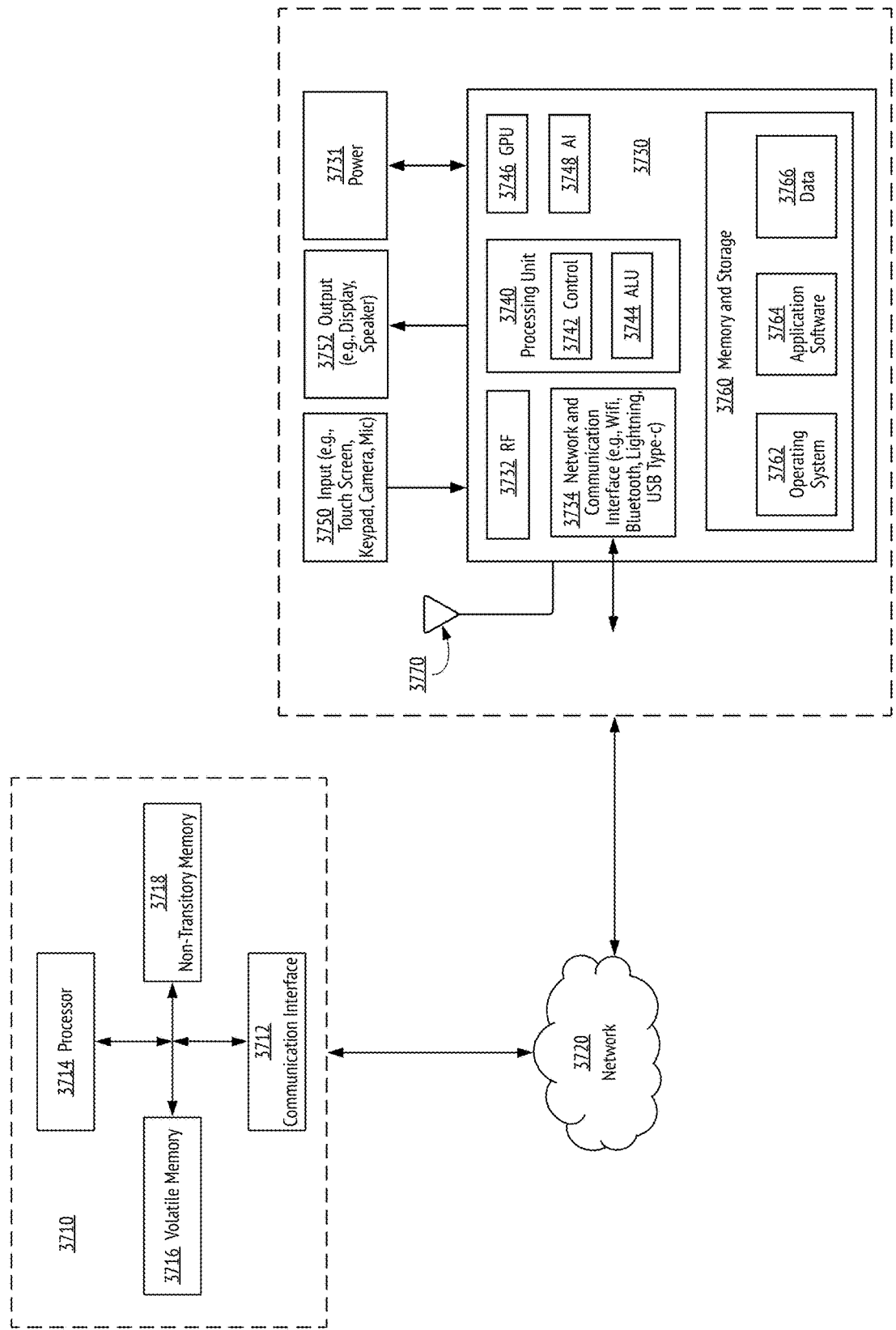
FIG. 37 provides illustrative schematics of a server (management computing entity) and a client (user computing entity) used for documentation within an IDEP, in accordance with some embodiments of the present invention.

FIG. 37 provides illustrative schematics of a server (management computing entity) 3710 connected via a network 3720 to a client (user computing entity) 3730 used for documentation within an interconnected digital engineering platform (IDEP), according to some embodiments of the present invention. While FIG. 37 illustrates the various system entities as separate, standalone entities, the various embodiments are not limited to this particular architecture. Additionally, the terms "client device", "client computing entity", "edge device", and "edge computing system" are equivalent and are used interchangeably herein.

Exemplary Management Computing Entity

An illustrative schematic is provided in FIG. 37 for a server or management computing entity 3710. In general, the terms computing entity, computer, entity, device, system, and/or similar words used herein interchangeably may refer to, for example, one or more cloud servers, computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, crawling, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably), as they are used in a digital engineering process.

In one embodiment, management computing entity 3710 may be equipped with one or more communication interfaces 3712 for communicating with various computing entities, such as by exchanging data, content, and/or information (similar terms used herein interchangeably) that can be transmitted, received, operated on, processed, displayed, stored, and/or the like. For instance, management computing entity 3710 may communicate with one or more client computing devices such as 3730 and/or a variety of other computing entities. Network or communications interface 3712 may support various wired data transmission protocols including, but not limited to, Fiber Distributed Data Interface (FDDI), Digital Subscriber Line (DSL), Ethernet, Asynchronous Transfer Mode (ATM), frame relay, and data over cable service interface specification (DOCSIS). In addition, management computing entity 3710 may be capable of wireless communication with external networks, employing any of a range of standards and protocols, including but not limited to, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

As shown in FIG. 37, in one embodiment, management computing entity 3710 may include or be in communication with one or more processors 3714 (also referred to as processors and/or processing circuitry, processing elements, and/or similar terms used herein interchangeably) that communicate with other elements within management computing entity 3710, for example, via a bus. As will be understood, processor 3714 may be embodied in a number of different ways. For example, processor 3714 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. The term circuitry may refer to an entire hardware embodiment or a combination of hardware and computer program products. Thus, processor 3714 may be embodied as integrated circuits (ICs), application-specific integrated circuits (ASICs), field-programmable gate arrays (FPGAs), programmable logic arrays (PLAs), hardware accelerators, other circuitry, and/or the like. As will therefore be understood, processor 3714 may be configured for a particular use or configured to execute instructions stored in volatile or non-volatile (or non-transitory) media 3716 and 3718, or otherwise accessible to processor 3714. As such, whether configured by hardware or computer program products, or by a combination thereof, processor 3714 may be capable of performing steps or operations according to embodiments of the present disclosure when configured accordingly.

In one embodiment, management computing entity 3710 may further include or be in communication with non-transitory memory 3718 (also referred to as non-volatile media, non-volatile storage, non-transitory storage, physical storage media, memory, memory storage, and/or memory circuitry—similar terms used herein interchangeably). In one embodiment, the non-transitory memory or storage may include one or more non-transitory memory or storage media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store cloud storage buckets, databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, management computing entity 3710 may further include or be in communication with volatile memory 3716 (also referred to as volatile storage, memory, memory storage, memory and/or circuitry—similar terms used herein interchangeably). In one embodiment, the volatile storage or memory may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, processor 3714. Thus, the cloud storage buckets, databases, database instances, database management systems, data, applications, programs, program modules, scripts, source code, object code, byte code, compiled code, interpreted code, machine code, executable instructions, and/or the like may be used to control certain aspects of the operation of management computing entity 3710 with the assistance of processor 3714 and an operating system.

Although not shown, management computing entity 3710 may include or be in communication with one or more input elements, such as a keyboard input, a mouse input, a touch screen/display input, motion input, movement input, audio input, pointing device input, joystick input, keypad input, and/or the like. Management computing entity 3710 may also include or be in communication with one or more output elements, also not shown, such as audio output, visual output, screen/display output, motion output, movement output, spatial computing output (e.g., virtual reality or augmented reality), and/or the like.

As will be appreciated, one or more of the components of management computing entity 3710 may be located remotely from other management computing entity components, such as in a distributed system. Furthermore, one or more of the components may be combined and additional components performing functions described herein may be included in management computing entity 3710. Thus, management computing entity 3710 can be adapted to accommodate a variety of needs and circumstances. As will be recognized, these architectures and descriptions are provided for exemplary purposes only and are not limited to the various embodiments.

Exemplary User Computing Entity

A user may be a human individual, a company, an organization, an entity, a department within an organization, a representative of an organization and/or person, an artificial user such as algorithms, artificial intelligence, or other software that interfaces, and/or the like. FIG. 37 further provides an illustrative schematic representation of a client user computing entity 3730 that may be used in conjunction with embodiments of the present disclosure. In various embodiments, computing device 3730 may be a general-purpose computing device with dedicated modules for performing digital engineering-related tasks. It may alternatively be implemented in the cloud, with logically and/or physically distributed architectures.

As shown in FIG. 37, user computing entity 3730 may include a power source 3731, an antenna 3770, a radio transceiver 3732, a network and communication interface 3734, and a processor unit 3740 that provides signals to and receives signals from the network and communication interface. The signals provided to and received may include signaling information in accordance with air interface standards of applicable wireless systems. In this regard, user computing entity 3730 may be capable of operating with one or more air interface standards, communication protocols, modulation types, and access types. More particularly, user computing entity 3730 may operate in accordance with any of a number of wireless communication standards and protocols, such as those described above with regard to management computing entity 3710. Similarly, user computing entity 3730 may operate in accordance with multiple wired communication standards and protocols, such as those described above with regard to management computing entity 3710.

Via these communication standards and protocols, user computing entity 3730 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 3730 may also download changes, add-ons, and updates, for instance, to its firmware, software (e.g., including executable instructions, applications, program modules), and operating system.

In some implementations, processing unit 3740 may be embodied in several different ways. For example, processing unit 3740 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. Further, processing unit 3740 may be embodied as one or more other processing devices or circuitry. The term circuitry may refer to an entirely hardware embodiment or a combination of hardware and computer program products. Thus, processing unit 3740 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 3740 may be configured for a particular use or configured to execute instructions stored in volatile or non-volatile media or otherwise accessible to the processing unit. As such, whether configured by hardware or computer program products, or by a combination thereof, processing unit 3740 may be capable of performing steps or operations according to embodiments of the present invention when configured accordingly.

In some embodiments, processing unit 3740 may comprise a control unit 3742 and a dedicated arithmetic logic unit (ALU) 3744 to perform arithmetic and logic operations. In some embodiments, user computing entity 3730 may comprise a graphics processing unit (GPU) 3746 for specialized parallel processing tasks, and/or an artificial intelligence (AI) module or accelerator 3748, also specialized for applications including artificial neural networks and machine learning. In some embodiments, processing unit 3740 may be coupled with GPU 3746 and/or AI accelerator 3748 to distribute and coordinate digital engineering related tasks.

In some embodiments, computing entity 3730 may include a user interface, comprising an input interface 3750 and an output interface 3752, each coupled to processing unit 3740. User input interface 3750 may comprise any of a number of devices or interfaces allowing computing entity 3730 to receive data, such as a keypad (hard or soft), a touch display, a mic/speaker for voice/speech/conversation, a camera for motion or posture interfaces, and appropriate sensors for spatial computing interfaces. User output interface 3752 may comprise any of a number of devices or interfaces allowing computing entity 3730 to provide information to a user, such as through the touch display, or a speaker for audio outputs. In some embodiments, output interface 3752 may connect computing entity 3730 to an external loudspeaker or projector, for audio and/or visual output. In some embodiments, user interfaces 3750 and 3752 integrate multimodal data in an interface that caters to human users. Some examples of human interfaces include a dashboard-style interface, a workflow-based interface, conversational interfaces, and spatial-computing interfaces. As shown in FIG. 5, computing entity 3730 may also support bot/algorithmic interfaces such as code interfaces, text-based API interfaces, and the like.

User computing entity 3730 can also include volatile and/or non-volatile storage or memory 3760, which can be embedded and/or may be removable. For example, the non-volatile or non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory 3760 may store an operating system 3762, application software 3764, data 3766, databases, database instances, database management systems, data, applications, programs, program modules, scripts, source code, object code, byte code, compiled code, interpreted code, machine code, executable instructions, and/or the like to implement functions of user computing entity 3730. As indicated, this may include a user application that is resident on the entity or accessible through a browser or other user interface for communicating with management computing entity 3710 and/or various other computing entities.

In some embodiments, user computing entity 3730 may include one or more components or functionalities that are the same or similar to those of management computing entity 3710, as described in greater detail above. As will be recognized, these architectures and descriptions are provided for exemplary purposes only and are not limited to the various embodiments.

In some embodiments, computing entities 3710 and/or 3730 may communicate to external devices like other computing devices and/or access points to receive information such as software or firmware, or to send information from the memory of the computing entity to external systems or devices such as servers, computers, smartphones, and the like.

In some embodiments, two or more computing entities such as 3710 and/or 3730 may establish connections using a network such as 3720 utilizing any of the networking protocols listed previously. In some embodiments, the computing entities may use network interfaces such as 3712 and 3734 to communicate with each other, such as by communicating data, content, information, and/or similar terms used herein interchangeably that can be transmitted, received, operated on, processed, displayed, stored, and/or the like.

Additional Hardware & Software Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "processor", "computer," "data processing apparatus", and the like encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, code, program code, and the like) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a backend component, e.g., as an information/data server, or that includes a middleware component, e.g., an application server, or that includes a frontend component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "program code," "computer program(s)", "computer code(s)," and the like. The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "a," "an," and "the" include plural references unless the context clearly indicates otherwise. Thus, for example, reference to "a cable" includes a single cable as well as a bundle of two or more different cables, and the like.

The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes parameters, etc., to provide a thorough understanding of the present invention. The particular features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number±10%, such that "about 10" would include from 9 to 11. In other exemplary embodiments, the term "about" may include the recited number ±X %, where X is considered the normal variation in said measurement by one of ordinary skill in the art.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom. Features of the transitory physical storage medium described may be incorporated into/used in a corresponding method, digital documentation system and/or system, and vice versa.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, as defined by the claims.

What is claimed is:

1. A non-transitory physical storage medium storing program code, the program code executable by a hardware processor to cause the hardware processor to execute a computer-implemented process for generating a sharable model splice of a digital engineering (DE) model, the program code comprising code to:
   receive a DE model file of the DE model having a DE model type, wherein the DE model file is in a native file format;
   extract model data from the DE model file in the native file format;
   store the model data in a model data storage area;
   generate one or more external, commonly-accessible splice function scripts that enable external access to one or more digital artifacts derived from the model data of the DE model file stored in the model data storage area,
      wherein the one or more external, commonly-accessible splice function scripts are written in a scripting language,
      wherein the one or more external, commonly-accessible splice function scripts engage a DE tool associated with the DE model type via a native tool Application Programming Interface (API) or Software Development Kit (SDK),
      wherein the one or more external, commonly-accessible splice function scripts provide a unified programming interface for a plurality of sharable model splices generated from a plurality of DE models having a same DE model type,
      wherein the one or more external, commonly-accessible splice function scripts provide one or more addressable API or SDK endpoints that are accessible by third-party applications and users without requiring direct encasement with the DE tool associated with the DE model type, and
      wherein the API or SDK endpoints enable access to the digital artifacts without access to an entirety of the DE model file; and
   generate the sharable model splice of the DE model, the sharable model splice accessible via the API or SDK endpoints by the third-party applications and users,
      wherein the sharable model splice comprises access to a selective portion of the one or more digital artifacts, and
      wherein the sharable model splice comprises access to at least one of the one or more external, commonly-accessible splice function scripts.

2. The non-transitory physical storage medium of claim 1, wherein the access to the selective portion of the one or more digital artifacts is provided through one of an address, a pointer, a link, an uniform resource locator (URL), and a copy of the one or more digital artifacts.

3. The non-transitory physical storage medium of claim 1, wherein the access to the at least one of the one or more external, commonly-accessible splice f unction scripts is provided through one of an address, a pointer, a link, an uniform resource locator (URL), and a copy of the at least one of the one or more external, commonly-accessible splice function scripts.

4. The non-transitory physical storage medium of claim 1, further comprising program code to:
   execute, within a secure customer environment, at least one of the one or more external, commonly-accessible splice function scripts to access and perform at least one action or computation on the selective portion of the one or more digital artifacts from the sharable model splice of the DE model.

5. The non-transitory physical storage medium of claim 1, wherein the sharable model splice comprises metadata associated with the one or more digital artifacts, wherein the metadata indicates a given version of the DE model file and a timestamp when the one or more digital artifacts are derived from the DE model file having the given version.

6. The non-transitory physical storage medium of claim 1, wherein at least one of the one or more digital artifacts is one of the model data stored in the model data storage area, and wherein at least one of the one or more external, commonly-accessible splice function scripts is a read-type function.

7. The non-transitory physical storage medium of claim 1, further comprising program code to:
   execute, within a secure customer environment, at least one of the one or more external, commonly-accessible splice function scripts to derive the one or more digital artifacts from the model data stored in the model data storage area, wherein the model data storage area is located within the secure customer environment.

8. The non-transitory physical storage medium of claim 1, wherein the program code to extract the model data from the DE model file comprises a model crawling script that engages the DE tool associated with the DE model type via the native tool API or SDK.

9. The non-transitory physical storage medium of claim 1, wherein the sharable model splice comprises at least one of a first information security tag that indicates a level of the access to the selective portion of the one or more digital artifacts and a second information security tag that indicates a level of the access to the at least one of the one or more external, commonly-accessible splice function scripts.

10. The non-transitory physical storage medium of claim 1, further comprising program code to:
   generate an update to the DE model file, using the one or more external, common-accessible splice function scripts.

11. The non-transitory physical storage medium of claim 1,
   wherein the DE tool is a first DE tool, and
   wherein the unified programming interface is configured to interface with the first DE tool through the first DE tool's native tool API and to interface with a second DE tool through the second DE tool's native API, wherein the second DE tool is not directly interoperable with the first DE tool, and wherein the unified programming interface enables interoperable use of multiple DE tools in parallel.

12. The non-transitory physical storage medium of claim 1,
wherein the sharable model splice is a first sharable model splice and the DE model file is a first DE model file, and
wherein the selective portion of the one or more digital artifacts is ingested by a second sharable model splice generated from a second DE model file.

13. The non-transitory physical storage medium of claim 1, wherein the program code to generate the one or more external, commonly-accessible splice function scripts further comprises code to:
receive a user input; and
retrieve the access to the at least one of the external, commonly-accessible splice function scripts from a splice function datastore, based on the user input.

14. The non-transitory physical storage medium of claim 1, wherein the program code to generate the one or more external, commonly-accessible splice function scripts further comprises code to:
transmit, from a customer environment, a request to an API gateway service cell provided by an DE platform, wherein the customer environment is not managed by the DE platform, and wherein the request from the customer environment is unable to change production software associated with the DE platform; and
receive, at the customer environment, access to the one or more external, commonly-accessible splice function scripts from the API gateway service cell.

15. The non-transitory physical storage medium of claim 1, wherein the access to the at least one of the one or more external commonly-accessible splice function scripts is representational state transfer (REST) enabled.

16. The non-transitory physical storage medium of claim 1, wherein the program code to generate the one or more external, commonly-accessible splice function scripts comprises code to execute an AI algorithm trained on existing external, commonly-accessible splice function scripts associated with existing model splices for same DE model types and/or analogous DE models.

17. The non-transitory physical storage medium of claim 1, wherein the program code to extract model data from the DE model file comprises code to:
receive a microservice request for model splicing;
construct file information of the DE model file based on the DE model type;
send the DE model file and the file information to a native tool API server for the DE tool associated with the DE model type; and
receive a plurality of model data files from the native tool API server, generated from a data extraction or model crawling process on the DE model file, performed on the native tool API server.

18. The non-transitory physical storage medium of claim 1, wherein the DE tool associated with the DE model type is selected from the group consisting of model-based systems engineering (MBSE) tools, augmented reality (AR) tools, computer aided design (CAD) tools, data analytics tools, modeling and simulation (M&S) tools, product life-cycle management (PLM) tools, multi-attribute trade-space tools, simulation engines, requirements model tools, electronics model tools, test-plan model tools, cost-model tools, schedule model tools, supply-chain model tools, manufacturing model tools, cyber security model tools, and mission effects model tools.

19. A computer-implemented method for generating a sharable model splice of a digital engineering (DE) model, comprising:
receiving a DE model file of the DE model having a DE model type, wherein the DE model file is in a native file format;
extracting model data from the DE model file in the native file format;
storing the model data in a model data storage area;
generating one or more external, commonly-accessible splice function scripts that enable external access to one or more digital artifacts derived from the model data of the DE model file stored in the model data storage area,
wherein the one or more external, commonly-accessible splice function scripts are written in a scripting language,
wherein the one or more external, commonly-accessible splice function scripts engage a DE tool associated with the DE model type via a native tool Application Programming Interface (API) or Software Development Kit (SDK),
wherein the one or more external, commonly-accessible splice function scripts provide a unified programming interface for a plurality of sharable model splices generated from a plurality of DE models having a same DE model type,
wherein the one or more external, commonly-accessible splice function scripts provide one or more addressable API or SDK endpoints that are accessible by third-party applications and users without requiring direct encasement with the DE tool associated with the DE model type, and
wherein the API or SDK endpoints enable access to the digital artifacts without access to an entirety of the DE model file; and
generating the sharable model splice of the DE model, the sharable model splice accessible via the API or SDK endpoints by the third-party applications and users,
wherein the sharable model splice comprises access to a selective portion of the one or more digital artifacts, and
wherein the sharable model splice comprises access to at least one of the one or more external, commonly-accessible splice function scripts.

20. The computer-implemented method of claim 19, wherein the generating the one or more external, commonly-accessible splice function scripts is performed in a digital model platform enclave and wherein the generating the sharable model splice of the DE model is performed by a digital model platform exclave agent located within a secure customer environment, remote to the digital model platform enclave.

* * * * *

UNITED STATES PATENT AND TRADEMARK OFFICE
CERTIFICATE OF CORRECTION

| | | |
|---|---|---|
| PATENT NO. | : 12,333,228 B1 | Page 1 of 1 |
| APPLICATION NO. | : 19/067972 | |
| DATED | : June 17, 2025 | |
| INVENTOR(S) | : Roper, Jr. et al. | |

It is certified that error appears in the above-identified patent and that said Letters Patent is hereby corrected as shown below:

In the Claims

In Claim 1 (Column 109, Line 51), delete "encasement" and replace with -- engagement --.

In Claim 3 (Column 110, Line 5), delete "f unction" and replace with -- function --.

In Claim 19 (Column 112, Line 37), delete "encasement" and replace with -- engagement --.

Signed and Sealed this
Fifth Day of August, 2025

Coke Morgan Stewart
*Acting Director of the United States Patent and Trademark Office*